(12) United States Patent
Fuller

(10) Patent No.: US 11,992,732 B2
(45) Date of Patent: *May 28, 2024

(54) REPULSION-BASED SWIMJET SYSTEM AND METHODS FOR USE THEREOF

(71) Applicant: ORKUS SWIM LLC, Naples, FL (US)

(72) Inventor: Kip Fuller, Estero, FL (US)

(73) Assignee: Orkus Swim LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,502

(22) Filed: Feb. 23, 2023

(65) Prior Publication Data

US 2023/0302327 A1 Sep. 28, 2023

Related U.S. Application Data

(63) Continuation of application No. PCT/US2021/047216, filed on Aug. 23, 2021, which
(Continued)

(51) Int. Cl.
*A63B 35/12* (2006.01)
*A63B 69/12* (2006.01)

(52) U.S. Cl.
CPC ............. *A63B 35/12* (2013.01); *A63B 69/125* (2013.01); *A63B 2225/60* (2013.01); *A63B 2244/20* (2013.01)

(58) Field of Classification Search
CPC ... A63B 2208/03; A63B 35/12; A63B 69/125; A63B 2225/60; A63B 2244/20
See application file for complete search history.

(56) References Cited

U.S. PATENT DOCUMENTS 2,312,976 A * 3/1943 Pels ........................ A63B 35/00
440/38
3,329,118 A * 7/1967 Strader .................. A63B 35/12
114/333
(Continued)

FOREIGN PATENT DOCUMENTS

CN 217773166 11/2022
DE 202021104485 9/2021
(Continued)

OTHER PUBLICATIONS

Notice of Allowance mailed in U.S. Appl. No. 17/037,080 dated Dec. 18, 2020.
(Continued)

*Primary Examiner* — Garrett K Atkinson
(74) *Attorney, Agent, or Firm* — Gardella Grace P.A.

(57) ABSTRACT

In one aspect, a swimjet system may include a reverse thrust system worn by a swimmer proximate the frontal upper torso. The system provides a variable amount of reverse thrust such that the user can swim-in-place or make gradual forward progress. Importantly, this may enable a user to effectively "extend" a small residential pool to serve the same function as a twenty-five meter pool typically found at commercial or government facilities. The system also provides laminar current under the user while swimming, which solves the problems of "leg drop," the need to "out-kick" the arm stroke, and turbulence and wave action around the head associated with conventional swim-in-place devices. Still further, in certain embodiments the system provides a relatively strong current in the region of the arm stroke moving away from the swimmer which provides enhanced "resistance" for proficient swimmers.

19 Claims, 35 Drawing Sheets

Related U.S. Application Data is a continuation-in-part of application No. 17/167,823, filed on Feb. 4, 2021, now Pat. No. 11,097,177, which is a continuation-in-part of application No. 17/037,080, filed on Sep. 29, 2020, now Pat. No. 10,912,977.

(60) Provisional application No. 63/070,184, filed on Aug. 25, 2020.

(56) References Cited

U.S. PATENT DOCUMENTS

| | | | |
|---|---|---|---|
| 3,496,524 A | | 2/1970 | Stavis et al. |
| 3,556,438 A * | | 1/1971 | Meditz ............... B64C 39/026 244/17.23 |
| 3,891,960 A | | 6/1975 | Widener |
| 3,916,814 A * | | 11/1975 | Bardoni ............... A63B 35/12 D21/810 |
| 4,379,532 A * | | 4/1983 | Dmitrowsky ......... B64C 39/026 244/4 A |
| 4,843,998 A * | | 7/1989 | Parker .................. A63B 35/12 200/293.1 |
| 4,996,938 A * | | 3/1991 | Cameron .............. A63B 35/12 440/6 |
| 5,024,178 A * | | 6/1991 | Bruce ................... A63B 35/12 440/6 |
| 5,365,868 A * | | 11/1994 | Culotta ................ B63C 11/46 405/185 |
| 5,685,723 A * | | 11/1997 | Ladin .................. A63B 71/0686 482/3 |
| 5,697,792 A * | | 12/1997 | Ladin ................... G01P 5/07 434/254 |
| 5,947,782 A * | | 9/1999 | Siladke ................. A63H 23/10 441/132 |
| D416,225 S * | | 11/1999 | Robinson .................... D12/308 |
| 6,033,228 A * | | 3/2000 | Ladin .................. A63B 33/004 482/3 |
| 6,036,555 A * | | 3/2000 | Takacs ................. B63H 20/007 440/6 |
| D461,445 S * | | 8/2002 | Nuytten ..................... D12/308 |
| 6,524,145 B1 | | 2/2003 | Arzate |
| 6,665,789 B1 * | | 12/2003 | Stecker, Sr. ............ B63C 11/46 440/6 |
| 6,823,813 B2 * | | 11/2004 | Mazin .................. B63C 11/46 440/6 |
| 7,000,559 B2 * | | 2/2006 | Mah ...................... B63C 11/46 440/6 |
| 7,124,701 B2 * | | 10/2006 | Valente ................. A63B 35/12 405/185 |
| 7,223,143 B1 * | | 5/2007 | Martin .................. B63H 5/08 441/80 |
| 7,258,301 B2 * | | 8/2007 | Li ......................... B63H 11/04 244/4 A |
| 7,270,074 B2 * | | 9/2007 | Pradetto ................ B63C 11/46 440/6 |
| 7,328,669 B2 * | | 2/2008 | Adams .................. B63C 11/46 114/274 |
| 7,331,833 B2 | | 2/2008 | Burgess, Jr. |
| 7,353,767 B2 * | | 4/2008 | Taelman ............... B63C 11/46 114/253 |
| 7,484,687 B2 * | | 2/2009 | Martin .................. B64D 35/04 244/4 A |
| 7,527,011 B2 * | | 5/2009 | Smith ................... B63C 11/46 440/13 |
| 7,740,418 B2 * | | 6/2010 | Adams .................. B63C 11/46 114/274 |
| 7,753,750 B2 * | | 7/2010 | Gutierrez .............. A63B 35/12 441/80 |
| 8,517,781 B1 * | | 8/2013 | Mariansky ............ B63C 11/02 440/24 |
| 8,651,041 B2 * | | 2/2014 | Myers ................... B63C 11/46 D12/308 |
| 9,138,617 B2 * | | 9/2015 | Duboy .................. B63C 11/46 |
| 9,295,880 B2 * | | 3/2016 | Mazin ................... B63C 11/46 |
| 9,440,715 B2 * | | 9/2016 | Rizzo .................... B63B 32/50 |
| 9,540,090 B2 * | | 1/2017 | Fenu ..................... H04B 10/80 |
| 9,643,704 B2 * | | 5/2017 | Fenu ..................... B63C 11/46 |
| 9,810,549 B2 | | 11/2017 | Johnson et al. |
| 9,878,211 B1 * | | 1/2018 | Knowles .............. A63B 35/12 |
| 10,076,696 B2 * | | 9/2018 | Laflamme .......... A63B 24/0075 |
| 10,112,713 B2 * | | 10/2018 | Tyler .................... B64D 17/40 |
| 10,398,940 B2 * | | 9/2019 | Grosse Austing ...... B63C 11/46 |
| D869,373 S * | | 12/2019 | Wei ............................ D12/308 |
| D869,374 S * | | 12/2019 | Chen ......................... D12/308 |
| 10,556,151 B1 * | | 2/2020 | Malykhin .............. B63B 32/20 |
| 10,639,521 B2 | | 5/2020 | Foley et al. |
| D897,267 S * | | 9/2020 | Wei ............................ D12/308 |
| 10,793,271 B2 * | | 10/2020 | Demonfort .......... B64C 39/024 |
| 10,835,784 B1 * | | 11/2020 | Williams .............. A63B 35/12 |
| 10,912,977 B1 | | 2/2021 | Fuller |
| 11,097,177 B1 | | 2/2021 | Fuller |
| 2004/0094083 A1 * | | 5/2004 | Mazin ................... B63C 11/46 114/315 |
| 2006/0081167 A1 * | | 4/2006 | Valente ................. B63C 11/46 114/315 |
| 2006/0081168 A1 * | | 4/2006 | Adams .................. B63C 11/46 114/315 |
| 2006/0260528 A1 * | | 11/2006 | Taelman ............... B63C 11/202 114/315 |
| 2007/0241566 A1 * | | 10/2007 | Kuehnle ............... F03B 17/061 290/53 |
| 2008/0242162 A1 * | | 10/2008 | Smith ................... B63C 11/2209 440/14 |
| 2009/0258554 A1 * | | 10/2009 | Gutierrez .............. B63C 9/24 441/106 |
| 2013/0031691 A1 * | | 2/2013 | Burga .................. A63B 69/0093 2/2.15 |
| 2014/0273672 A1 * | | 9/2014 | Lee ....................... B63H 11/00 440/38 |
| 2015/0047548 A1 * | | 2/2015 | Mazin ................... B63C 11/46 114/315 |
| 2015/0111445 A1 * | | 4/2015 | Duboy ................. B63H 20/007 440/6 |
| 2015/0183498 A1 * | | 7/2015 | Wardle ................. B63G 8/001 114/337 |
| 2015/0209622 A1 * | | 7/2015 | Guinyard ............. B63C 11/02 440/38 |
| 2015/0224366 A1 * | | 8/2015 | Melendez ............. A63B 35/12 440/6 |
| 2015/0336636 A1 * | | 11/2015 | Fenu ..................... H04B 10/80 114/88 |
| 2015/0336650 A1 * | | 11/2015 | Fenu ..................... B63H 25/02 114/315 |
| 2016/0144934 A1 * | | 5/2016 | Rizzo .................... B63B 32/59 441/74 |
| 2017/0100656 A1 * | | 4/2017 | Laflamme ............. H04W 4/80 |

FOREIGN PATENT DOCUMENTS

| | | |
|---|---|---|
| EP | 4204109 | 7/2023 |
| KR | 10-0967491 | 7/2010 |
| WO | 2022/046673 | 3/2022 |

OTHER PUBLICATIONS

Non-Final Office Action mailed in U.S. Appl. No. 17/167,823 dated Apr. 1, 2021.

Notice of Allowance mailed in U.S. Appl. No. 17/167,823 dated Jun. 10, 2021.

International Search Report and Written Opinion mailed in PCT/US2021/047216 dated Dec. 9, 2021.

* cited by examiner

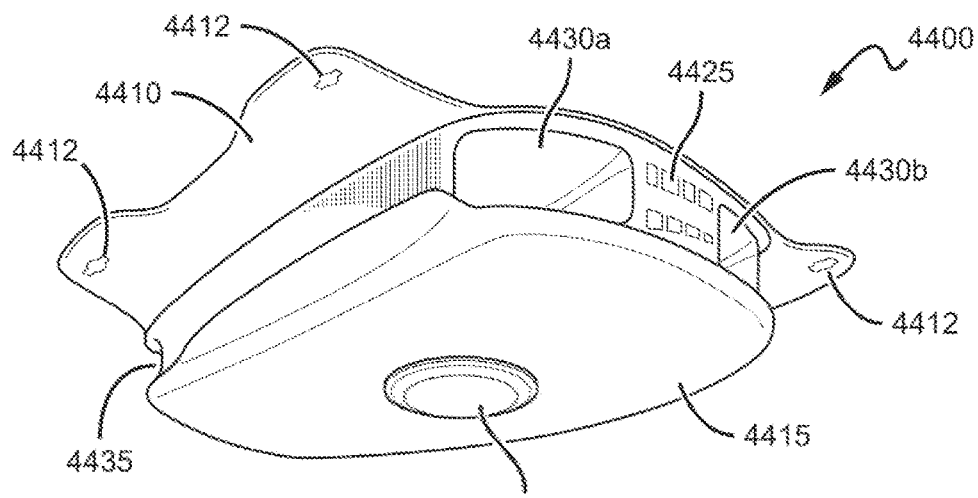

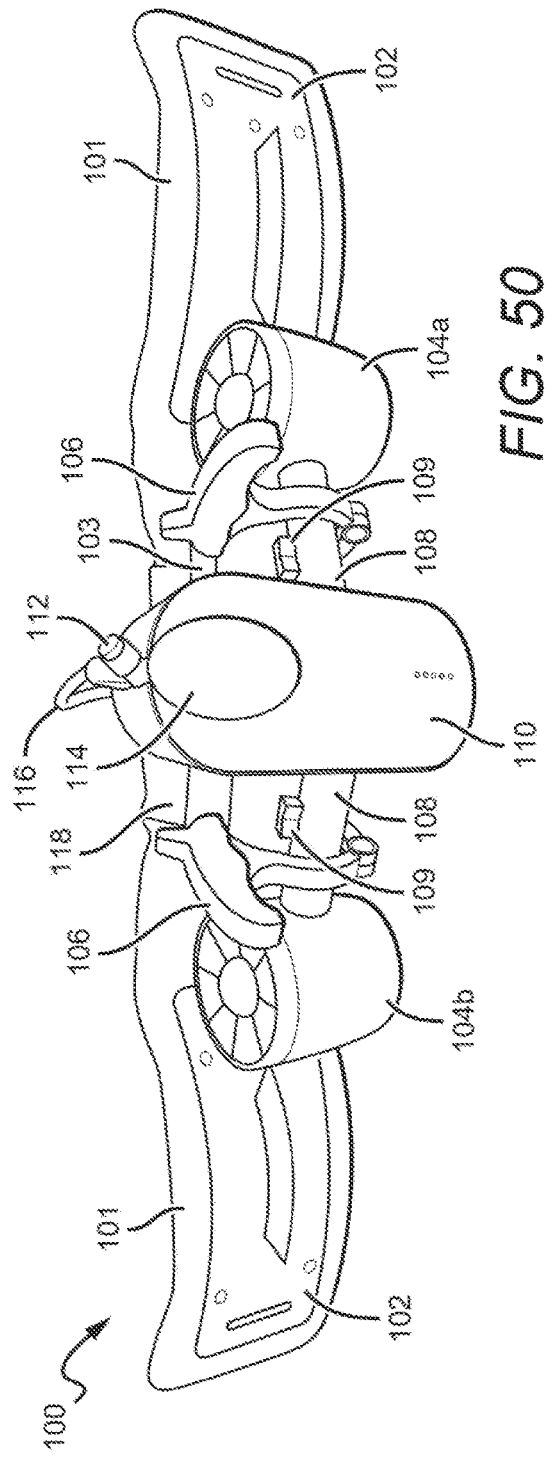
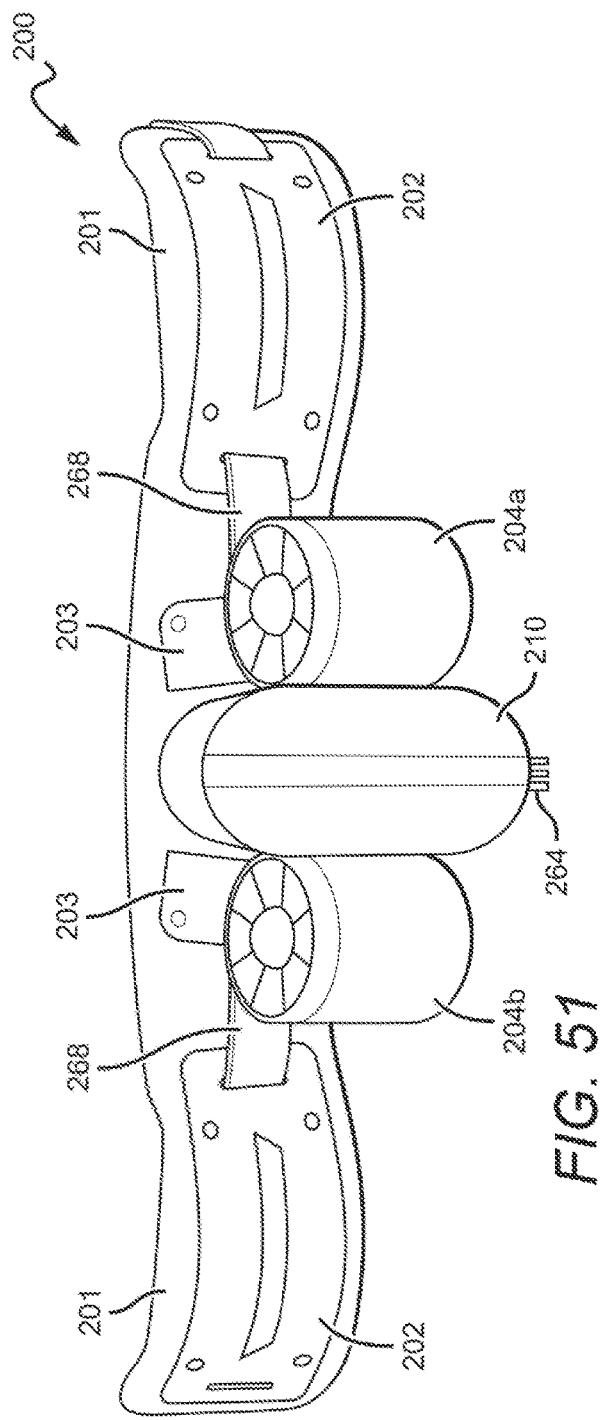
FIG. 50
FIG. 51

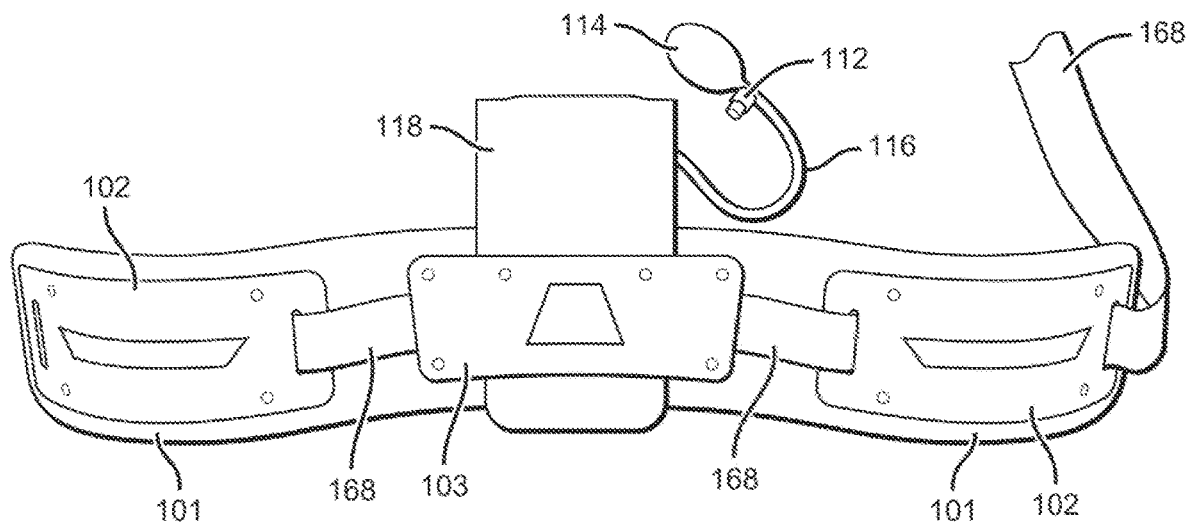
FIG. 52
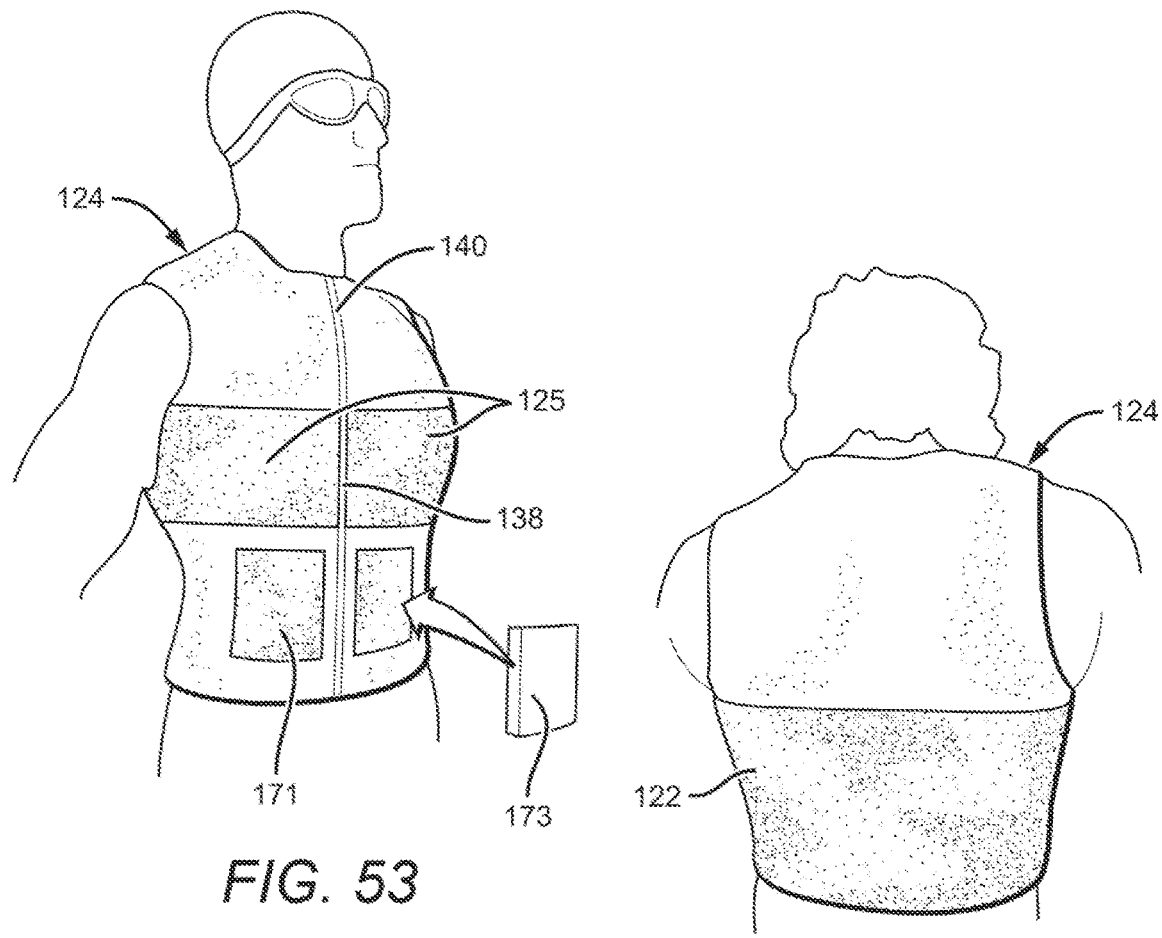
FIG. 53
FIG. 54

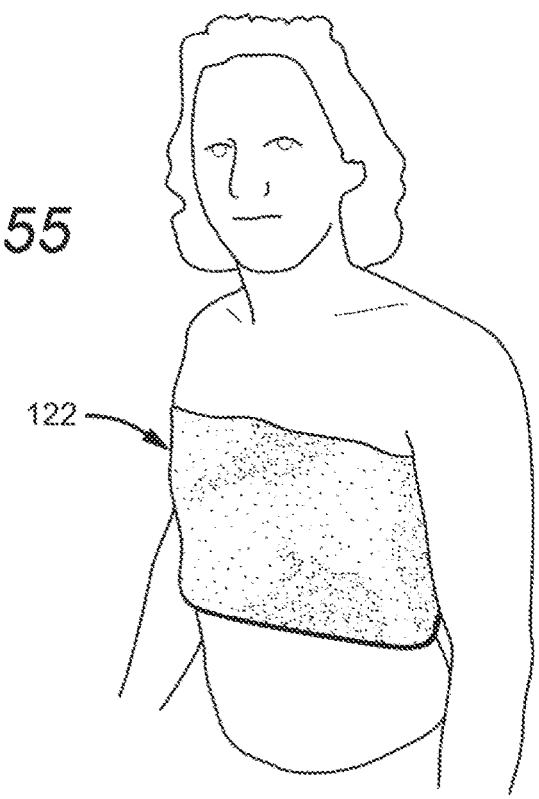
FIG. 55
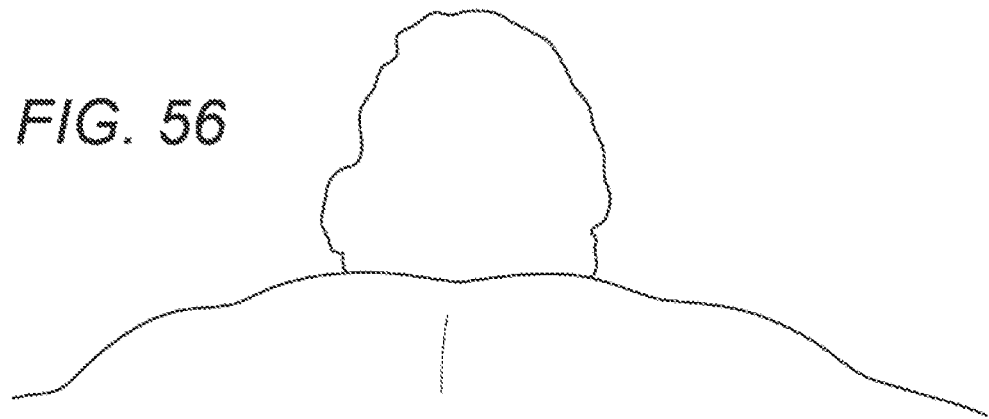
FIG. 56
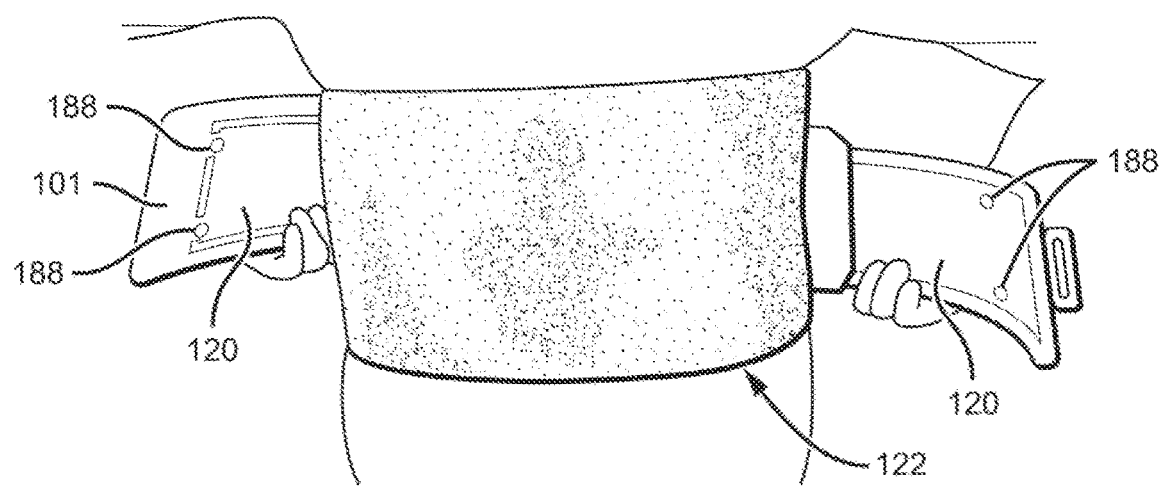

REPULSION-BASED SWIMJET SYSTEM AND METHODS FOR USE THEREOF

CROSS-REFERENCE TO RELATED APPLICATIONS

The present application is a continuation of and claims priority to International Application No. PCT/US2021/047216, entitled "Repulsion-Based Swimjet System And Methods For Use Thereof," filed Aug. 23, 2021, which is a continuation-in-part of U.S. patent application Ser. No. 17/167,823, issued as U.S. Pat. No. 11,097,177, filed Feb. 4, 2021 and entitled "Repulsion-Based Swim System And Methods For Use Thereof," which is a continuation-in-part of U.S. patent application Ser. No. 17/037,080, issued as U.S. Pat. No. 10,912,977, filed Sep. 29, 2020 and entitled "Repulsion-Based Swim System And Methods For Use Thereof," which claims the benefit and priority of U.S. Provisional Patent Application Ser. No. 63/070,184, filed Aug. 25, 2020 and entitled "Repulsion-Based Swim System And Methods For Use Thereof," each of which is incorporated herein by reference in its entirety for all purposes.

INCORPORATION BY REFERENCE

Each document cited herein is incorporated by reference in its entirety for all purposes.

BACKGROUND

Swimming, particularly for exercise, is a highly desirable form of exercise but swimming on a regular basis typically involves substantial inconvenience and requires the athlete to tolerate various potentially unpleasant aspects of the swimming experience. Most individuals must travel to a local park, recreation or other exercise facility in order to access a pool of sufficient length, for instance a standard 25-meter lapping pool. Many individuals have smaller pools at their residences, particularly in warmer climates, but these pools are often only about 7-9 meters in length. After a typical swim turn and wall push, the individual might only be able to take a few strokes before arriving at the other side of the pool. Accordingly, even in warmer climates where pool ownership and swimming for exercise are most common, individuals still need to travel to commercial or public facilities to gain access to a pool of sufficient length to enable a meaningful workout.

Experiences at swimming pool facilities are also typically compromised in various ways. Water temperature is often unpredictable, as is lane availability. Long wait times are common and sharing lanes by multiple swimmers is often necessary. Further, hygiene is often an issue and infectious disease transmission is of course possible in a public pool environment. Many swimmers thus seek to avoid commercial or public swimming pools.

Swim-in-place systems are one solution to these problems. Swim-in-place systems are designed to permit a swimmer to "hold station" or remain stationary while swimming in a small body of water such as a small exercise pool or a typical residential recreational pool. Such systems typically come in one of two forms.

The first is a tether system. A tether is attached to a belt or harness that is worn by the swimmer. The other end of the tether is attached to pole or other fixed object, typically outside of the pool. The swimmer begins swimming and is held in place by the tether.

However, tether systems have various disadvantages. First, the swimming experience is not natural because there is no flow of water around the swimmer, particularly under the swimmer. Strokes and kicks are accordingly unnatural in that the swimmer's hands and feet do not experience the same fluid environment as in normal swimming. The swimmer's kicks, for instance, do not provide the usual amount of lift and thus the swimmer's legs drop, which is a suboptimal swimming position. Second, in order to maintain the legs in an elevated and horizontal position, it is necessary for the swimmer to kick more frequently than the arm stroke would require. Therefore, the swimmer usually cannot swim normally in that the kick frequency is outpacing the corresponding appropriate stroke frequency. Stated differently, the swimmer must "out kick" their arm stroke in order to stay horizontal in the water. Third, the difficulty of the swim can only be increased by increasing the power applied to each stroke and kick. If less power is applied by the swimmer, the intensity of the exercise drops accordingly. In normal swimming, the need or desire to reach a destination within a certain time (for instance, the end of the swim lane to achieve a desired lap time) provides a natural motivation and incentive to maintain swimming at higher speeds. With tether systems, a great deal of self-discipline is required to sustain a similar level of difficulty or exertion to that experienced in a normal swimming environment. Fourth, the fact that the swimmer is held in one fixed position tends to cause boredom, diminishing the swimming experience. Fifth, substantial pressure is created by the belt to which the tether is attached, which causes discomfort particularly over long periods of time and for faster swimmers whose strokes produce more thrust.

The second type of swim-in-place system generates a recirculating current into which a swimmer swims in order to hold station. A conventional pool current generator system 158 (hereinafter "current generator") is shown in FIG. 1. Current is emitted from the generator horizontally along the surface of the water and the swimmer 150 strokes at a pace sufficient to counteract the force of the current and stay in position. As illustrated, the current is typically diverted upwardly when it makes contact with the swimmer's head 148. This effect creates a swell or wave of water around the head and there is typically substantial turbulence around the head of the swimmer as well. This makes breathing difficult, and inhalation of water into the mouth, nose and lungs of the swimmer more frequently occurs. Further, greater rotation of the head, neck and torso are typically required to elevate the nose and mouth above the water, and this may be difficult for less skilled swimmers, older swimmers, or swimmers with injuries.

Also, as with the tether-based system, the swimmer must kick very quickly—faster than called for by the arm stroke frequency—in order to stay horizontal in the water. This is sometimes called "out kicking" the arm stroke. The minimal flow under the swimmer's legs means that more kicks are required in order to maintain the legs in an elevated and horizontal position. Therefore, the swim experience is unnatural and fails to promote proper technique.

Another problem associated with current generator systems is the fact that even when out-kicking the arm stroke, swimmers still have a difficult time keeping their legs elevated, as required to achieve correct swimming form. Two primary factors contribute to this "leg drop." First, the current typically is minimal under the legs of the swimmer. The current generator 158 will usually create a strong current near the water surface and extending down to a depth of only several inches. That current 144 is substantially impeded when it encounters the head and shoulders of the swimmer. A weakened current will flow along the underside of the swimmer, but even this current trails off substantially as it progresses to the left in FIG. 1 due in part to dissipation of the current into the adjacent stationary water. Also, the feet of the swimmer are often close to a rear wall 152 of the pool and the water in this area often becomes highly turbulent due to the kicking action of the swimmer and rebound of water off the rear wall. The net result is that swimmers find it difficult to maintain the preferred horizontal swimming orientation because their legs drop too far into the water even when out-kicking the arm stroke.

As used herein, the term "turbulence" or "turbulent" refers not only to fluid motion that is non-laminar, irregular and characterized by chaotic changes in pressure and flow velocity, but also the accompanying cavitation. Cavitation occurs when water pressure is lowered below the water's vapor pressure, forming bubbles of vapor. Cavitation is the formation of vapor cavities in water (small liquid-free zones called "bubbles" or "voids") that are the consequence of forces acting upon the liquid. It usually occurs when a liquid is subjected to rapid changes of pressure that cause the formation of cavities where the pressure is relatively low. That can happen when water is accelerated to high speeds, for example, when an arm stroke or kick enters the water. Cavitation further diminishes the propulsive force provided by a stroke or kick and, again, hereinafter the term turbulence is used to refer to both non-laminar flow and the associated cavitation.

Another problem with current generator systems is that the width of the current lane is typically quite narrow, often only slightly wider than the width of the swimmer's shoulders. The speed of the current also varies substantially across the narrow current lane. The speed is greatest in the center and the speed gradually tapers off at locations spaced apart from the center line. At the edges of the swim lane there are substantial eddy currents as the water in the swim lane current interacts with the surrounding, generally stationary water. Because of this, it is necessary to stay almost perfectly centered in the swim lane or else the amount of forward thrust provided by each right-handed stroke will vary substantially from that provided by a left-handed stroke. That can change the orientation of the swimmer unless the swimmer makes appropriate maneuvers to counteract this effect or regain the center of the lane. These effects can substantially degrade the swimming experience for all but the most proficient swimmers.

Pool current generator systems are also generally quite expensive. Endless Pool brand systems often cost fifteen to thirty thousand dollars, whereas smaller and more portable pool current generators cost between three and ten thousand dollars.

Existing swim-in-place systems thus suffer from various disadvantages. The swim experience is compromised by the absence of appropriate current under the swimmer and turbulence and/or lack of laminar current flow under the legs of the swimmer and in the region around the head and shoulders of the swimmer. Swimmers often experience leg drop, which puts their bodies in a suboptimal position for swimming. Arm strokes generally provide less thrust than normal because the strokes pass through turbulent water.

It is also often difficult to breathe due to waves and turbulence around the head of the swimmer. In the case of a current generator system, it is often difficult to avoid inhaling water. When using tether systems, undue waves and turbulence may be generated around the head due to the absence of incoming laminar current flow, which may lead to the same difficulty.

Further, the desired exertion level may be difficult to maintain. In the case of tether systems, great self-discipline is required to maintain the same exertion level over time and requires kicking out of synchronization with arm strokes. With current generator systems, it is necessary and often difficult to stay exactly in the center of the current lane in order to experience a consistent difficulty or exertion level.

Moreover, conventional systems require that the swimmer remain stationary in the water, which can lead to boredom and an otherwise diminished experience. The sense of satisfaction of completing a lap is missing. Horizontal movement is also missing, which deprives the swimmer of any change in visual scenery during the course of the swim.

Certain embodiments described herein address one or more of the foregoing problems. Certain embodiments which are exemplified herein solve most or all of these problems. However, the scope of the invention is defined by the claims and the foregoing discussion of the shortcomings of the conventional swim-in-place products should not be construed to limit the claims by implication or otherwise. Various embodiments described herein and within the scope of the claims may not solve certain, or any, of the particular problems addressed above. Again, however, the embodiments that are currently most preferred solve many, most or all of these problems.

SUMMARY OF ILLUSTRATIVE EMBODIMENTS

In one aspect, a swimjet system may include a reverse thrust system worn by a swimmer proximate the upper abdominal area. The system provides a variable amount of reverse thrust such that the user can swim-in-place or make gradual forward progress. Importantly, this may enable a user to effectively "extend" a small residential pool to serve the same function as a twenty-five meter pool typically found at commercial or government facilities. The system also provides laminar current under the user while swimming, which solves the problems of "leg drop," the need to "out-kick" the arm stroke, and turbulence and wave action around the head associated with conventional swim-in-place devices. Still further, in certain embodiments the system provides a relatively strong current in the region of the arm stroke moving away from the swimmer which provides enhanced "resistance" for proficient swimmers.

The inventor also discovered that, counterintuitively, reverse thrust may be provided toward the face of the swimmer in a manner that does not force water into the nose of the swimmer, which creates substantial discomfort and can cause inhalation of water. When reverse thrust is provided along the centerline of the torso, it was found that in many such embodiments water was in fact forced into the swimmer's nostrils. However, embodiments having thrust vectors that are not coaxial with the centerline of the torso provide the aforementioned advantages without creating a strong current proximate the swimmer's nose.

As used herein, the term "impeller" refers to an apparatus designed to move a fluid by rotation and specifically includes propellers, fans and turbines. In the context of watercraft the term propeller is also sometimes used interchangeably with the term impeller, fan or turbine. The term "propeller" is accordingly used herein to refer to any apparatus having fins, blades or other structure to move fluid by rotation of a mechanical element, including but not limited to turbines, fans and impellers.

Another technical challenge that has been overcome by the illustrative embodiments described herein is provision of means to mount the swimjet system to a swimmer in a manner that avoids uncomfortable pressure points, shifting or movement of the system during use, and impairment of the expansion and contraction of the ribcage during respiration. In one currently preferred embodiment, the user first dons a stretchable band or vest made of, for instance, neoprene. The user mounts to that band or vest a swimjet system comprising a rigid housing portion and flexible wing portions. By fastening the flexible wing portions to the stretchable vest or band, the swimjet system is firmly held in place in a manner that allows expansion and contraction of the user's ribcage. The system thus allows the user to breathe freely, avoids uncomfortable pressure points, and holds the impeller system securely in place. The system can be readily removed by unfastening the wing portions and lifting the swimjet system away from the vest or band.

The currently preferred embodiments provide generally laminar flow under the user's legs and in the region of a freestyle arm stroke. This laminar flow enhances the effectiveness of leg kicks and arm strokes, thereby improving the swimmer's form and increasing the therapeutic effect of the exercise.

The currently preferred twin impeller systems may provide the advantage of reducing the profile or height of the device. Use of a multi-impeller system also may advantageously reduce the torquing effect by reducing the distance between the centerline of the swimmer and the axis of repulsion.

Optimal horizontal orientation may be further promoted by the use of air bladders or impeller thrust vectoring. Air bladders may be provided in the center portion of the device described above, which provides the dual benefits of providing lift and tightening the fit of the reverse propulsion system on the user. The thrust from the impellers also may be vectored slightly downward, which approach provides lift for the swimmer's legs as well as a means to control the amount of rearward thrust. For example, a two-speed motor may provide almost infinitely variable rearward thrust by partially vectoring the thrust downwards or sideways (to the left and right of the swimmer).

In another aspect, the illustrative embodiments of the swimjet system address the shortcoming of conventional swim-in-place devices that swimmers must remain stationary during the entire swim. In certain embodiments, the user may throttle the reverse thrust such that the user traverses a small residential pool in the same number of strokes as would be needed to traverse one length of a twenty-five or fifty meter pool (e.g., about twenty-five to fifty strokes, depending on the swimmer). The user may thus enjoy a traditional swimming experience without the need to travel to a facility with a large pool or to tolerate the disadvantages associated with public pool environments.

In one currently preferred method of use, the swimmer first selects an amount of reverse thrust that permits the swimmer to make slow forward progress against the reverse thrust. Upon starting to swim, the user's torso and thus the swimjet system will assume a generally horizontal position. Upon detection of that substantially horizontal orientation, the impeller systems begin to spin and provide the selected amount of reverse thrust. In one example, the swimmer requires forty strokes to traverse a seven meter residential swimming pool, thereby effectively extending the residential swimming pool to serve the same purposes as a twenty-five meter or longer lapping pool. Upon reaching the end of the lane, the swimmer performs a non-flipping turn in which the upper torso assumes a generally upright or vertical position. When in that position the reverse thrust is deactivated until the swimjet system detects that it has returned to a horizontal or swimming position. After pushing off the wall, the swimmer regains this orientation and the reverse propulsion system reactivates.

The resulting swim experience may actually be superior to that of a traditional full-size lapping pool because of the current provided under the legs and in the arm stroke regions. This current tends to reduce turbulence and increase the force or repulsion generated by each stroke or kick. The swimmer may also find it easier to maintain the proper stroke form and body position, due in part to the manner in which the swimjet system overcomes the leg drop problem by effectively lifting the swimmer's legs into a more horizontal position.

In further applications, the swimjet system may enable substantially enhanced and interactive training experiences. For example, the system may provide varying reverse thrust over time in coordination with coaching or training audible messages requesting the swimmer to sprint for a certain period of time. In this fashion, the swimmer may be provided with interactive and interesting swim exercise routines. When further used in connection with a smart watch and associated application running thereon, the swimjet system may track strokes and laps (e.g., by detecting the turn sequence described above) and by factoring in the amount of reverse thrust provided over time, inform the swimmer of the equivalent distance traveled or equivalent number of 25 meter laps completed.

The swimjet system may be used in conjunction with one or more submerged beacons that enable the determination of the position of the swimjet system relative to those one or more beacons. For instance, a single beacon may be placed beneath the device which communicates acoustically with the swimjet system and uses sonar to determine where the swimmer is positioned relative to the beacon.

Using such a beacon, the swimjet system may detect whether the user is able to hold position given the amount of thrust or rather is being pushed backwards, away from the beacon. This data may be used to automatically adjust the thrust and thereby ensure that the swimmer holds position or station above the beacon, thereby minimizing the area of the pool (or lake or other body of water) in which the user is swimming.

This may be particularly advantageous when used in connection with interactive training. An interactive training session similar in principle to a Peloton training session may be delivered via, for example, waterproof earbuds and imagery displayed on transparent display means on the inside of the user's goggles or mask. The training program may increase the difficulty intermittently, accompanied by an audio and/or visual request that the swimmer sprint for a certain time or distance. If the system detects that the user is unable to hold station over the beacon or is swimming ahead of the beacon, the system may decrease or increase the thrust as necessary to enable the swimmer to hold station during the sprint. Over time the system may record data concerning the user's swim which may be analyzed to determine the appropriate thrusts to use during warm-up, cool-down, and other portions of the work-out such as sprint, recovery and steady exercise.

The foregoing general description of the illustrative implementations and the following detailed description thereof are merely exemplary aspects of the teachings of this disclosure and are not restrictive. As noted above, certain embodiments within the scope of this disclosure and the claims may not provide the particular advantages set forth above. That said, the most preferred embodiments provide many, most or all of the foregoing advantages relative to conventional swim-in-place devices.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 3-5 are additional views of a swimjet system of a first embodiment;

FIGS. 48-52 are various views of the nineteenth and twentieth embodiments;

FIGS. 53-57 are illustrations of various embodiments of wearable garments to receive the mountable swimjet systems of various embodiments;

DETAILED DESCRIPTION OF ILLUSTRATIVE EMBODIMENTS

Figure 1:
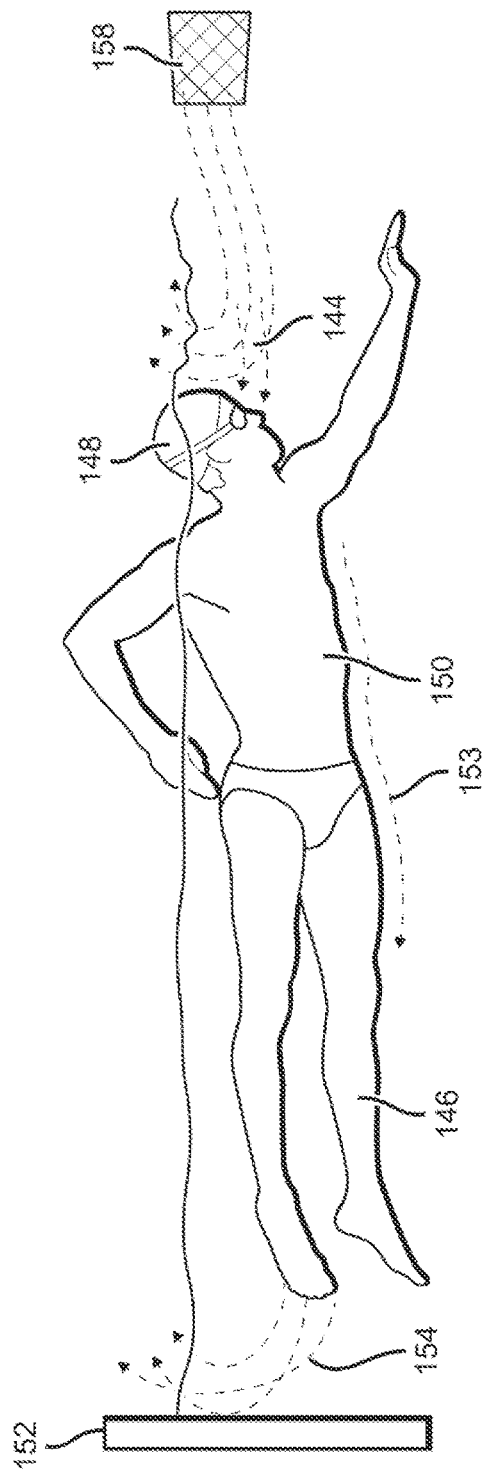
FIG. 1 is an illustration of a conventional current generator swim-in-place system.

The description set forth below in connection with the appended drawings is intended to be a description of various illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

All patents, applications, published applications and other publications referred to herein are incorporated by reference for the referenced material and in their entireties.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

Where numerical values are provided, it is to be expressly understood that any values therebetween may be used as well. For instance, a recitation of about 2-5 units is intended to include values therebetween, such as about 3-4 units.

The foregoing general description of the illustrative implementations and the following detailed description thereof are merely exemplary aspects of the teachings of this disclosure and are not restrictive. As noted above, certain embodiments within the scope of this disclosure and the claims may not provide the particular advantages set forth above. That said, the most preferred embodiments provide many, most or all of the foregoing advantages relative to conventional heat-not-burn and vaping devices.

Figure 2:
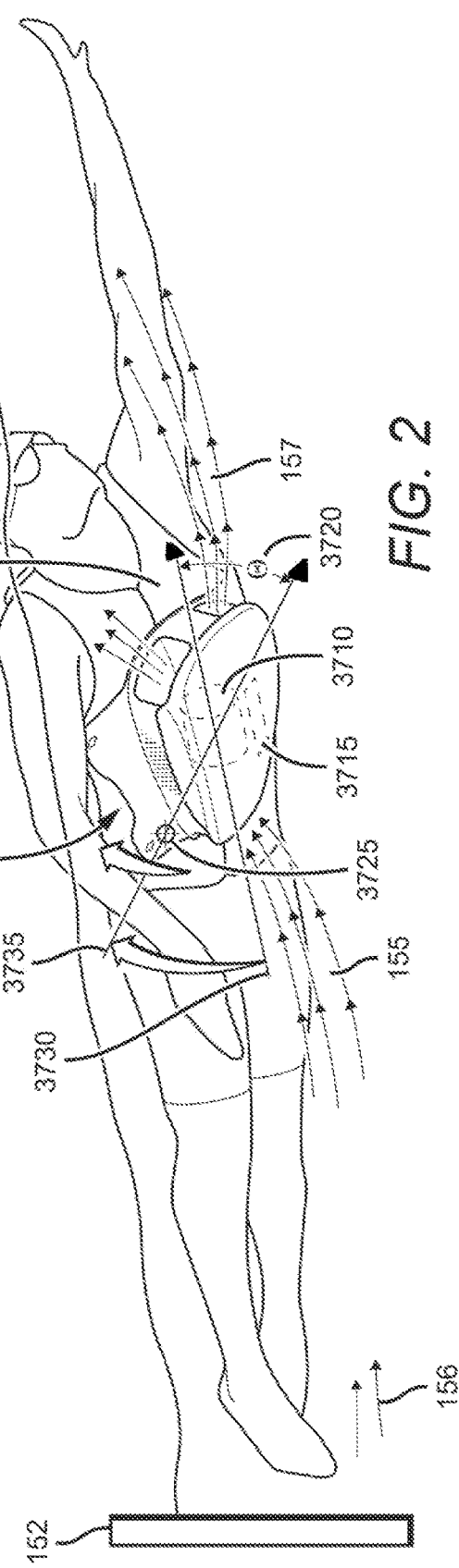
FIG. 2 is an illustration of one embodiment of a first embodiment of a swimjet system which includes a wearable vest or band and a swimjet system mountable thereto.
Figure 6:
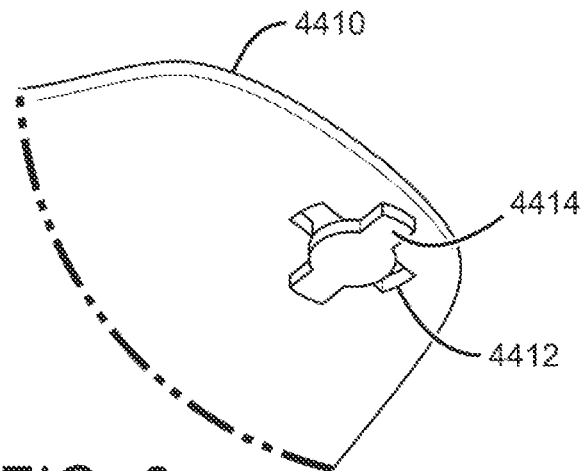
FIGS. 6-7 are illustrations of one means of attaching the first embodiment of the swimjet system to the vest or band worn by the swimmer.
Figure 7:
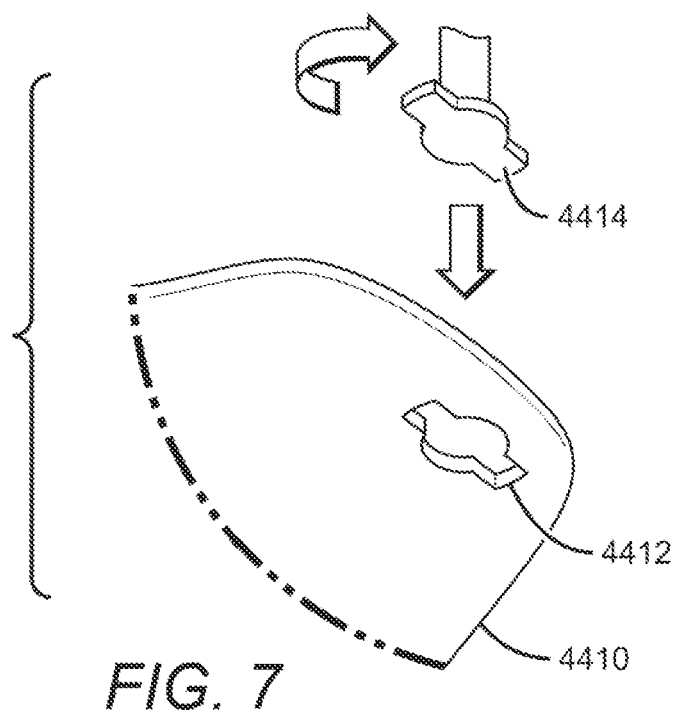

FIG. 1 is an illustration of a conventional current generator swim-in-place system, which has been addressed above. FIG. 2 is an illustration of current flows associated with various embodiments of the swimjet system. The impeller system provides substantially laminar flow under the legs of the user, under the user's torso 150 and under and around the user's head 148. This laminar flow provides lift and substantially improves the effectiveness or thrust provided by each stroke or kick. Improving kick effectiveness tends to raise the legs to an elevated position, as shown, which is preferred. In contrast to conventional swim-in-place systems, there is no wave build-up or turbulence around the head of the swimmer that may tend to cause the swimmer to inhale water unintentionally.

Importantly, this flow is in the opposite direction of the swimmer's stroke and thus there is no need for the swimmer to stroke quickly to "overtake" the flow of water, as in conventional current generator systems such as that depicted in FIG. 1. In order for the swimmer to encounter full or "normal" resistance in a conventional current generator system, it is necessary for the swimmer to stroke very quickly, since the current is already flowing past the swimmer, in the same direction as the strokes. Each stroke must therefore be quicker than normal to offset the effect of the direction of the current 144/153. If the current is moving past the swimmer at 2 mph, then each stroke must be 2 mph faster than normal in order to achieve normal resistance and stroke feel.

In contrast, the swimjet system of FIG. 2 reverses the direction of that current and the swimmer is able to experience full or normal resistance at a stroke speed that is less than normal. If the flow provided by the impellers is 2 mph in the stroke paths, the swimmer may stroke 2 mph slower than normal and still get a full or normal workout (or resistance level).

Another aspect of the swimjet systems described herein is that one need not swim-in-place, as with conventional systems. By selecting an appropriate reverse thrust or impeller speed, the user may make gradual forward progress with each stroke. Importantly, this may enable the user to effectively extend a relatively short residential pool to serve the same purpose as a 25 or 50 meter lap pool.

A proficient swimmer will travel approximately one meter per stroke and may travel three meters or more during a wall push-off. For a 6 meter residential swimming pool, a proficient swimmer may only need two to three strokes to reach the other side of the pool, which makes residential pools generally unsuitable for training or swimming laps for exercise.

By selecting a first reverse thrust, the user needs approximately twenty-five strokes to reach the other side of a 6 meter residential swimming pool. By selecting a second, greater reverse thrust, the user needs approximately fifty strokes to reach the other side of a 6 meter residential swimming pool. The swimjet systems described herein can thus be used to swim as effectively in a relatively small residential pool just as a public or commercial 25 or 50 meter swimming pool.

Alternatively, the user can remain stationary if desired. The user may select a reverse thrust that matches his or her desired swim effort, in which case the user will remain stationary as will conventional swim-in-place systems but with a much-improved swimming experience. In some examples, a controller (e.g., controller 2702 described below) can automatically adjust the reverse thrust generated by the impellers of the swimjet system to maintain the swimmer's stationary position in the water. As explained, the laminar flow under the legs and torso and proximate the user's head substantially facilitates proper swim form, obviates the need to "outkick" ones arm stroke to keep the feet elevated, and makes it easier to breathe.

A first embodiment 3700 is shown in FIG. 2. FIG. 2 illustrates a swimmer wearing a nineteenth embodiment of a swimjet system 100 that comprises a swim vest 150 and a swimjet system mounted thereon. The swimjet system includes a swimjet unit 4415, one or more impellers 3710. The swimjet unit 4415 encloses battery components and a control system for the swimjet system. The battery system may include a waterproof charging port (not shown) and a plurality of battery modules. The control system receives control input and applies appropriate voltages and control signals to the impellers, as described elsewhere herein.

The centerlines or axes of the impellers 852 may be spaced about 1, 2, 3, 4, 5, 6, 7 or 8 centimeters away from the inwardly facing surface of the swimjet unit. Use of multiple and thus smaller impellers helps minimize this distance and thus the distance (and thus moment arm) between the swimmer's longitudinal axis passing through the center of buoyancy 3725 and the thrust vector(s) 3730. Stated another way, the closer the impellers are to the swimmer's chest, the less torque the reverse thrust creates in the direction of the arrow spanning between lines 3730 and

3735. This torque can cause discomfort and, when the user is outside of the body of water (which can be a pool, lake or any other body of water), the weight of the swimjet unit can cause uncomfortable torque in this same direction. The lower profile the unit, the less this "standing" torque will be and thus the more comfortable the unit will be to wear when outside of the water.

Figure 30:
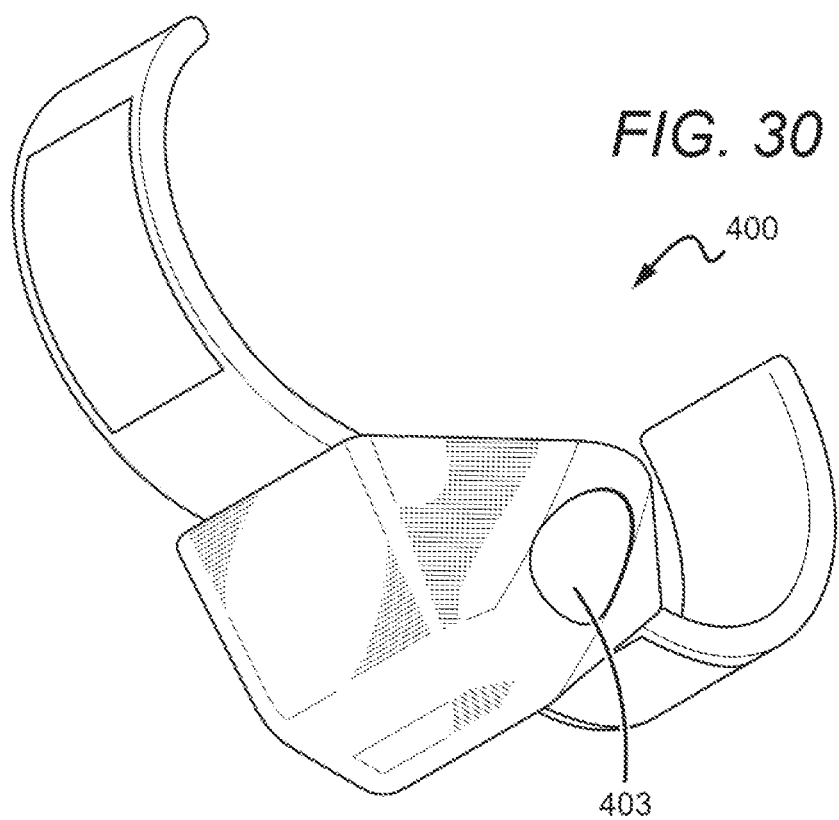
FIG. 30 is an illustration of a thirteenth embodiment of a swimjet system.

Conversely, increasing the distance from the impellers to the swimmer's chest applies more torque that the reverse thrust creates in the direction of the arrow spanning between lines 3730 and 3735. This torque can advantageously cause the swimmer's body to rotate in the same direction, which will lift the legs of the swimmer to counteract undesirable leg drop. A greater impeller-to-chest distance thus can help elevate the swimmer's legs. A single impeller embodiment, such as that shown in FIGS. 2 and 30, may provide this functional advantage, while minimizing interference with a user's freestyle arm stroke.

In order to essentially eliminate the torque created by the thrust vector, the thrust may be vectored downwardly at an angle theta such that the downwardly projecting thrust vector 3735 extents through the center of buoyancy. This may be desired, for instance, when it is desired that the swimjet simulate most accurately natural swimming (without the leg-raising benefit that would otherwise be provided by the reverse thrust).

Still further, in embodiments designed to help train and improve kicking form, the thrust may be vectored downwardly at an angle greater than theta. This provides counterclockwise torque on the swimmer, which tends to push the legs downward.

The thrust vectoring may be accomplished via the various techniques described in the priority applications, which are incorporated herein by reference. In preferred embodiments, the thrust may be vectored by adjustable conduits or vents within channels 4430a and 4430b. Those conduits or vents may be automatically adjustable during a workout session via one or more dedicated actuators (not shown) under the control of the control system described herein.

The configuration of intake 4435 facilitates provision of laminar flow to and through the impellers 104a and 104b, 204a and 204b. The intake may have a height of 1-15 centimeters, preferably about 5-8 centimeters. The intake may have a width of 1-30 centimeters, preferably about 10-16 centimeters. This configuration provides laminar flow 155 under the legs of the swimmer, which improves kick effectiveness and swimming experience.

The configuration of outputs 4430a and 4430b facilitates provision of laminar flow in the region of the downward freestyle arm stroke while avoiding pushing any water into the face of the swimmer, which can be uncomfortable and may interfere with breathing. The outputs may each have a height of 1-15 centimeters, preferably about 5-8 centimeters. The outputs may each have a width of 1-15 centimeters, preferably about 7-12 centimeters. This configuration provides laminar flow 157 in the area of the user's arm stroke, which improves arm stroke effectiveness and swimming experience.

With reference to FIGS. 3-5, the swimjet unit has, in one embodiment, a single manual control in the form of knob or disc 4420. A user turns the unit on and off by depressing the disc 4420 (hereinafter, "button press") multiple times in a preselected sequence (selected by the user via a mobile application) and once, respectively. This advantageously provides for easy and rapid device shut-off in case of emergency—all that is required to turn off the device is for the user to press the disc 4420. The preselected sequence may be required to activate the device in order to prevent use by unauthorized users, including but not limited to children. A preselected sequence may include an arbitrary number of long and short button presses followed by short or long pauses. As examples, a pre-selected sequence may be i) one long button press, or ii) one long button press followed by a long pause and then three rapid presses.

Turning the disc 4420 may index the disc through an arbitrary number of detent positions, such as 10, 20 or 30 positions. Each may correspond to a difficulty level. In one example, the maximum level is 20 and provides 25 pounds of reverse thrust. Each level from 19 down to 1 may provide incrementally lower amounts of thrust. Level 10 may provide 12.5 pounds of thrust and level 5 may provide 6.25 pounds of thrust.

LED indicators 4425 indicate the present difficulty or thrust level and the current batter level. Readouts may optionally include alphanumeric indicators of percent or numeric thrust level, difficulty level, battery level or battery time used or remaining. The indicators are positioned at the top of the device (when the user is standing as in FIGS. 17-20) to facilitate visibility while swimming or while in a body of water.

Intake 4435 may be equipped with a mesh or grill to prevent intake of debris or other objects, including but not limited to the laces on a swimsuit. The mesh or grill may be positioned 3-8 cm into the channel 4435 so as to minimize its visibility or conspicuousness.

The swimjet system 4400 includes the swimjet unit rigid housing 4415 and two flexible wings 4410 which conform to the ribcage of the swimmer. Each wing may include keyholes to receive male fastening means protruding from the vest and may further include Velcro pads or portions on the surface facing the user's chest in order to adhere to complementary Velcro patches or pads on the vest 150, as described herein.

Turning to FIGS. 6-8 and FIG. 13, locking elements 4414 extends outwardly from vest 150/124. The swimjet system is initially attached to the vest with the Velcro patches such that the apertures 4412 are generally aligned with locking elements 4414. The locking elements are extended through the apertures 4412 and then turned to the position shown in FIG. 6 to securely hold the swimjet system in place during use.

The swimjet system preferably has negative buoyancy of at least 1-3 pounds to contribute to the buoyancy of the user, including in an emergency. This may be achieved by providing watertight fixed or inflatable balloons or cavities within an unused space within housing 4415.

Figure 8:
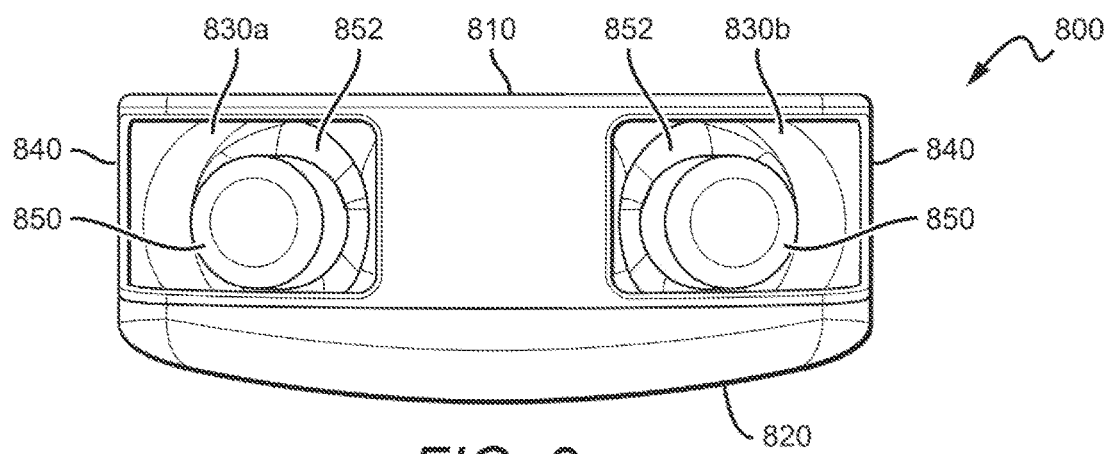
FIGS. 8-12 provide various views of the swim jet portion of the swimjet system (without the flexible wing portions shown in FIGS. 3-5)
Figure 9:
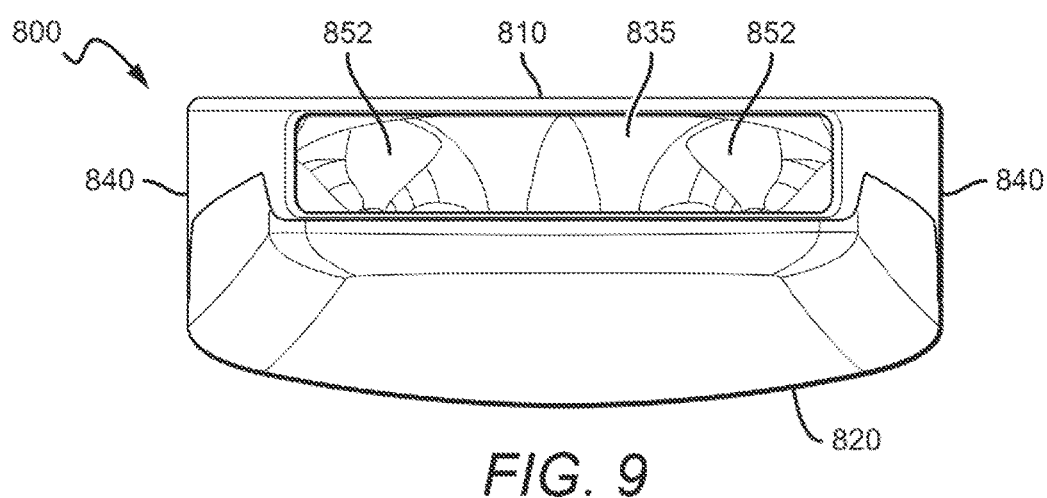
Figure 10:
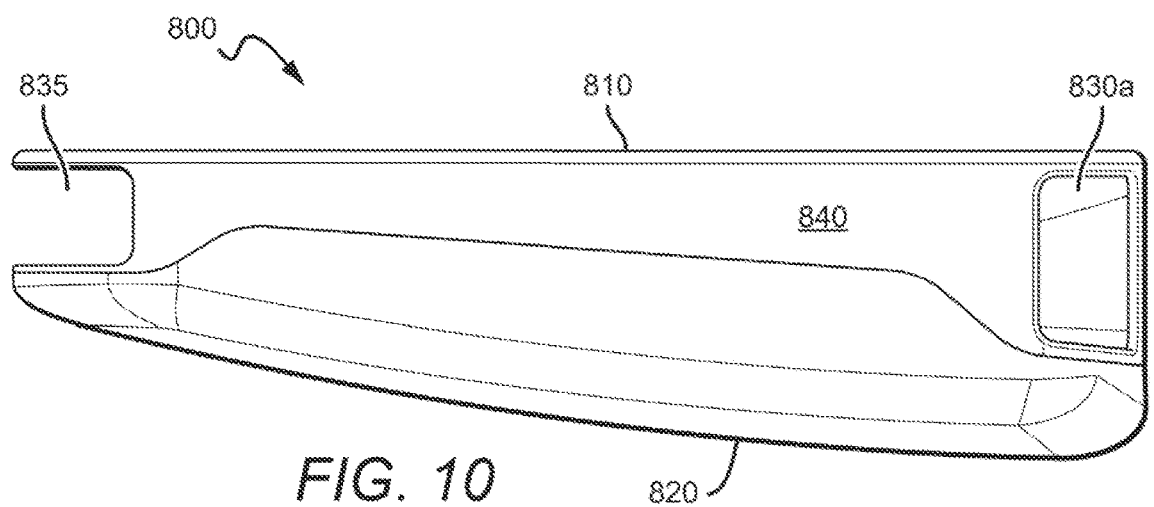
Figure 11:
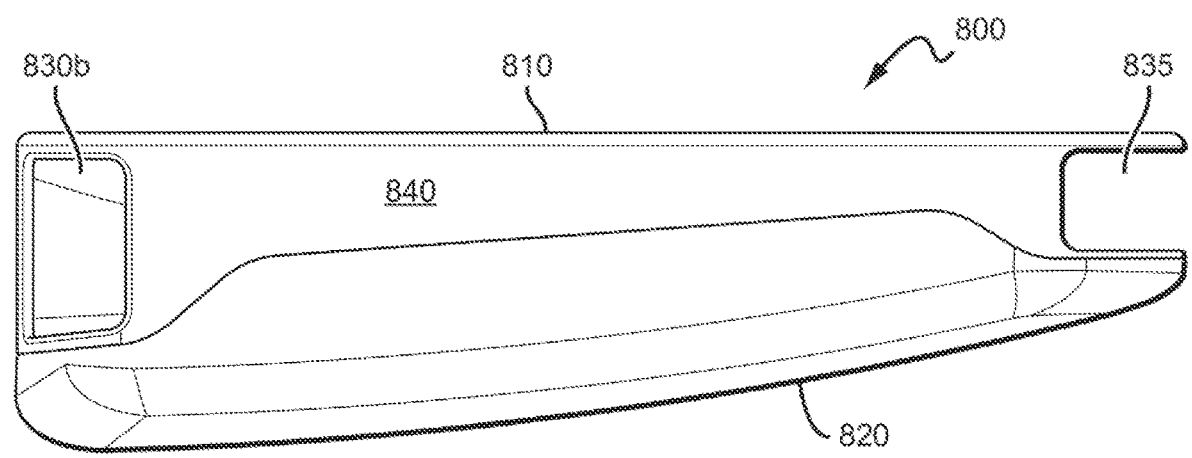

FIGS. 8 and 9 show top and bottom views of the swimjet unit 800 without the flexible wings 4410. FIGS. 10 and 11 provide side views of the swimjet unit 800 that illustrates the lower intake 835 and upper outlet or thrusters 830a and 830b.

Figure 12:
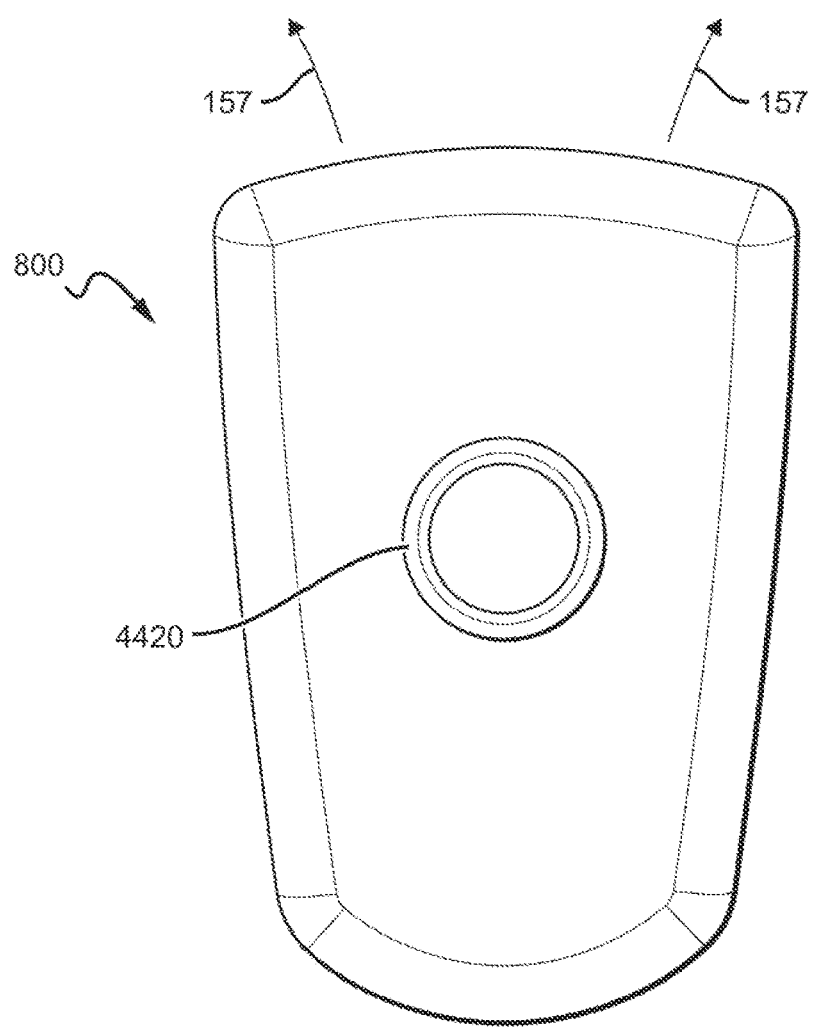

FIG. 12 is a front view of the unit 800 that illustrates knob or disc 4420 as well as thrust vectors 157. The taper shown, for example, in FIGS. 12 and 19 advantageously accommodates the stroke path of a proficient freestyle swimmer. In such a stroke, the forearm comes close to the abdomen and the hand comes close to the belly button as the swimmer's torse rotates at the end of a stroke. It is in this latter portion of the stroke that most of the swimmer's thrust is generated, and these embodiments advantageously provide minimal or no interference with the freestyle stroke of even the most proficient swimmer.

Figure 19:
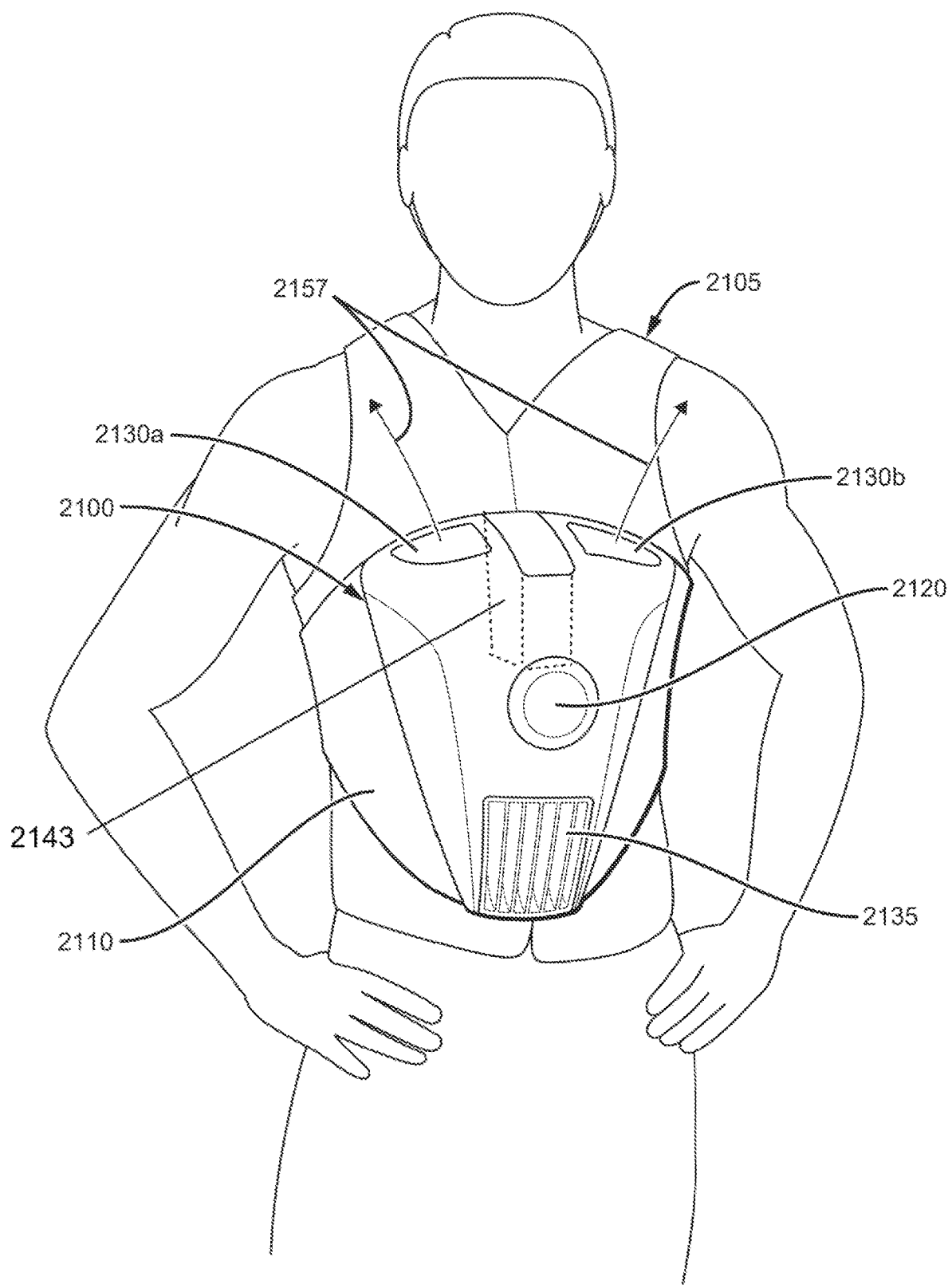
FIG. 19 is an illustration of a second embodiment of a swimjet system.

In the most preferred embodiments, the cross sectional area of the swim jet unit gradually reduces from the top of the device to the bottom of the device (in the orientation shown in FIGS. 12 and 19). FIG. 19 depicts a second embodiment in which the intake 2135 tapers gradually down to the waist of the swimmer, following the contour of the housing 2110. The cross sectional area taken in a horizontal plane gradually reduces at successively lower horizontal planar cross sections.

In a preferred embodiments, the average cross sectional area in the lower half of the unit is less than 20, 30, 40, 50, 60, 70, 80 or 90 percent of the average cross sectional area in the upper half of the unit. In the embodiment depicted in FIG. 19, the average cross sectional area in the lower portion of the swimjet unit (below the center of knob 2120) is less than 50% of the average cross sectional area in the upper portion of the swimjet unit (above the center of knob 2120). In the embodiment depicted in FIG. 12, the average cross sectional area in the lower portion of the swimjet unit (below the center of knob 2120) is less than about 65% of the average cross sectional area of the upper portion of the swimjet unit (above the center of knob 2120).

FIG. 19 illustrates battery location and configuration that may be used in various of the embodiments described herein. The single, centrally disposed intake 2135 and the two spaced apart outlets 2130a and 2130b leave space in between the outlet channels 2130a and 2130b that may be dedicated to a waterproof, removable battery. This configuration provides the advantage of positioning the battery, which is generally relatively heavy, close to the chest of the user, which reduces the amount of uncomfortable torque generated by the weight of the battery when the user is standing and outside the water. This location is also easily accessible by the user, which permits the battery to be changed, even in the middle of a workout session, without having to detach the swimjet unit from the vest 2105.

Figure 20:
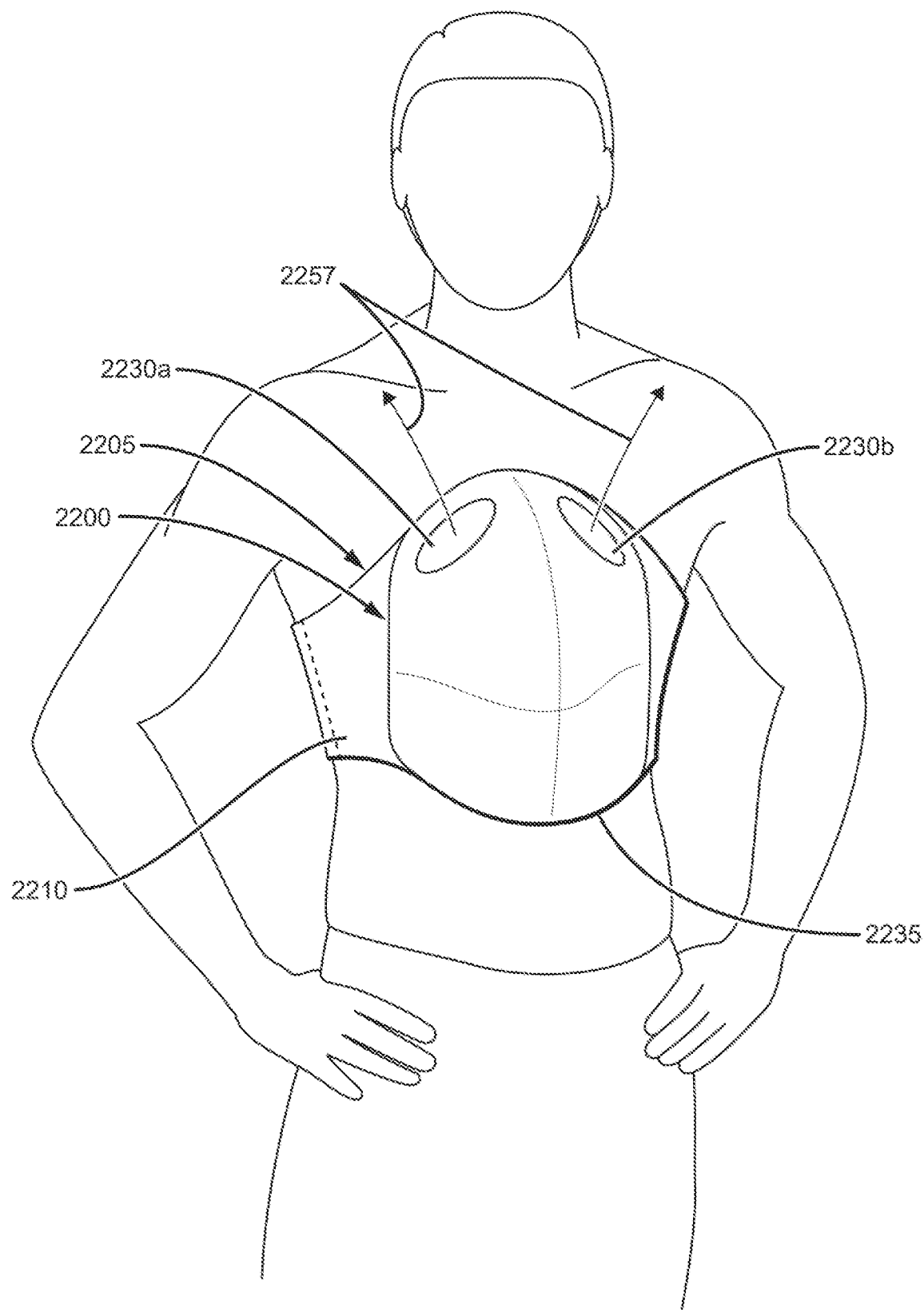
FIG. 20 is an illustration of a third embodiment of a swimjet system.

In the third embodiment, shown in FIG. 20, the intake 2235 faces downwardly (not shown) and the unit 2200 is equipped with a flexible band 2210. The unit 2200 is donned by tightening that band about the chest of the user with complimentary Velcro portions (not shown) or zipping a zipper (shown in a dashed line on the bank 2210).

Figure 21:
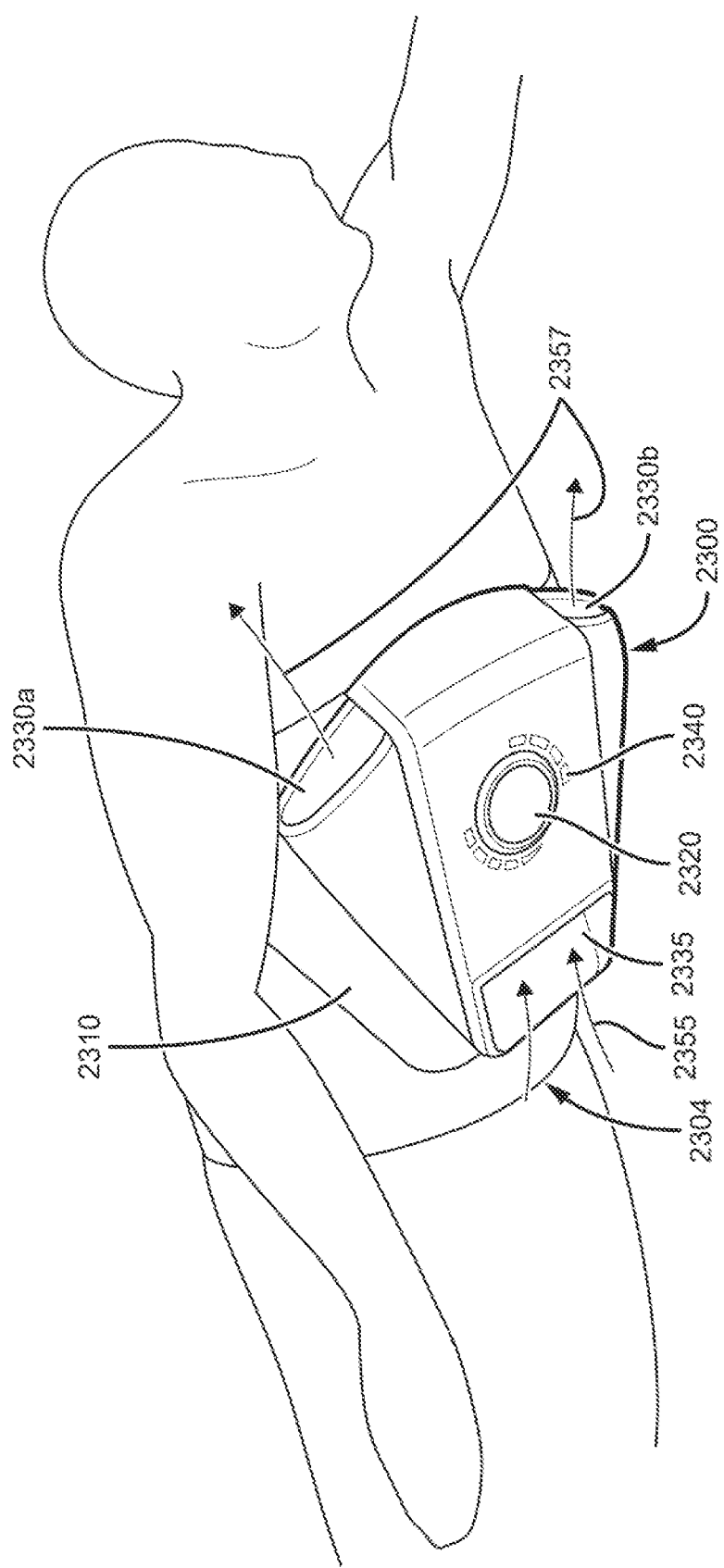
FIG. 21 is an illustration of a fourth embodiment of a swimjet system.
Figure 22:
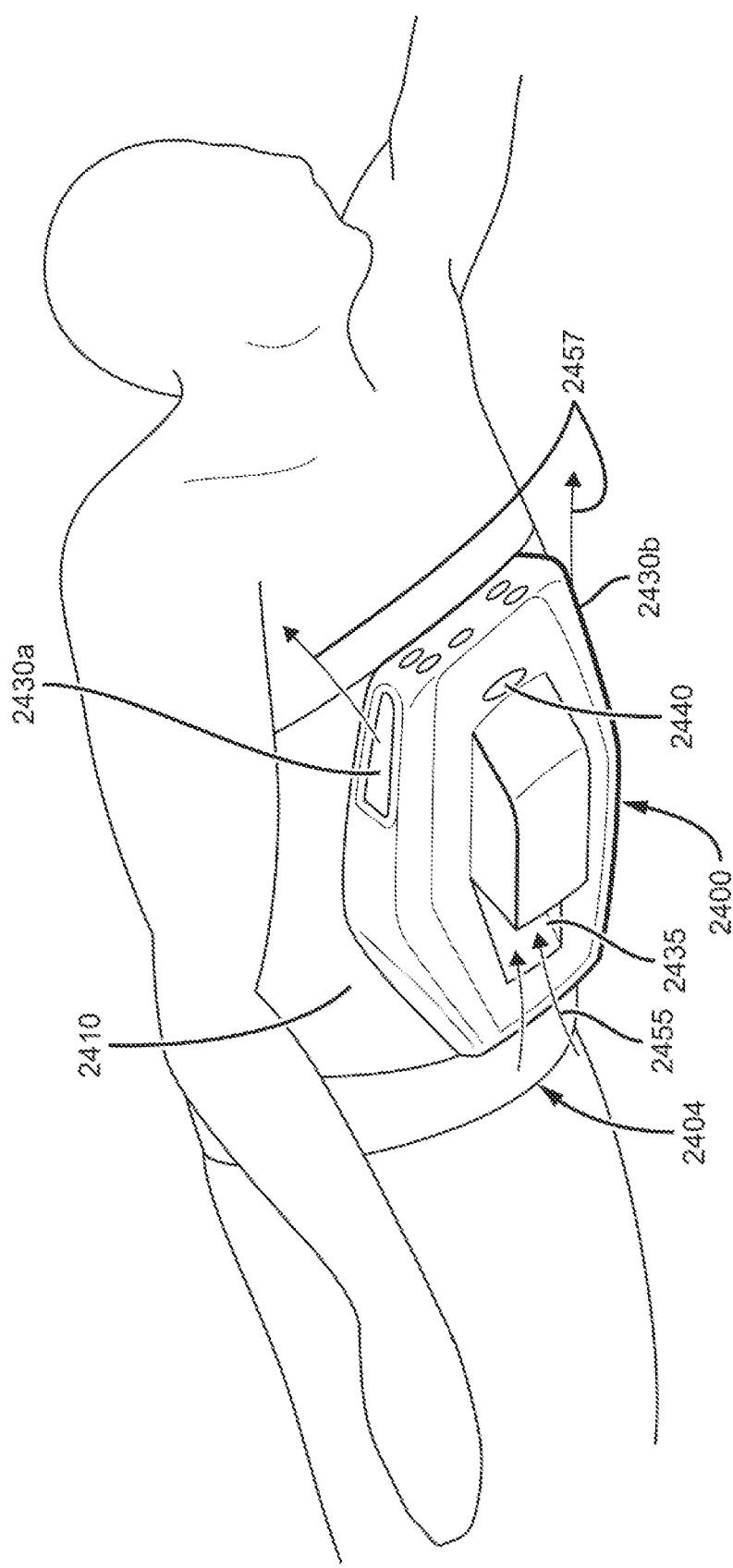
FIG. 22 is an illustration of a fifth embodiment of a swimjet system.
Figure 23:
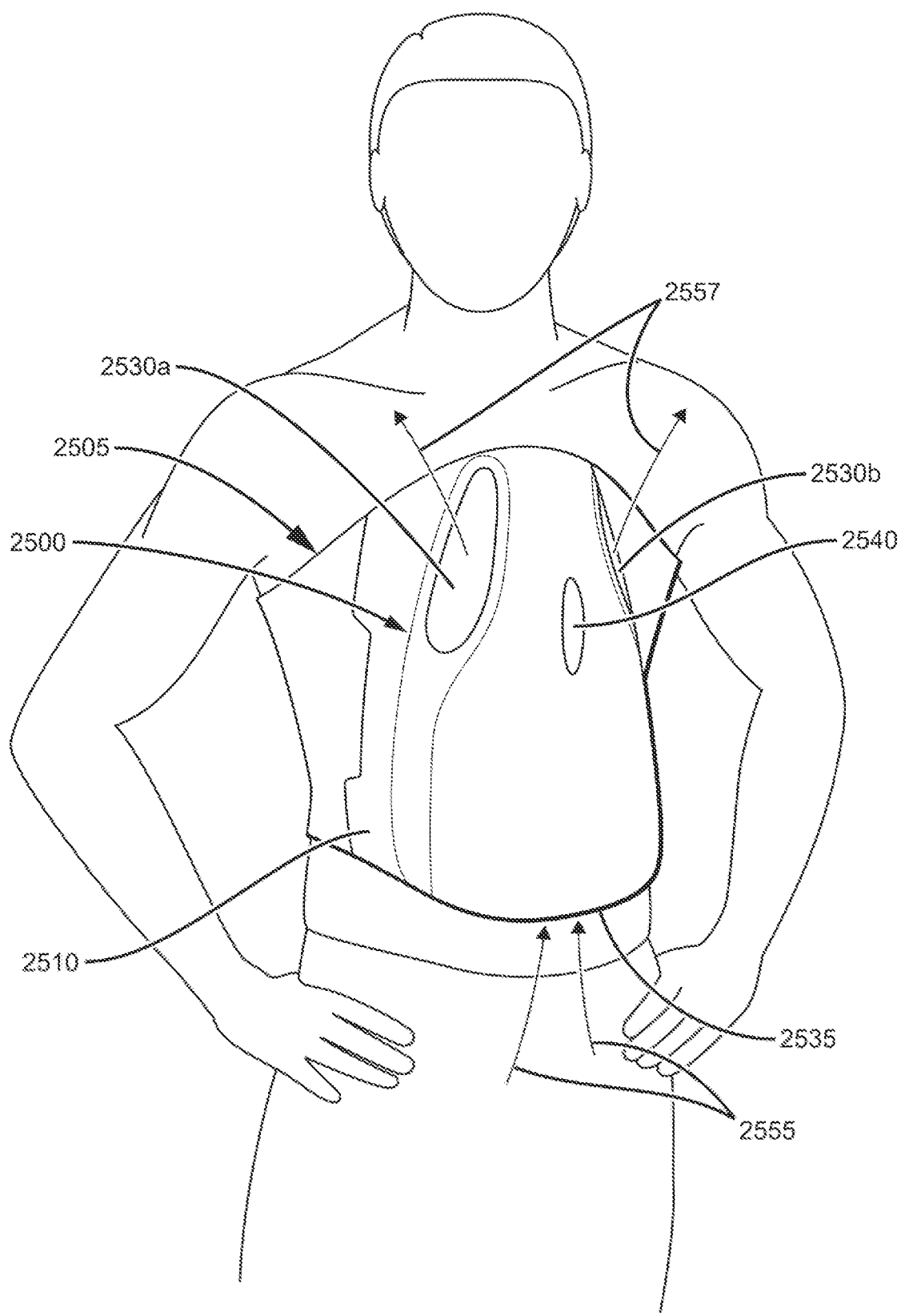
FIG. 23 is an illustration of a sixth embodiment of a swimjet system.
Figure 24:
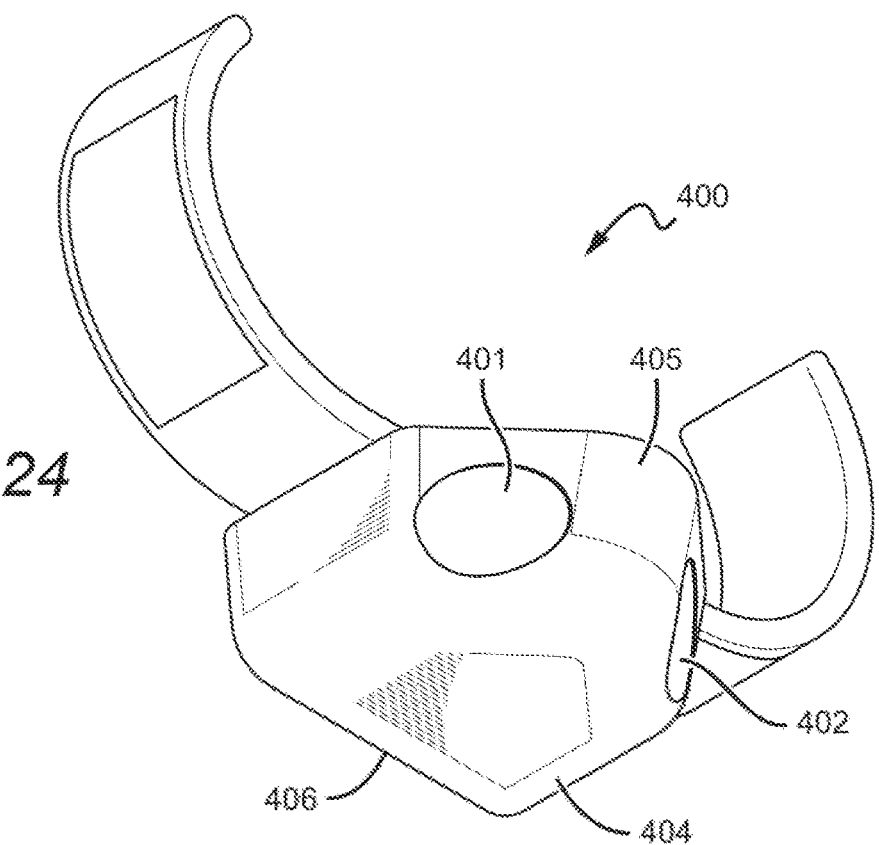
FIG. 24 is an illustration of a seventh embodiment of a swimjet system.
Figure 25:
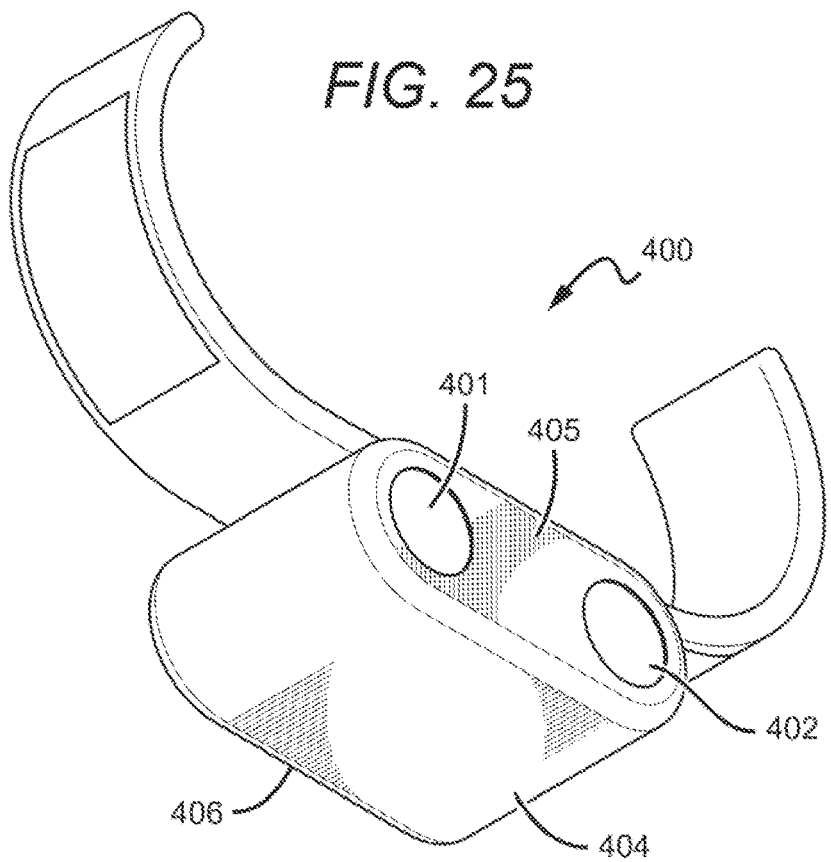
FIG. 25 is an illustration of a eighth embodiment of a swimjet system.
Figure 26:
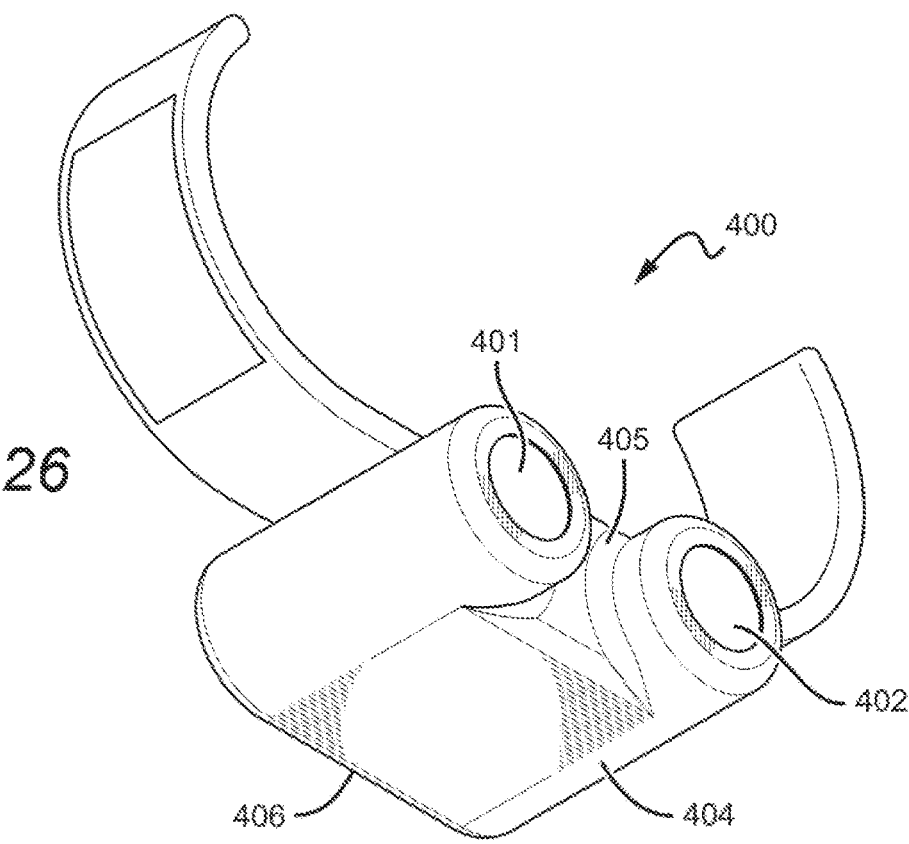
FIG. 26 is an illustration of a ninth embodiment of a swimjet system.

FIG. 21 shows a fourth embodiment having indicators 2340 on its frontal face and outputs 2330a and 2330b spaced further apart and an alternatively configured intake 2335. FIG. 22 illustrates a fifth embodiment having alternative configurations for the outlets 2430a and 2430b and intake 2435. FIG. 23 illustrates a fifth embodiment having still further alternative configurations for the outlets 2530a and 2530b and intake 2535. The fifth embodiments is equipped with flexible wings, akin to the first embodiment, and a flexible band in lieu of a vest.

Figure 46:
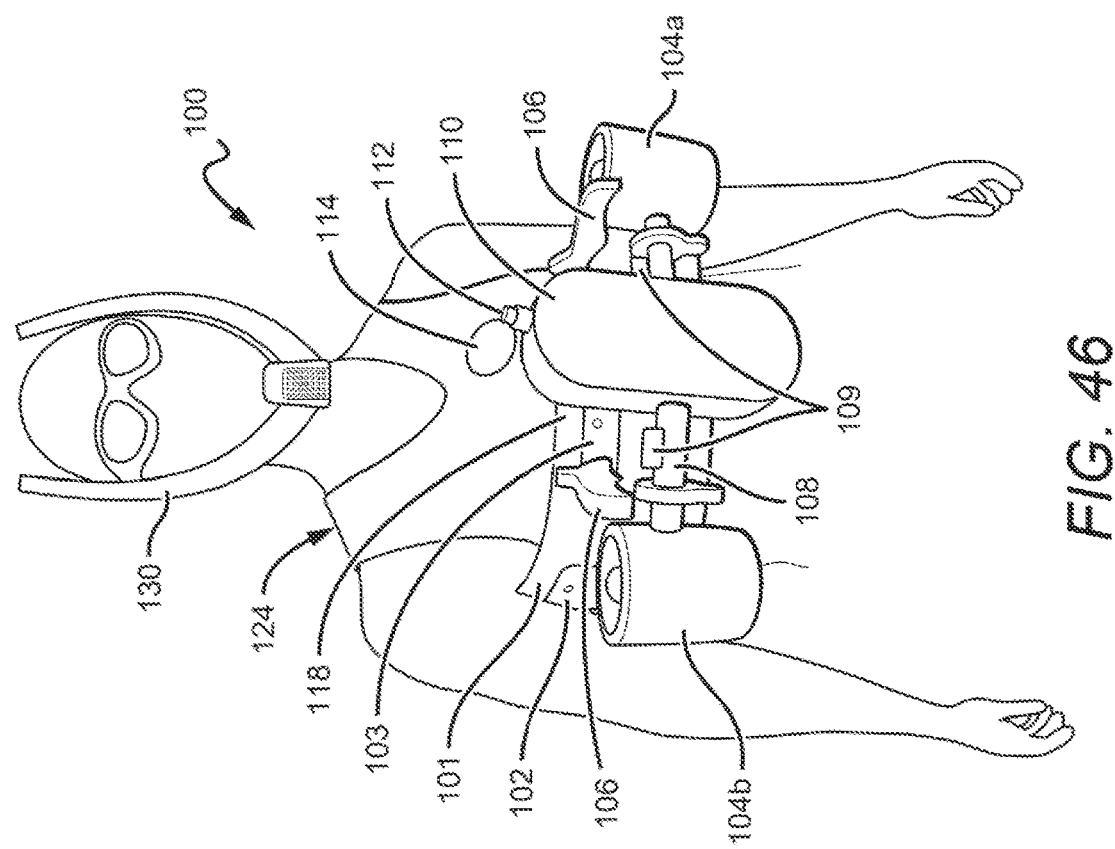
FIG. 46 is an illustration of a nineteenth embodiment of a swimjet system.

FIG. 46 illustrates a swimmer wearing a nineteenth embodiment of a swimjet system 100 that comprises a swim vest 124 and a swimjet system mounted thereon. The swimjet system includes a central body portion 110, left impeller 104a connected to the central body portion 110 by outrigger 108, right impeller 104b connected to the central body portion 110 by another outrigger 108. The outriggers are fixed to the central portion of the clamshell system by clamps 106. The clamps surround the outriggers 108 and are rigidly attached to a rigid substrate member 103. The rigid substrate member 103 is attached to a padded belt 101 that is preferably formed of a nylon outer layer enclosing a foam core. The padded belt is monolithic and extends from the distal end of the right clamshell element, through the central portion and to the distal end of the left clamshell element. The right clamshell element includes a rigid plastic member 102 that is formed to generally conform to the ribcage of the user. The padded belt 101 serves as a flexible joint between the right clamshell element 102 and the left clamshell element (not visible in FIG. 46). The left clamshell element has a structure similar to the right clamshell element and is correspondingly of a curved shape to generally conform to the left ribcage of the user. The left clamshell element, like the right clamshell element, is hingeably and pivotably attached to the center rigid element 103 by padded belt 101. The padded belt is held in place by hook-and-loop (e.g. Velcro) patches on the inner surface of the padded belt 101 and corresponding patches on the exterior of vest 124.

The central body portion 110 encloses battery components and a control system for the swimjet system. The battery system may include a waterproof charging port (not shown) and a plurality of battery modules within the central body portion 110. The control system receives control input and applies appropriate voltages and control signals to the impellers 104a and 104b, as described elsewhere herein.

The central body portion bears a coupling 112 for a manual inflator 114 that is fluidically connected to a bladder element (not shown), positioned behind center rigid portion 103 and in front of the padded belt 101. The bladder may be sandwiched between the portion 103 and padded belt 101. Inflation of the bladder element may provide additional buoyancy and may also tighten the fit of clamshell portions around the user, thereby more securely fixing the swimjet system in place. This may be useful, for instance, where higher reverse thrust is used. Increased bladder pressure may help prevent the impeller system from torquing clockwise in the orientation shown in FIG. 60, which would change the vector of the thrust and may cause user discomfort.

The user is equipped with a dual snorkel breathing system 130. The mouthpiece portion includes a two-way valve that provides inhalation of air in the upwardly extending tubes and exhalation through a vented portion on the bottom of the mouthpiece portion. By using such a snorkel system the user may keep his or her head pointed downwardly during a freestyle stroke, obviating the need to turn the head to take a breath.

Figure 47:
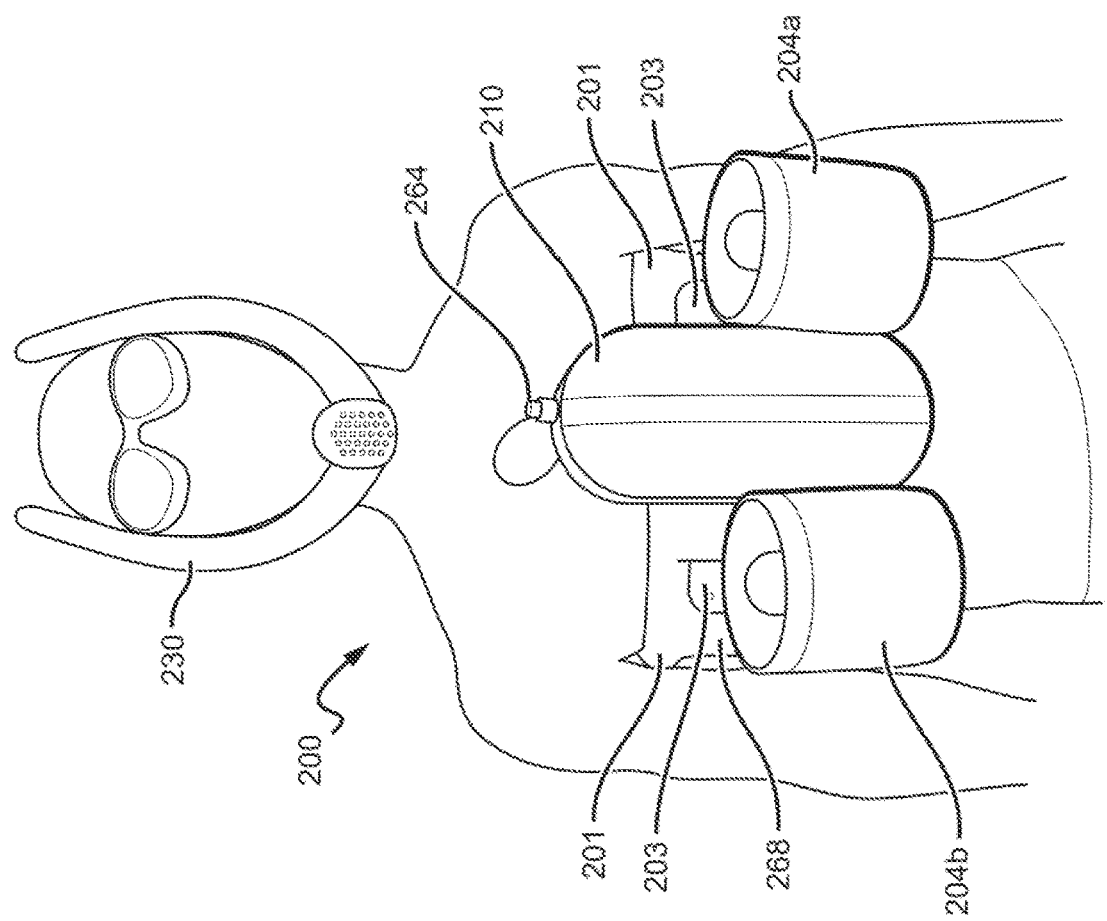
FIG. 47 is an illustration of a twentieth embodiment of a swimjet system.

Turning to FIG. 47, a twentieth embodiment 200 of the swimjet system is illustrated. This embodiment is constructed similarly to the nineteenth embodiment 100, the primary difference being that the impellers 204a and 204b are immediately adjacent the central body portion 210 and are not spaced apart therefrom by outriggers or beam members 108. Further, the user is wearing a band 201 instead of vest 124, both of which may be made of a closed-cell foam neoprene (wetsuit-type) material. The band 201, like vest 124, has on the outward facing surface thereof hook-and-loop fasteners that receive the clamshell portions, as described above.

The clamshell vest system may further include adjustable straps that extend from the top of center portion 103/203, over each shoulder, and down to the clamshell portions 102/202. These straps may be provided to help prevent the swimjet system from moving downwardly, toward the user's waist, during use or when outside of the pool, when the absence of buoyancy tends to cause the system to fall under the force of gravity.

Figure 48:
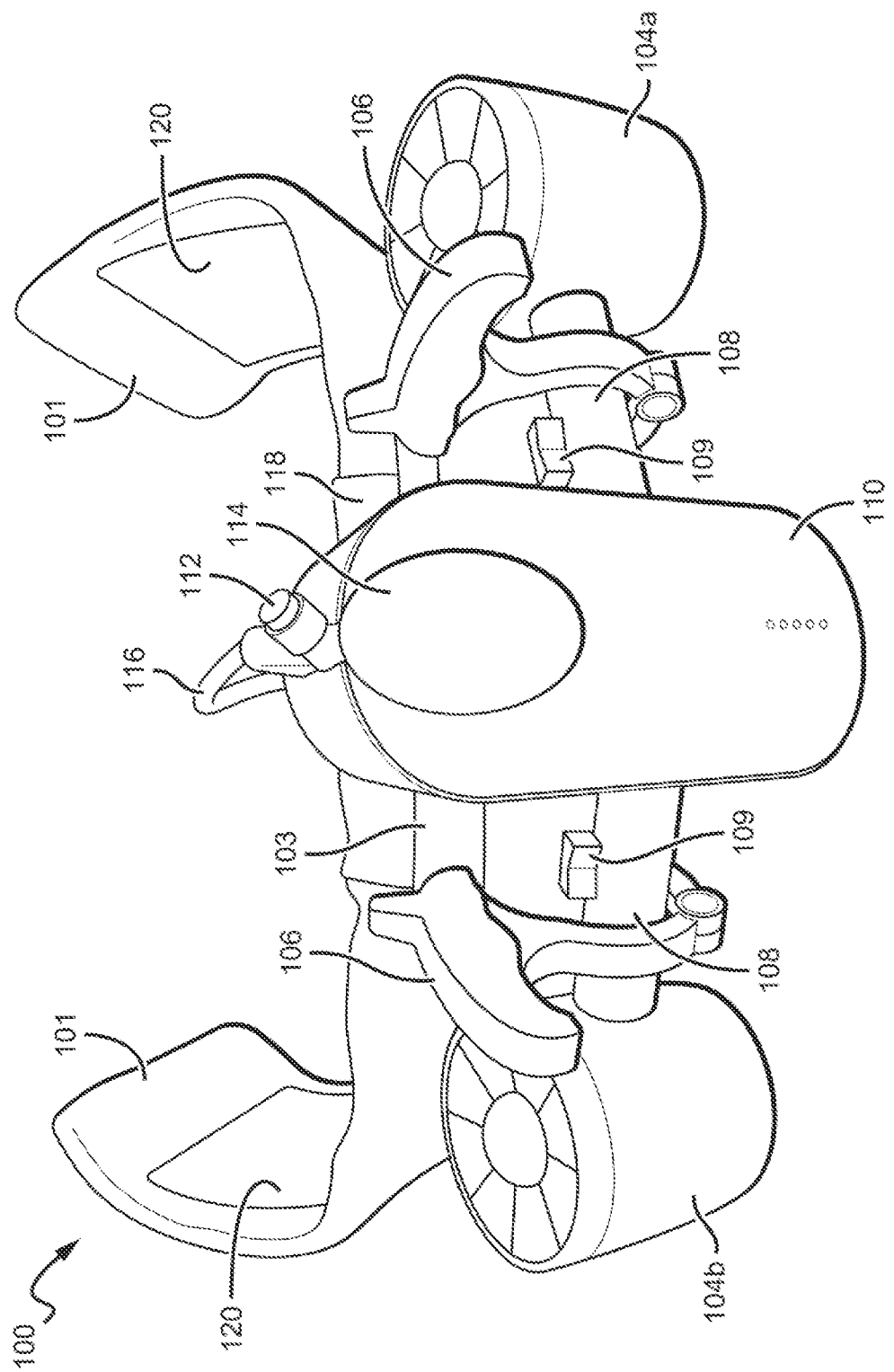

FIG. 48 provides an additional view of the nineteenth embodiment 100. In this view the orientation of clamps 106 may be seen more clearly. Also, the hand pump 114 is oriented outwardly, away from the chest of the user. A pressure release valve 112 is positioned between pump 114 and mounting bracket 116. A tube extends from pump 114, through bracket 116 and to the bladder element positioned between the center rigid portion 103 and padded belt 101.

The impeller housing may be spaced about 1, 2, 3, 4, 5, 6, 7 or 8 inches away from the center rigid portion 103, measured in a direction orthogonal to the center rigid portion. Given that the rigid plate, padded belt 101 and vest/band are collectively about one inch thick, the impeller housing may be spaced about 2, 3, 4, 5, 6, 7, 8 or 9 inches from the user's abdomen.

In the nineteenth embodiment 100, the impeller housing is spaced about 4 inches from the rigid plate 103, and about 5 inches from the user's abdomen or frontal rib cage. By contrast, in the twentieth embodiment 200 of FIG. 47, the impeller housing are spaced about 5 inches from the rigid plate 203, and about 6 inches from the user's abdomen or frontal rib cage.

Returning to the nineteenth embodiment 100, the central axis of each impeller 104a and 104b is positioned about 12, 13, 14, 15, 16, 17, 18, 19 or 20 inches from one another, most preferably about 16. In the second embodiment 200, the central axis of each impeller 204a and 204b is positioned about 6, 7, 8, 9, 10, 11, 12, 13 or 14 inches from one another, most preferably about 9 inches. The impellers themselves (not shown) have an outer diameter of about 2, 3, 4, 5, 6, 7 or 8 inches, most preferably about 4 inches.

As noted above, this spacing may facilitate provision of laminar flow to and through the impellers 104a and 104b, 204a and 204b. If the impellers are positioned immediately adjacent the rigid plate 103, 203 or padded belt 101, in certain configurations the boundary layer effect may impede the laminar flow of water into the bottom of the impellers and out the top of the impellers. For a given power usage, the amount of reverse thrust may be reduced and turbulent flow will be created proximate the legs, face and arms of the user while swimming. As discussed above, such turbulent flow reduces stroke and kick effectiveness and can impede breathing, especially when the user is not using a snorkel apparatus 130.

The spacing will also affect the amount of torque applied by the impellers on rigid plate 103, 203. When the impellers thrust forward (upward in FIGS. 46-47), that tends to push the central body portion using 210 downward or towards the feet of the swimmer, creating a clockwise torque in the orientation shown in FIG. 60. That torque may cause substantial discomfort, which is alleviated by the padded belt 101 together with the force-spreading effect of rigid plate 103, 203 and the bladder element. In currently preferred embodiments, the impeller housings are spaced, about 3, 4, 5 or 6 inches from the abdomen of the user or about 2, 3, 4 or 5 inches in front of the rigid plate 103, 203.

In various embodiments, the rigid center portion 103, 203 and rigid clam shell portions 102, 202 are made of fiberglass, polyurethane, Kevlar, or aluminum in preferred embodiments. Such constructions provide the necessary structural rigidity and corrosion resistance at a low weight. Embodiments using polyurethane commonly used in commercial shin guards and shoulder pads are particularly preferred, as this material provides a degree of flexibility that permits the clamshell portion to bend slightly to conform to larger ribcages while not unduly impeding ribcage expansion during respiration.

FIG. 50 is a further illustration of the first embodiment of the swimjet system. In this figure additional detail of the foam-core padded belt 101 can be seen. The rigid clamshell portion 102 is fastened to at least one layer of the padded belt 101. On each outrigger is an optional button 109 that controls the impellers 104a, 104b. One button may turn the impellers on and the other may be used to control the motor speed. In other embodiments, and as described below, the system may turn on automatically when an accelerometer in central body portion 110 detects that the system is positioned substantially horizontally and off when the system is positioned substantially vertically.

Figure 17:
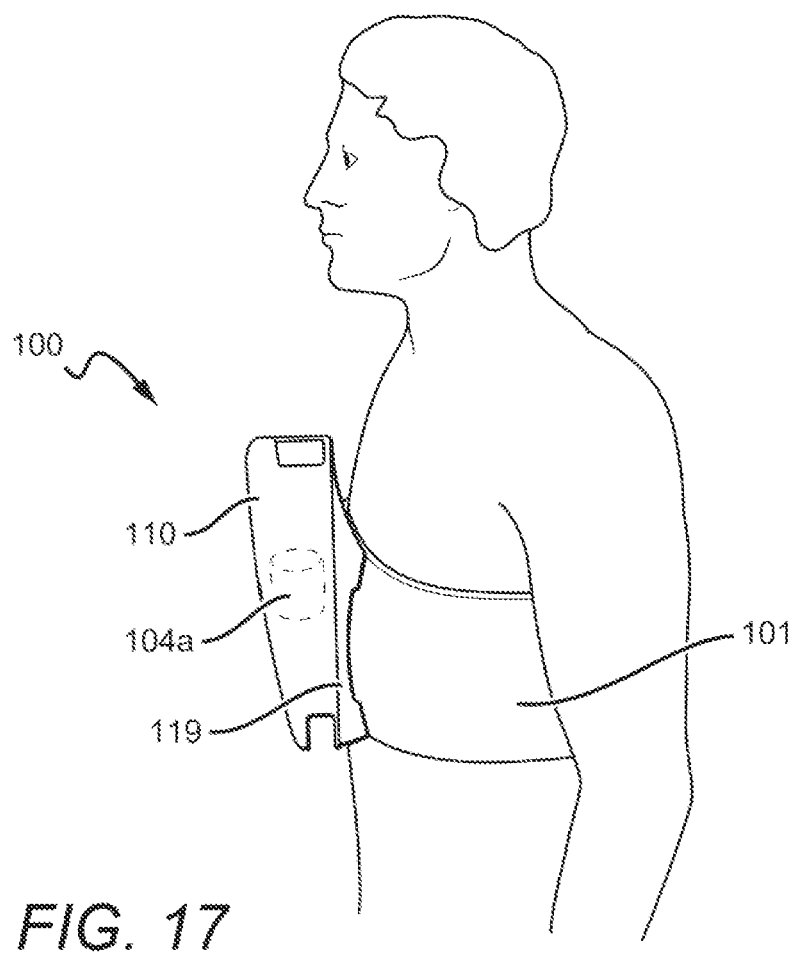
FIGS. 17-18 are illustrations of upper torso orientations in which the impellers are deactivated or activated, respectively, by orientation detecting means.
Figure 18:
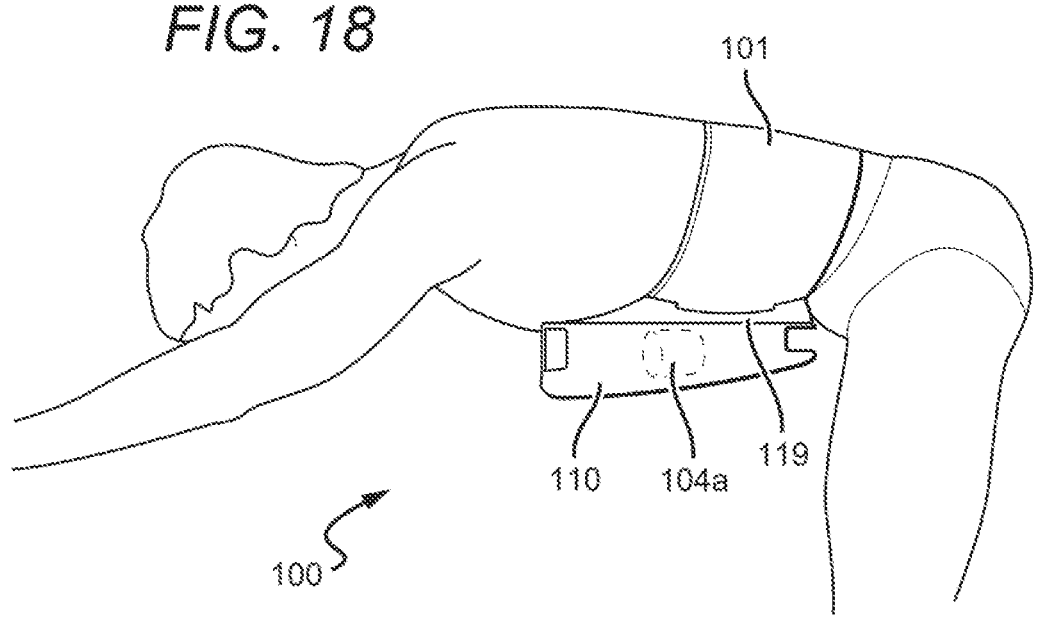

FIGS. 17-18 depict a variant in which accelerometers or a position detection switch 186 such as mercury switch inside the central body portion 110/210/310 detect whether the swimjet system is in a vertical or horizontal position. The user may select an orientation, for example about 10, 15, 20, 25, 30, 35, 40, 45, 50, 55, 60, 65, 70, 75, 80 or 90 degrees from vertical (90 degrees from vertical being completely horizontal), at which the swimjet system will activate. The user's selection may be set by a knob positioned adjacent buttons 109 or via the smart watch application. When the user begins to swim and assumes a substantially horizontal position the swimjet system will activate at the thrust force and direction (vector) selected by the user or the training/VR application controlling the swimjet system. In one example, upon reaching the end of the pool or another distance objective, the swimmer performs a non-flipping turn in which the upper torso assumes a generally upright or vertical position (less than 45 degrees from vertical). When in that position the reverse thrust is deactivated until the swimjet system detects that it has returned to a horizontal or swimming position. After pushing off the wall, the swimmer regains this orientation and the reverse propulsion system reactivates.

This auto-on and auto-off functionality can provide substantially improved safety as well. By setting the switching point to an angle of about 65 degrees from vertical, for example, an inexperienced to physically compromised swimmer may stop the swimjet system simply by pitching themselves upwards in the water by assuming a dog paddle position. Assuming a position having a pitch of about 25 degrees or less is a natural reaction when a swimmer ingests water or otherwise feels unable to breathe or out of control or is starting to panic. In this manner, the swimjet system may be prevented from creating a thrust of water toward the head region of the swimmer when the swimmer is in an emergency or panic situation.

Figure 49:
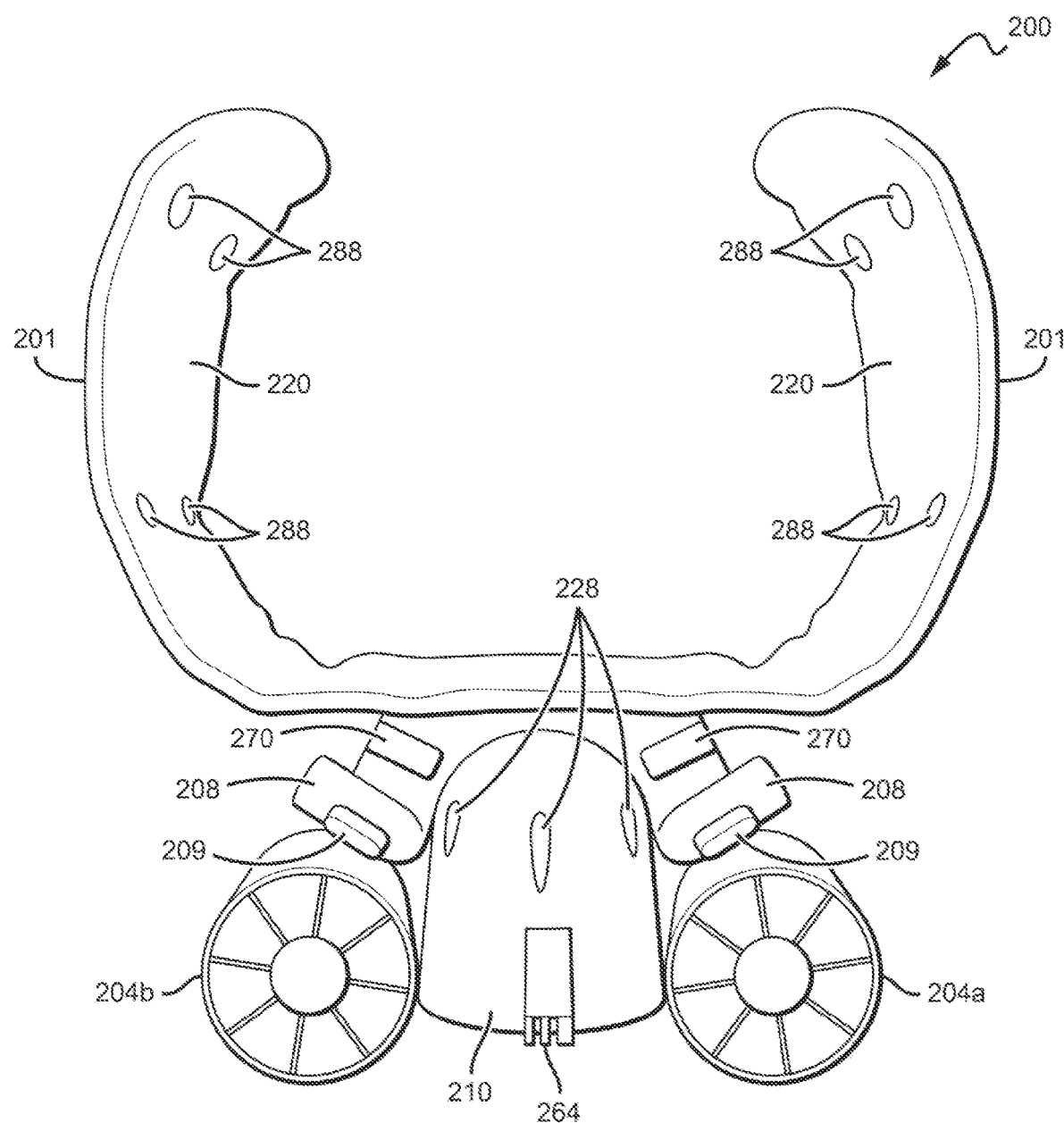

FIG. 49 is a further illustration of the twentieth embodiment of the swimjet system. In the depicted variant, beams 108/208 are present but may be removed in other embodiments, permitting the impeller central body portions 204a and 204b to be positioned closer to rigid plate 203. In this variant the swimjet system is mounted to rigid plate 203 at bracket or strap 270.

In FIG. 52, air bladder 118 may be seen positioned between padded belt 101 and rigid plate 103. It should be noted that rigid plate 103 may have a curved shape that generally conforms to a user's ribcage or upper front abdominal area. Hand pump 114 is shown extending outwardly, away from the user. In this variant, the pump 114 is preferred returned to a stowed position (toward the user) after inflation (or deflation) is complete. Velcro pads 120 are positioned on the interior of each clamshell portion and the interior of the center portion 103.

Herein, the rigid clamshell portions 102/202, rigid center plate 103/203, and foam-core or padded belt 101 will be collectively referred to as the "clamshell belt system." The "swimjet system" includes the central body portion 110/210 and the impeller units 104a and 104b/204a and 204b. The system thus has in the illustrated embodiments two primary sub-parts: the clamshell belt system and the swimjet system.

The swimjet system may have a weight of about 2, 3, 4, 5, 6, 7, 8, 9, 10, 11, 12, 13, 14 or 15 pounds, most preferably about 6 pounds. The overall width of the swimjet system (in a direction parallel to the waist or beltline when worn) may be about 12, 13, 14, 15, 16, 17, 18, 19, 20, 21, 22, 23 or 24 inches, most preferably about 16-19 inches. The overall height of the swimjet system (in a direction parallel to the centerline of the swimmer) may be about 7, 8, 9, 10, 11, 12, 13, 14, or 15 inches, most preferably about 8-10 inches. The overall depth of the swimjet system (in a direction perpendicular to the centerline of the swimmer) may be 2, 3, 4, 5, 6, 7, 8, 9, 10, 11 or 15 inches, most preferably about 4-8 inches.

The battery capacity of the swimjet system may be about 50, 60, 70, 80, 90, 100, 125, 150, 175, 200, 225, 250, 275, 300, 325 or 350 Watt hours, preferably at least about 100 Wh. This provides repulsion for about 10, 20, 30, 40, 50, 60, 70, 80, 90, or 100 minutes at full power, preferably at least about 30 minutes. The battery may preferably be a rechargeable lithium ion battery that is charged through a USB style charging port on central body portion 110/210. The thrust of the swimjet system may be about 5, 10, 15, 20, 25, 30 or 35 pounds at full power, most preferably about 20-25 pounds.

FIGS. 50-51 are illustrations of the nineteenth and twentieth embodiments of the swimjet system in a fully open configuration, as would be the case if the swimjet system was laying flat on a horizontal surface. The clamshell belt system can open in this fashion because the textile member 101/201 provides a flexible hinge-like connection between the clamshell portions 102/202, rigid center plate 103/203.

Figure 16:
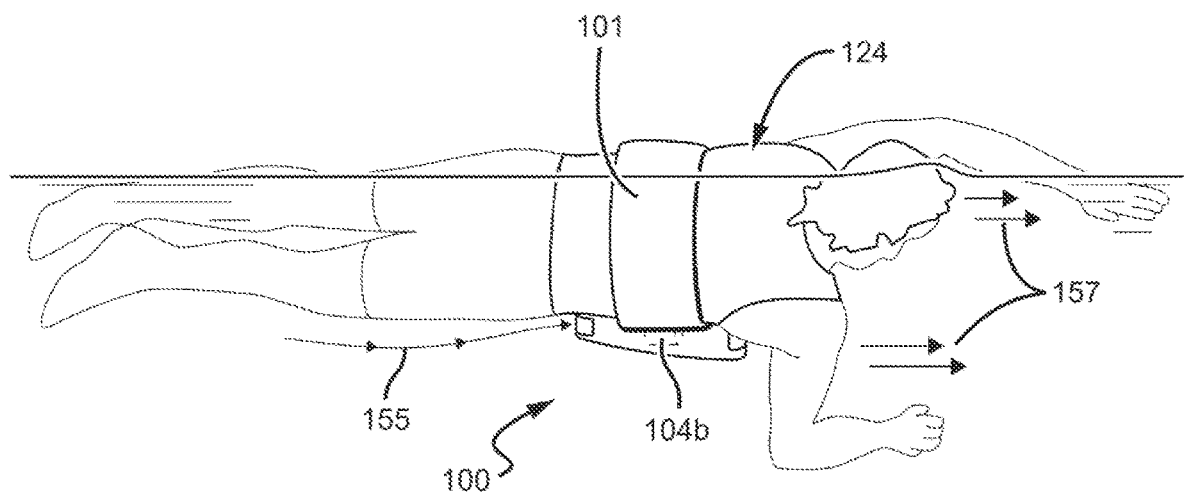
FIG. 16 is a side underwater view of a swimmer performing a freestyle stroke while wearing the first embodiment of the swimjet system.
Figure 60:
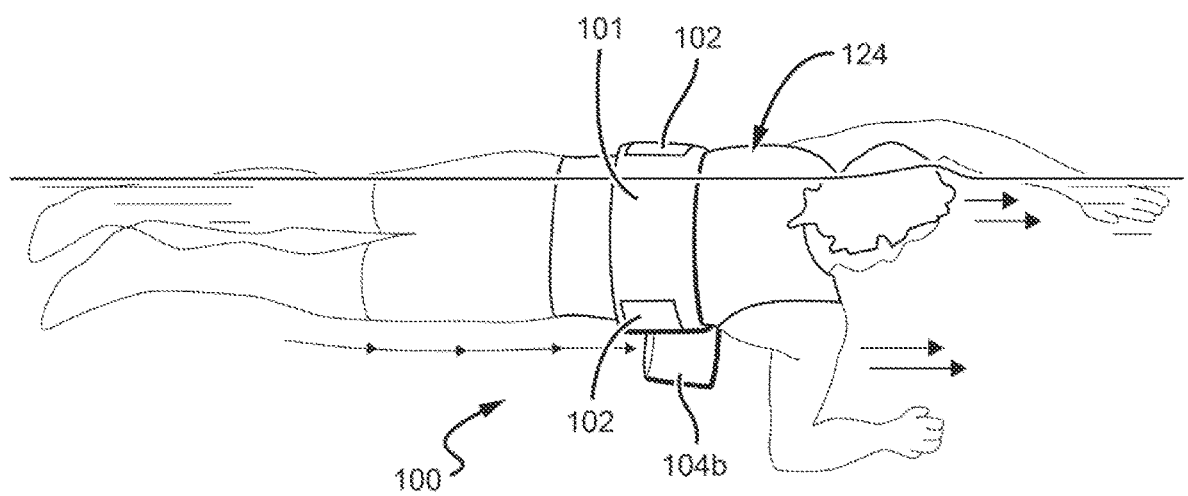

FIGS. 14-16 and 58-60 are illustrations of the first and nineteenth embodiments of the swimjet system in use. These figures depict a user performing a freestyle stroke with the exception of FIGS. 14 and 58, which illustrate a breaststroke. When a swimmer assumes a horizontal position in the water, the accelerometer triggers the swimjet system to activate. The speed of the system is controllable by the user actuating one of the buttons 109 or their smart watch, as described in the following sections. With reference to FIGS. 16 and 60, the water is drawn by the impellers from the left, under the user's legs, through the impeller central body portions and pushed to the right past the left and right sides of the user's face, as shown by the parallel arrows proximate the arms of the swimmer.

During a freestyle swimming stroke, for instance, this provides substantially laminar current under both the user's legs and in the areas adjacent and in front of the user's head where the freestyle arm stroke enters the water. This substantially laminar current makes the user's strokes and kicks more effective relative to swim-in-place systems. The user does not need to "outkick" his or her stroke in order to keep the feet properly elevated. In conventional swim-in-place systems, the user generally needs to kick much faster than the arm stroke would normally require or call for. The user must therefore kick faster than is appropriate for his or her arm stroke in order to keep the feet elevated. The swimjet systems described may be configured to overcome that problem in various embodiments.

The laminar flow in the region around the user's head increases the effectiveness of the stroke because the water is not turbulent. Strokes in turbulent water generate less force than those in laminar currents or stationary water. Turbulence in the region around the user's head can also distort the user's vision and make it more difficult to breathe. As discussed above, conventional swim-in-place systems can cause substantial turbulence in this region which increases the likelihood that a user inhales water when taking a breath.

Figure 14:
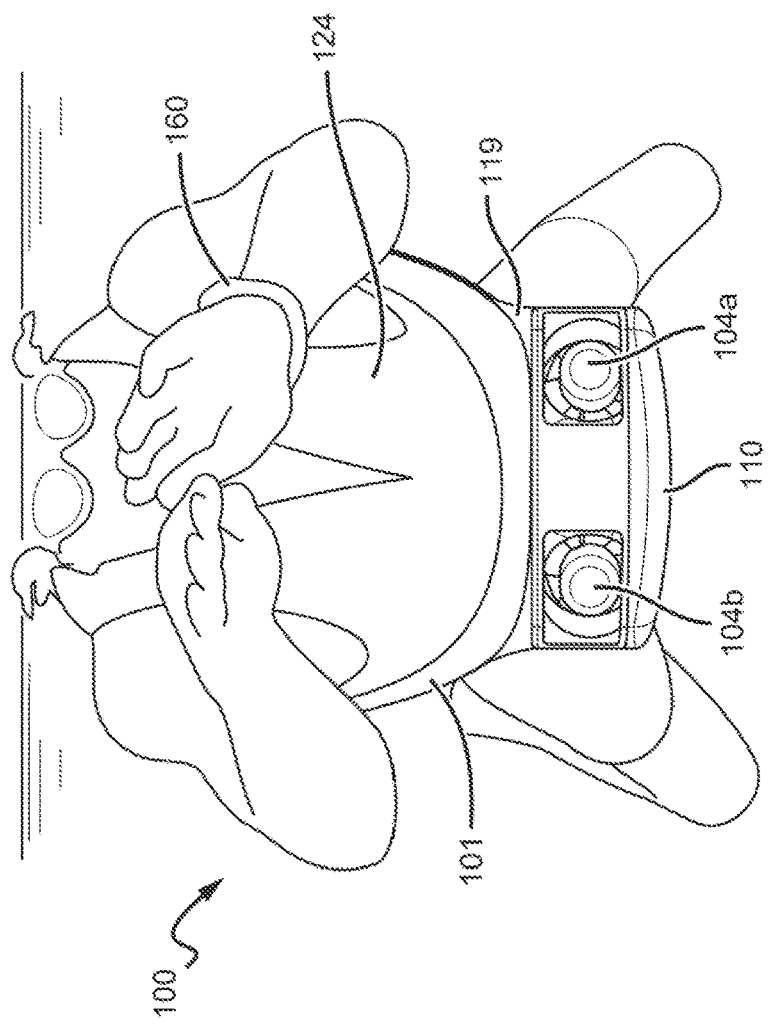
FIG. 14 is a frontal underwater view of a swimmer performing a breast stroke while wearing the first embodiment of the swimjet system.
Figure 15:
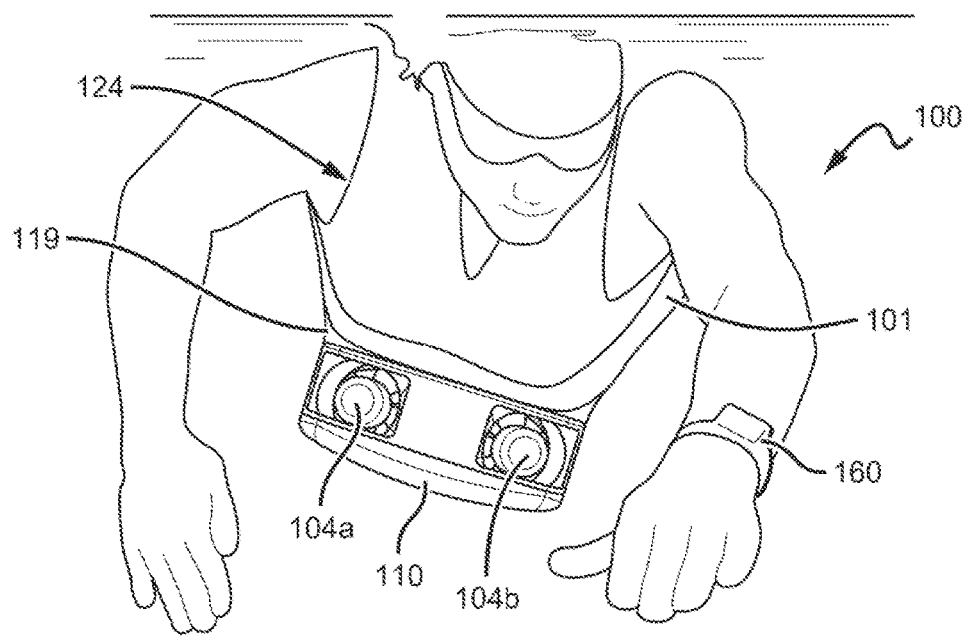
FIG. 15 is a frontal underwater view of a swimmer performing a freestyle stroke while wearing the first embodiment of the swimjet system.
Figure 58:
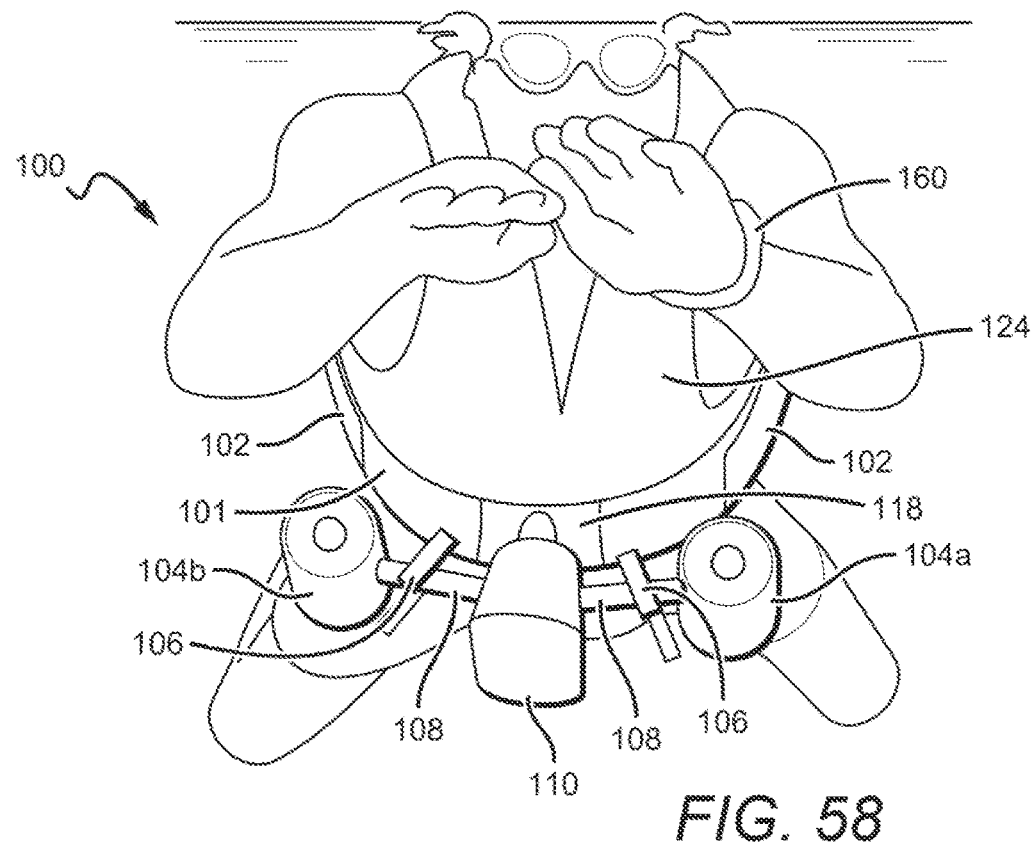
FIGS. 58-60 provide various views of a user swimming with the swimjet of the nineteenth embodiment.
Figure 59:
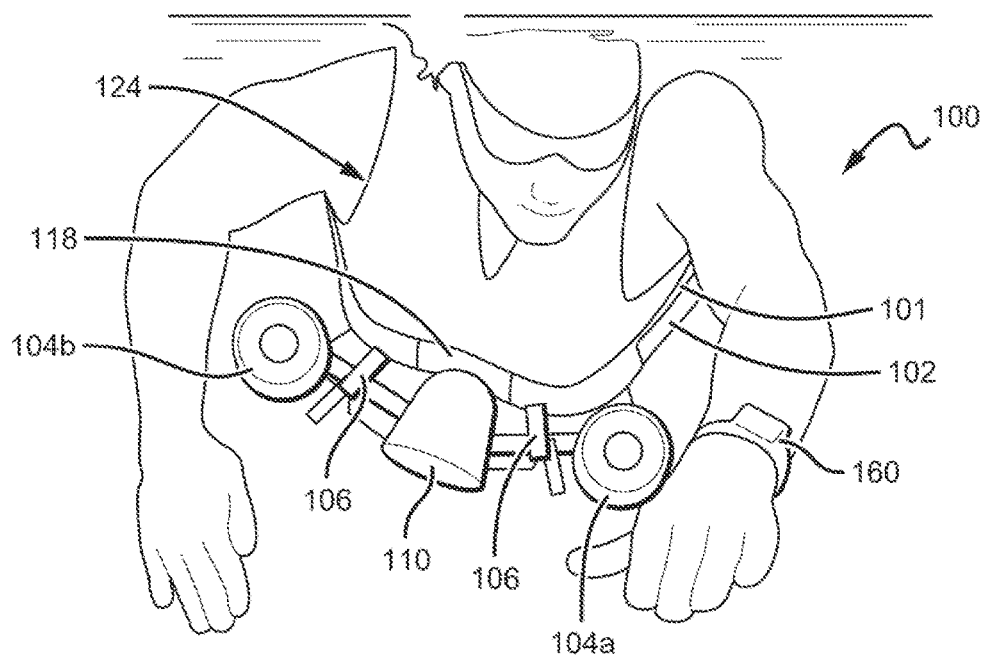

The system described herein may be used for freestyle, breast and fly strokes. The breaststroke is illustrated in FIGS. 14 and 58. A fly stroke will bring the user's shoulders out of the water, but the impellers remain sufficiently deep in the water to provide relatively constant reverse thrust of the selected power.

Returning to FIGS. 16 and 60, the system provides laminar flow under the user's legs and shoulders. Provision of two impellers generally aligned with each of the user's shoulders optimally promotes laminar flow under each leg, which substantially avoids the leg drop problem associated with conventional swim-in-place systems. As shown, the natural twist of the upper torso while swimming promotes this function by pulling one impeller system down and toward the centerline of the swimmer and under the legs of the swimmer during at least a portion of a freestyle stroke. This provides increased current flow under the legs. At the same time the other impeller system is pushed further away from the centerline of the swimmer, thereby increasing the laminar current flow in the area of the arm strokes, which improves the effectiveness of each stroke. In this fashion the reverse propulsion system can provide optimally increased current under both the legs of the swimmer and both arm stroke regions without directing any uncomfortable current at the mouth and nose of the swimmer.

In one currently preferred method of use, the swimmer first selects an amount of reverse thrust that permits the swimmer to make slow forward progress against the reverse thrust. Upon starting to swim, the user's torso and thus the swimjet system will assume a generally horizontal position. Upon detection of that substantially horizontal orientation, the impeller systems begin to spin and provide the selected amount of reverse thrust. In one example, the swimmer requires forty strokes to traverse a seven meter residential swimming pool, thereby effectively extending the residential swimming pool to serve the same purposes as a twenty-five meter or longer lapping pool. Upon reaching the end of the lane, the swimmer performs a non-flipping turn in which the upper torso assumes a generally upright or vertical position. When in that position the reverse thrust is deactivated until the swimjet system detects that it has returned to a horizontal or swimming position. After pushing off the wall, the swimmer regains this orientation and the reverse propulsion system reactivates.

Figure 13:
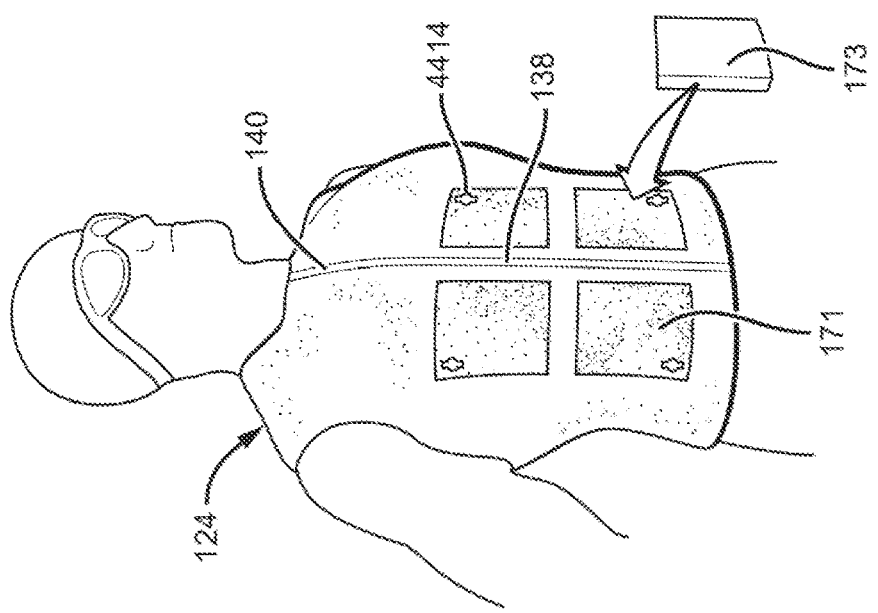
FIG. 13 is one embodiment of a wearable vest for receiving the swimjet system.

FIGS. 13 and 53-54 are illustrations of a vest for use with the various embodiments of the swimjet system. In the vest 124 has Velcro portion 125 on its exterior that receives or attaches to the complementary Velcro patches 120 on the clamshell belt system. The vest 124 may also have additional Velcro portions or pockets 171 to receive foam or other buoyancy providing elements 173 (anything with a density less than water).

It will be appreciated that buoyancy providing elements 173 are better suited for use with the seventh to twentieth embodiments, in which a clamshell portion is used to attach in front of the sternum of the user, which leaves the lower Velcro patches available for installation of elements 173. In the first through sixth embodiments, the swimjet unit covers all four Velcro pads on the vest or band.

In the case portions 171 are Velcro, the buoyancy providing elements 173 are provided with complementary Velcro layers on their inwardly facing sides. In the first through sixth embodiments, swimjet unit also is likewise provided with complementary Velcro layers on its inwardly facing side.

The elements 173 may alternatively have a circular, oval or rectangular shape. Optionally a single element 173 may have a width sufficient extend across the area of both portions 171. Elements 173 are preferably about 0.5, 1, 1.5 or 2 inches thick. In a further alternative embodiment, elements 173 are one or more air bladders coupled to one or more hand pump systems 112/114/116 attached to the vest 124. In another embodiment, the vest 124 can be part of a wetsuit that can include additional Velcro portions or pockets 171 on the leg portions of the wetsuit to receiving buoyancy providing elements 173 to increase the buoyancy effects. In some implementations, the vest 124 may have a shortened length such that it extends to a position above the waist such as just below the rib cage. In some examples where the vest 124 has a shortened length, the pockets 171 for buoyancy elements 173 may be shifted upward on the chest, to the sides, or to the back of the vest 124.

Figure 57:
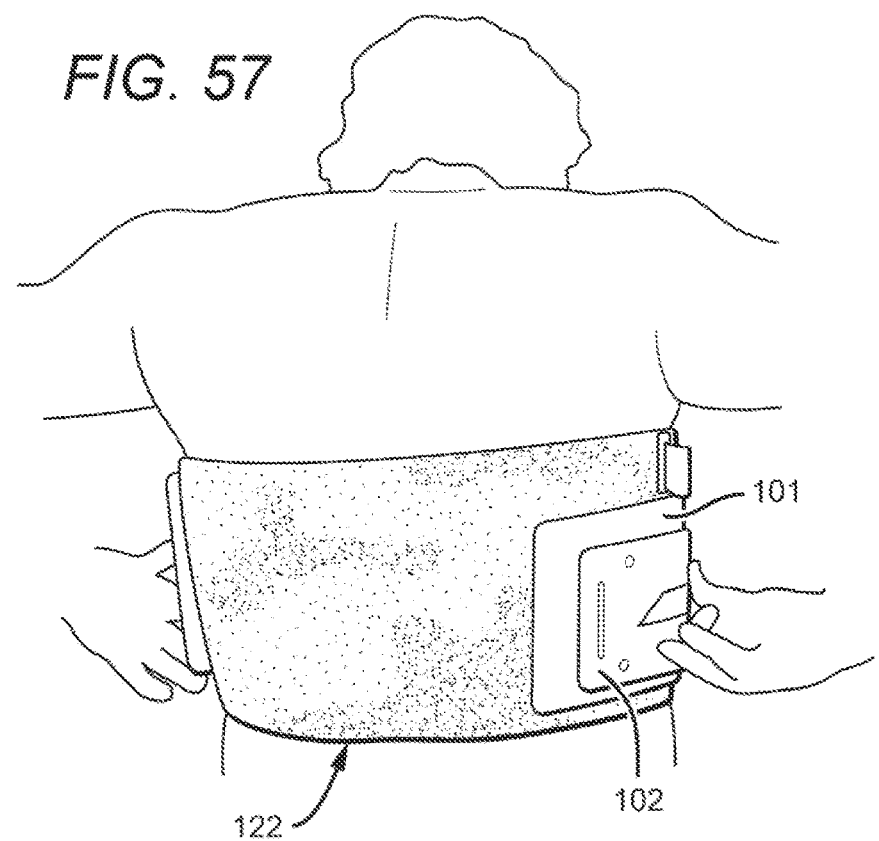

In FIGS. 55-57 illustrate a wrap or belt 122 has Velcro on its exterior that receives the complementary Velcro patches 120 on the clamshell belt system. The wrap or belt may be desirable in higher water temperatures and may provide increased comfort for certain users, whereas the vest may be preferred in lower temperatures and may provide increased comfort for other users.

Figure 38:
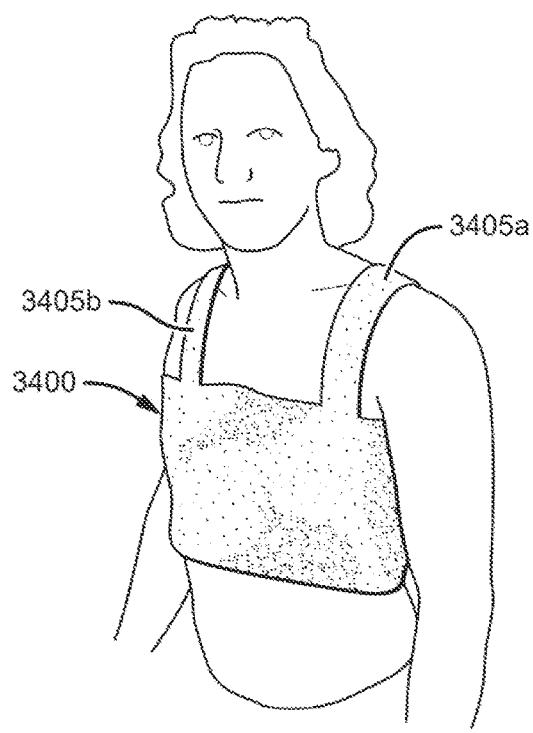
FIGS. 38-39 are illustrations of yet another embodiment of a wearable garment to receive a swimjet system.
Figure 39:
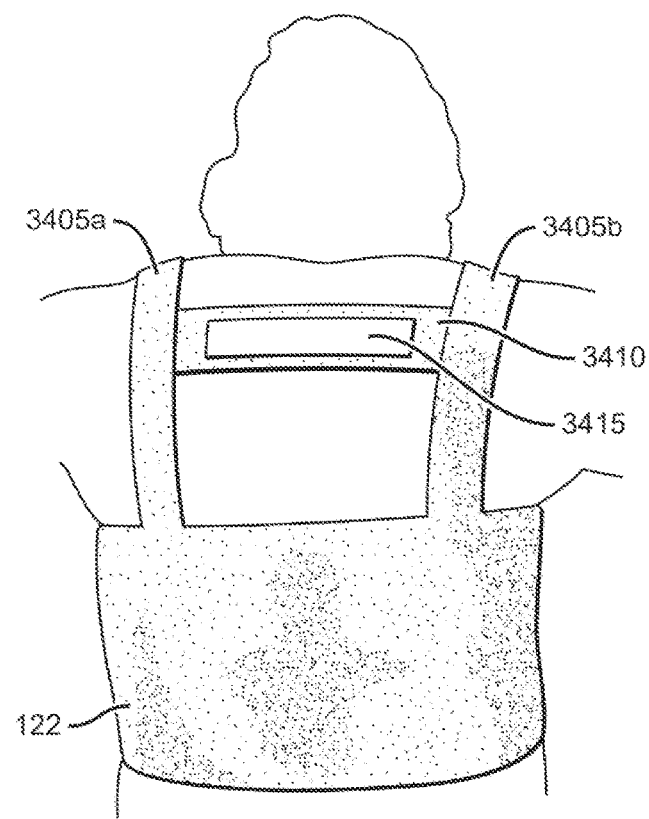

In FIGS. 38-39, the wrap or belt 122 includes a harness 3400 with straps 3405a, 3405b that extend over the shoulders of the swimmer to prevent the wrap 122 from shifting downward as the user swims. In some implementations, the shoulder straps 3405a, 3405b may be adjustable to position the wrap 122 at the desired location on the torso of the swimmer. For example, the adjustable straps 3405a, 3405b may include a belt-like notch-system to adjust the strap length. In some examples, the harness 3400 includes a cross-strap 3410 that extends laterally across an upper back of the swimmer and connects the right shoulder strap 3405b to the left shoulder strap 3405a. The cross-strap 3410, in some embodiments, assists in maintaining the position of the shoulder straps 3405a, 3405b during a swim session and can reduce any twisting or shifting that may occur. The cross-strap 3410 may include at least one rigid portion 3415 that provides structural support to the harness 3400. In some examples, the rigid portion 3415 may be made of fiberglass, polyurethane, Kevlar, or aluminum in preferred embodiments. Such constructions provide the necessary structural rigidity and corrosion resistance at a low weight.

FIGS. 56-57 illustrate a method of donning a swimjet system equipped with a clamshell belt system (e.g., the seventh through twentieth embodiments). The user holds the clamshell belt system and presses the center portion 103/203 against the sternum area and the clamshell portions against the sides of their ribcage. The Velcro portions 120 hold the swimjet system firmly in place until the user removes the clamshell belt system by first pulling the ends of the belt system away from the sides of their rib cage and then pushing the belt system away from their sternum to detach the Velcro patch 120 at the center portion. In another embodiment, instead of the Velcro portions 120, the swimjet system may be held in place by a ratcheting buckle/strap assembly that can be adjustably secured around a ribcage of the user.

The swimjet system may alternatively be mounted to the legs of the user. In such an embodiment, the impellers are mounted to the lateral sides of the users legs. In one version of such an embodiment, two swimjet systems may be provided that are essentially each miniaturized versions of the impellers in the nineteenth and twentieth embodiments. Instead of attaching to a vest or band, the clamshell attaches to Velcro on the thigh portion of neoprene shorts. The Velcro portion surrounds each thigh just as the Velcro portion 122 surrounds the torso.

In another version, one or more impellers is mounted to a flexible neoprene band sized to fit snugly around a swimmer's thigh. The users pull the band up over the knee an onto the thigh such that the impeller is positioned laterally outwardly of the thigh. Two such systems are donned by the swimmer, one on each leg, such that the impellers are positioned laterally outside of each thigh, in the same positions conventional gun holsters would occupy. The two units each have a controller and communicate wirelessly. The user's control inputs are preferably provided only to a single master unit, which wirelessly communicates to the other unit.

Figure 35:
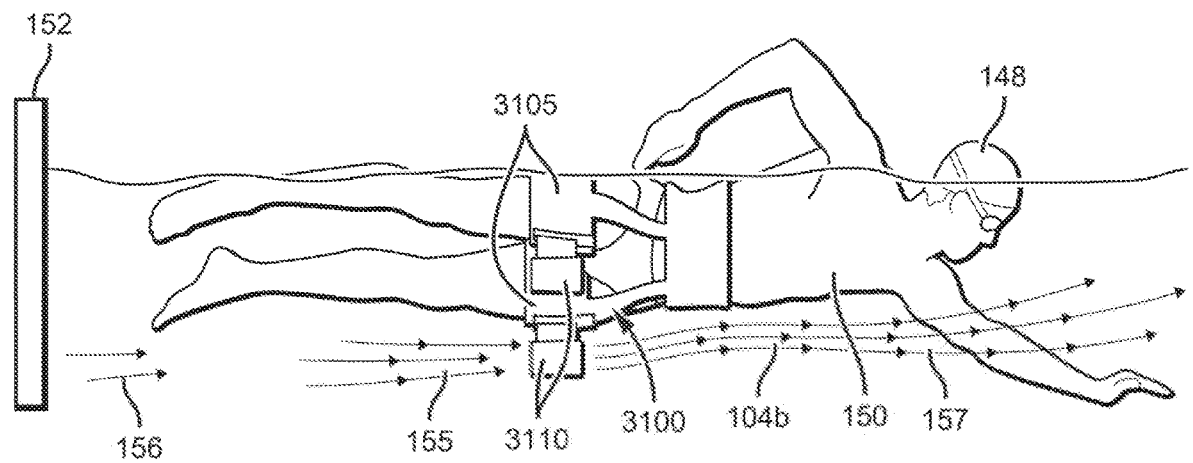
FIG. 35 is an illustration of a fourteenth embodiment of a swimjet system.
Figure 36:
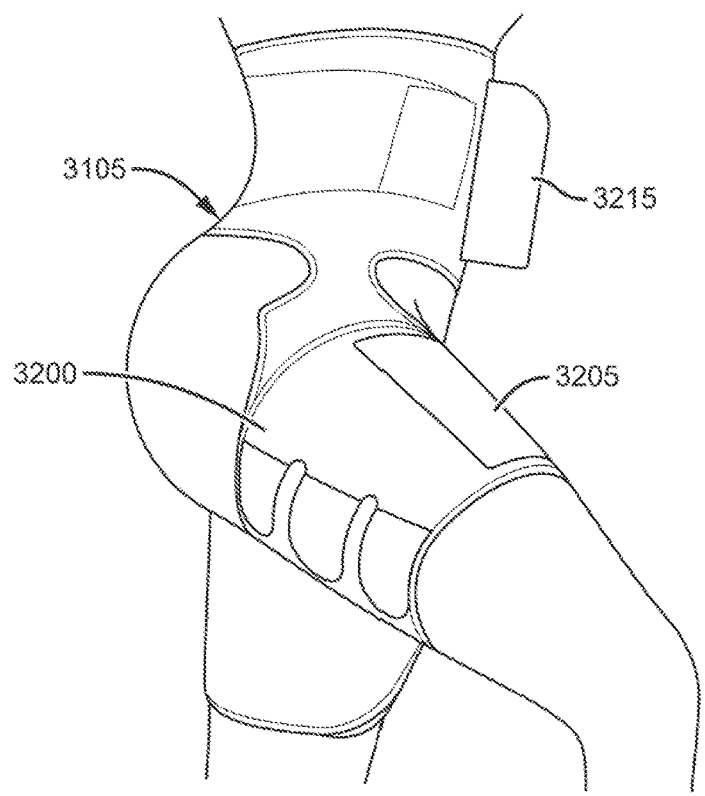
FIG. 36 is an illustration of another embodiment of a wearable garment to receive a swimjet system.

In a still further version involving neoprene shorts having impellers fixedly mounted thereto, a wired connection between the two impeller units is optionally used. For example, FIG. 35 illustrates a swimjet system 3100 with impellers 3110 positioned at an upper thigh region of the swimmer. In some examples, the impellers 3110 are mounted to neoprene shorts of a thigh harness system 3105 secured at the swimmer's waist that functions similarly to vest 124 in the clamshell embodiments described above. For example, FIG. 36 illustrates an embodiment of a thigh harness system 3105 that enables impellers 3110 to be secured to the thighs of a swimmer via neoprene shorts 3200. In examples, the shorts 3200 are secured to the swimmer's legs via size-adjustable Velcro that provides a secure fit around the thighs of the swimmer. The thigh harness system 3105 also includes an adjustable belt section 3215 that further secures the thigh harness system to the swimmer.

Each of the embodiments may include a smart watch 160. The smart watch communicates via Wi-Fi, cellular or Bluetooth with a processor and communication system inside central body portion 110. An application on the smart watch is configured to receive from communication system real-time data concerning the reverse thrust, including values corresponding to or correlated with impeller speed and thrust axis. The application also measures stroke and lap count, as is now conventional, by using accelerometers and inertial motion sensors within the smart watch. The application may thus report to the user performance metrics such as lap equivalents and calorie burn. A lap equivalent may be, for instance, a number of strokes which would be sufficient to traverse a 25 meter pool given the amount of horizontal reverse thrust exerted by the swimjet system over time. The laps may additionally be counted or verified by detecting the number of times the system regains a substantial vertical orientation during each turn maneuver, as described above.

The application may report to the user at the end of a swimming session the number of 25 meter laps the user would have completed if the user had been swimming in such a pool within the swimjet system. The application may also factor vertical thrust into its calculation of lap equivalents. For instance, greater upwards thrust generally makes swimming easier, and thus upwards thrust data may be used to adjust the lap equivalent count downwardly.

Shown in FIG. 52 is an optional air bladder 118 that may be positioned between center portion 103 and padded belt 101. Additionally or alternatively, bladder portion(s) may be provided in the space between center portion 103 and outriggers 108 and in the space between impeller nacelles 104a and 104b and the central body unit 110. The central body unit 110 may also be made larger to accommodate a buoyance chamber therein that contains the bladder unit and effectively encloses the entirety of the impellers and other components.

Such embodiments include, for example, the seventh through thirteenth embodiments (FIGS. 24-30). The housings 404 of these swimjet systems 400 may be fluidically open to the surrounding water environment by providing one or more apertures such as vents in the housings (not shown). As the air bladder is inflated, the bladder expands to displace water out of the housings 404 and provide lift. Each swimjet system 400 is provided with one or two impellers, each of which is provided within parallel annular tunnels 401/402/ 403 which extend through the housings 404. As in the first and second embodiments discussed above, water is drawn toward the bottom end 406 of the swimjet system and into the bottom end of the impeller tunnels (not shown) and thrust upwardly (or forwardly) out the top end 405 of the swimjet system 400.

As illustrated, most of the embodiments include housings that enclose swimjet system components such as batteries, impellers, air bladders, and/or control circuitry. FIG. 2 illustrates a side view of a swimmer wearing a swimjet system 3700 with a housing 3720 enclosing one or more swimjet system components such as at least one impeller 3710 and battery 3715. In some implementations, the housing may have a contoured shape to accommodate the stroke of the swimmer while providing adequate space to house one or more swimjet system components, which can include one or multiple impellers. In some examples, the contoured shape with cutouts on each side of the housing allows the swimmer to take a full free-style stroke without his or her arms or hands coming into contact with the housing.

In certain embodiments, safety may be enhanced by providing the air bladder with a fixed volume of air that provides full expansion and thus full buoyancy unless and until the air bladder is compressed. This may be accomplished by providing a second bladder chamber adjacent the air-filled bladder chamber such that expansion of the water filled bladder chamber compresses the air-filled bladder chamber, thereby reducing the volume of the air-filled chamber and thus reducing buoyancy. The water filled chamber may be filled or emptied with a hand pump similar to pump 114 or, alternatively, by water pressure provided by the flow of water through the impeller nacelles or tunnels. In the latter embodiment, a scoop-shaped element may protrude slightly into the interior of the nacelle to divert water into a conduit that feeds the water filled bladder. Water may be released from the water filled bladder by opening a valve, which permits the water to exit the bladder under the expanding force of the pre-filled air bladder. In this manner the buoyancy may be adjusted automatically without the need to actuate a hand pump. In still other embodiments, an air pump may be provided within center body unit 110 or housings 404 to expand the air bladder(s) as desired.

Figure 37A:
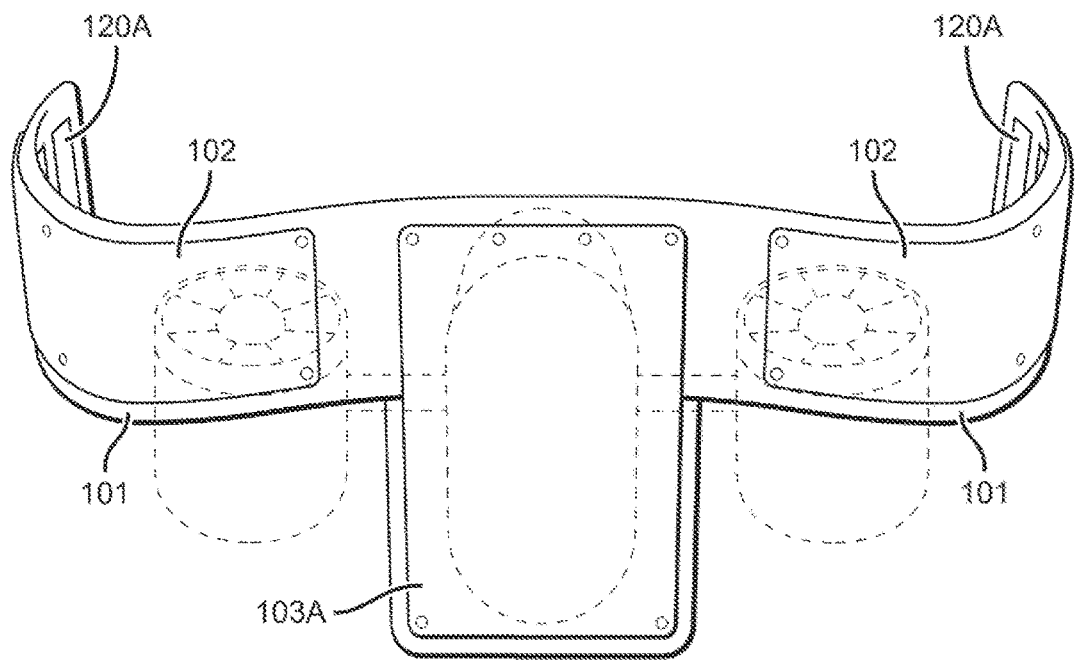
FIGS. 37A-37B are illustrations of a mounting system for use with a fifteenth embodiment of a swimjet system (shown in dotted lines in FIG. 37A)
Figure 37B:
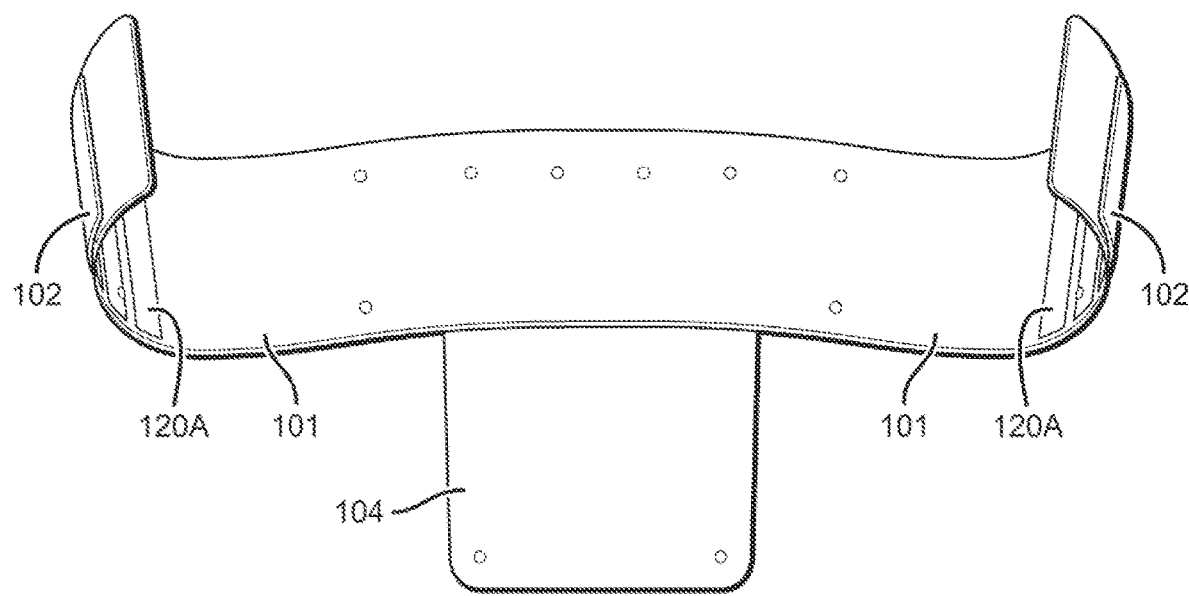

FIGS. 37A-37B show another embodiment of the swimjet system that includes an elongated chest plate portion 103A. In some examples, the elongated chest plate 103A increases a length of a pressure point at the chest plate 103A, which extends a pressure point created by the impellers 204a and 204b during a swim session such that a longer moment arm is created. The elongated chest plate 103A distributes the pressure across a larger surface area, increasing swimmer comfort during a swim session. In some examples, the clamshell portion of the swimjet system includes Velcro strips 120A for securing the swimjet system to vest 124 via Velcro portion 125. In some examples, the clamshell structure of padded belt 101 and Velcro strips that secure to the vest 124 worn snuggly by the swimmer allows the thrust generated the impellers 104a and 104b to be distributed across the entire torso of the swimmer (lats, shoulders, neck/deltoids, back, and sides of the swimmer). This broad distribution of thrust across the torso provided by the secureness of the clamshell belt 101 to the vest 124 and elongated chest plate 103a together ensure the comfort of the swimmer despite the large amount of thrust generated by the impellers 104a and 104b.

Figure 34:
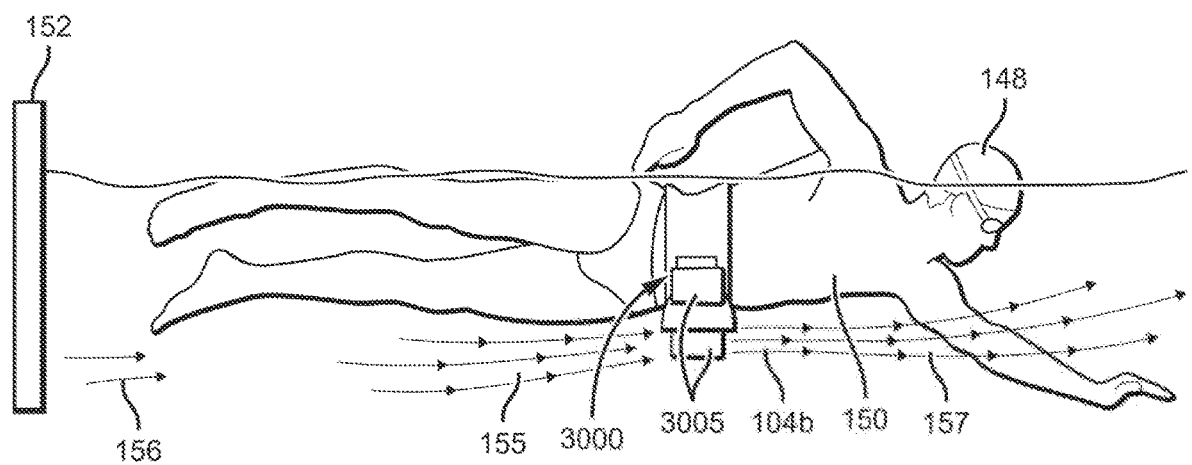
FIG. 34 is an illustration of a fourteenth embodiment of a swimjet system.

FIG. 34 and FIG. 35 illustrate embodiments of alternative swimjet system placement. For example, FIG. 34 illustrates a swimjet system 3000 with at least one impeller 3005 positioned at approximately a waist level of the swimmer. In some examples, the swimjet system has a single impeller 3005 while in other embodiments the swimjet system 3000 has two impellers 3005 positioned at the substantially same relative lateral position on the swimmer as impellers 104a and 104b in the chest-level embodiments described above.

Figure 31A:
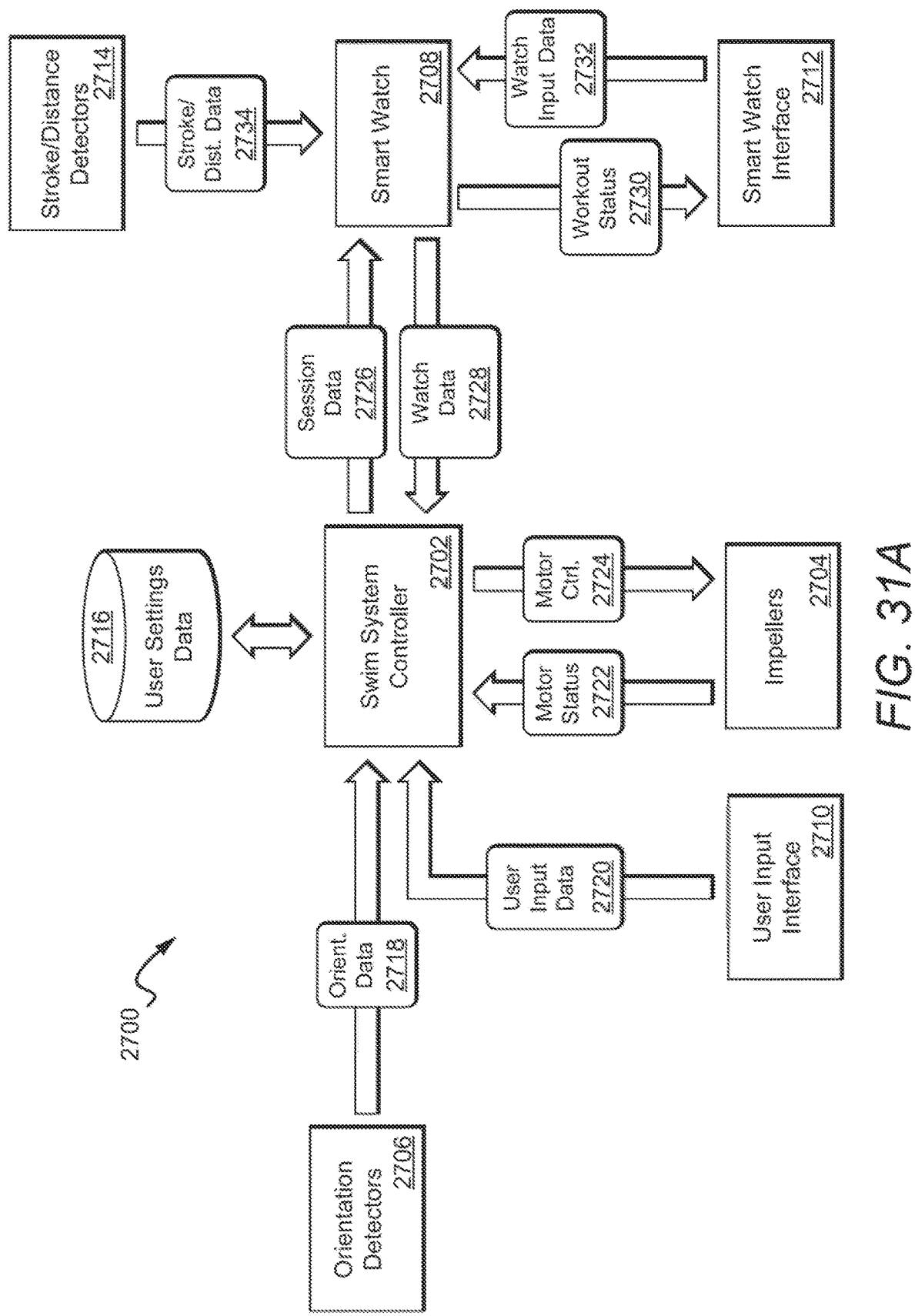
FIG. 31A is an illustration of a system flow diagram for controlling a swimjet system.

FIG. 31A illustrates a system flow diagram of a swimjet system control system 2700 for the swimjet system described herein. In some implementations, the swimjet system includes a controller 2702 that may be positioned within a housing (e.g., central body portion 110) mounted to a rigid portion of swimjet system 100, such as rigid plate 103 or outrigger 108. In one example, the controller 2702 is integral with and/or adjacent to user input buttons 109. The controller 2702 can include one or more processors with circuitry configured to control operation of the swimjet system based on received sensor inputs, user inputs, and/or predetermined configuration settings. In some embodiments, the controller 2702 is communicatively coupled to one or more orientation detectors 2706, impellers 2704 (e.g., impellers 104a and 104b), swimjet system user input interface 2710 (e.g., buttons 109), and/or smart watch 2708 (e.g., smart watch 160). Each of the connected components may be connected to the controller 2702 via a wired or wireless communication link. For example, the smart watch 2708 may be connected to the controller 2702 via a wireless communication link (e.g., Wi-Fi, cellular, or Bluetooth link) while user input interface 2710, user input interface 2710, and/or impellers 2704 may be connected to the controller 2702 via a wired connection. In some examples, controller 2702 may also connect to circuitry of a snorkel mask configured to display virtual reality (VR), augmented reality (AR), or mixed reality (MR) imagery and/or data on one or more display surfaces of the mask (e.g., snorkel mask assemblies 2800, 2900). In some examples, the controller 2702 can be figured to transmit sensor data (e.g., orientation data 2718) and/or motor status data 2722 to a connected snorkel mask assembly 2800, 2900 for generating VR, AR, and/or MR imagery for display. In other examples, the controller 2702 generates the VR, AR, and/or MR imagery that is transmitted to the mask for display.

Additionally, in some examples, central body portion 110/210/310 contains sonar sensors, the transducers of which may be positioned in apertures on the exterior of the central body portion. In other embodiments, the central body portion may include sonar emitters as well to aid the identification of the swimmer's surroundings to aid, for instance, in interactive training experiences. The central body portion further includes 3D accelerometers and inertia sensor modules, as are conventionally deployed in VR/AR/ MR handsets and smart phones, which indicate the orientation and direction of movement of the swimjet system. These sonar sensors and emitters, accelerometers, inertia sensor modules can be used by the controller 2702 and/or controller 2822, 2922 on a snorkel mask assembly to generate VR/AR/MR imagery for display on a snorkel mask display.

In some implementations, orientation detectors 2706 may provide orientation data 2718 to the controller 2702 indicating a swimmer's position in the water. The orientation detectors 2706 can be accelerometers or a position detection switch 186 such as mercury switch inside the central body portion 110/210/310 that detect whether the swimjet system is in a vertical or horizontal position. When the user begins to swim and assumes a substantially horizontal position, as indicated by orientation data 2718, the controller 2702, in some implementations, activates at the thrust force and direction (vector) selected by the user or the training/VR application controlling the swimjet system. In one example, upon reaching the end of the pool or another distance objective, the swimmer performs a non-flipping turn in which the upper torso assumes a generally upright or vertical position (less than 45 degrees from vertical). In some examples, the orientation detectors 2706 detect the change in orientation angle, and the controller 2702 deactivates the reverse thrust until the received orientation data 2718 indicates that the swimmer has returned to a horizontal or swimming position. After pushing off the wall, the swimmer regains this orientation, and the reverse propulsion system reactivates.

In some embodiments, the controller 2702 can be configured to communicate with and control impellers 2704 via motor control signals 2724. Each of the impellers 2704 of the swimjet system can be individually controlled by the controller 2702. In some examples, the controller 2702 receives motor status data 2722 from each of the impellers 2704 indicating speed, direction, and thrust of the respective impeller 2704 as well as whether any error status alerts are present (e.g., motor high temperature alarms, low battery/charge levels). Based on the received motor status data 2722, the controller 2702 can cause adjustment of one or more operational parameters of the impellers 2704 via motor control signals 2724 to achieve a desired thrust for the swimjet system as indicated by user inputs. In one example, upon receiving a user input indicating a desired time between laps, the controller 2702 may automatically adjust operational parameters of the impellers 2704 as the swimmer increases or decreases swimming speed so that the desired time between laps is achieved. If the user indicates a desire to remain stationary in the pool, the controller 2702 may automatically adjust operational parameters of the impellers 2704 to maintain the swimmer's position.

In some implementations, the swimjet system can include a mounted user input interface 2710 that allows the user to provide user input data 2720 to the controller 2702 for controlling impellers 2704 during a swim session. The user input interface 2710 can include a touch screen, buttons 109 and/or a knob that allows the user to input a desired speed and/or resistance through the water, thrust, time between laps, or orientation for deactivating impellers 2704. In one example, the user may select, via user input interface 2710, an orientation, for example about 10, 15, 20, 25, 30, 35, 40, 45, 50, 55, 60, 65, 70, 75, 80 or 90 degrees from vertical (90 degrees from vertical being completely horizontal), at which the swimjet system will activate. The user's selection may be set by the touchscreen, buttons, knobs or via the smart watch application. In addition, the user can also use screen, knob and/or buttons 109 to input thrust force and direction (vector) selected by the user or training application controlling the swimjet system. In some examples, the user can select a preprogrammed setting for the reverse thrust system via user input interface 2710. For example, the controller 2702 can access stored user settings data 2716 that can be programmed by individual users for desired thrusts, workout time, and/or preferred orientation angle for triggering shut-off.

In some implementations, the controller 2702 communicates workout session data 2726 to an application on smart watch 2708 that is configured to convey workout session status information 2730 to a user via smart watch interface 2712. In some embodiments, the smart watch 2708 can communicate watch data 2728 to the controller, which can include watch input data 2732 received at smart watch interface 2712 as well as stroke and distance data 2734 received from stroke/distance detectors 2714. In some examples, the smart watch interface 2712 can include a display screen that displays the workout status 2730 and/or coaching information to the user. In addition, the smart watch interface 2712 can include haptic or audio output interfaces for conveying time, number of laps, speed, and/or workout cues to the user during the swim session via waterproof earphones. The smart watch interface 2712 can also include a user input interface, such as through a touchscreen interface, for providing watch input data 2732. In some examples, the watch input data 2732 can include redundant controls for the user input interface 2710. In addition, the watch input data 2732 can include additional workout session parameters than what is provided at the user input interface 2710. For example, the user can input swim stroke information (e.g., freestyle, breaststroke, butterfly) at the smart watch 2708 that can be used by the controller 2702 to customize impeller control based on the selected stroke.

In some embodiments, the smart watch 2708 can receive stroke/distance data 2734 from one or more stroke/distance detectors 2714 to enable enhanced interactive training and data-driven analysis of swim strokes and performance. In some implementations, the stroke/distance detectors 2714 can include the inertial sensors, accelerometers or other motion sensors of the watch. The controller 2702, in some examples, may cooperate with smart watch 2708 to provide interactive training experiences and track performance by factoring in the reverse thrust provided by the swimjet system over time. An application on the smart watch 2708 may advantageously receive from the controller 2726 real-time session data 2726 concerning reverse thrust and swimmer orientation in the water.

The application on the smart watch 2708 may provide interactive training, coaching and related input and feedback to user the through waterproof earphones. The controller 2702 or on-board the smart watch 2708 may internally process, alone or in cooperation with cloud-based resources, the cuff data along with thrust vector data to determine the equivalent distance traveled (e.g., 25 meter lap equivalents), calories burned, average equivalent water speed, stroke and kick frequency over time, and length or travel or strokes and kicks, and symmetry between left and right strokes and kicks.

Any of the foregoing data may be compared to reference data to provide interactive suggestions to the swimmer. For instance, over time, the swimmer's stretch or freestyle stroke length may shorten, which may prompt a visual message on the smart phone screen and/or an audible message requesting the swimmer to length his or her strokes. The same may be done for kicks which are too weak, slow, or out of sync with the arm strokes.

The application may thus report to the user performance metrics such as lap equivalents and calorie burn. A lap equivalent may be, for instance, a number of strokes which would be sufficient to traverse a 25 meter pool given the amount of horizontal reverse thrust exerted by the swimjet system over time. The laps may additionally be counted or verified by detecting the number of times the system regains a substantial vertical orientation during each turn maneuver, as described above.

The application may report to the user at the end of a swimming session the number of 25 meter laps the user would have completed if the user had been swimming in such a pool within the swimjet system. The application may also factor vertical thrust into its calculation of lap equivalents. For instance, greater upwards thrust generally makes swimming easier, and thus upwards thrust data may be used to adjust the lap equivalent count downwardly.

Figure 31B:
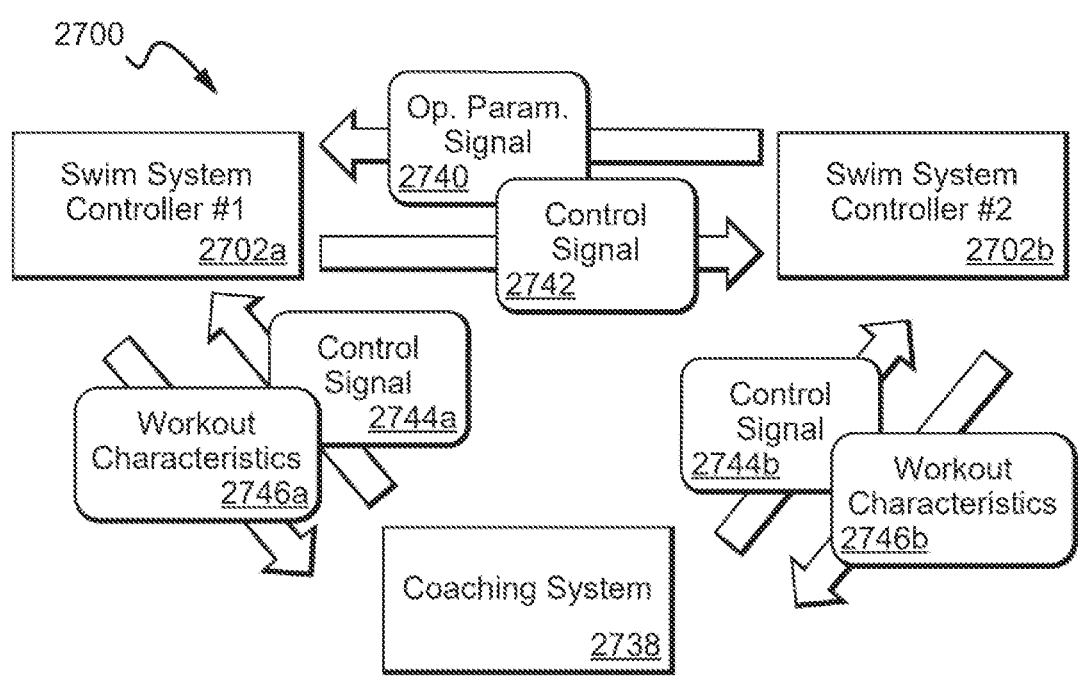
FIG. 31B is an illustration of a diagram of coordinated interactions between multiple swimjet systems and/or connected coaching systems.

FIG. 31B illustrates a diagram of coordinated interactions between multiple swimjet systems and/or connected coaching systems. In some embodiments, the controller 2702 can be one of multiple communicatively linked controllers 2702a, 2702b that form a network of swimmers each taking part in their own swim sessions with a respective swimjet system. In some examples, the connected controllers 2702a, 2702b can execute swim sessions coordinated between each of their respective swimmers utilizing the swimjet system. In some examples, the controllers 2702 can be connected via wireless communication link (e.g., Wi-Fi, cellular, or Bluetooth link). For example, using one or more controller inputs (e.g., user input interface 2710, smart watch 2708), a swimmer can connect the swimjet system to the swimjet system of one or more swimmers. The swimmer can also join a "class" of multiple interlinked swimmers using swimjet systems.

In some implementations, when linked to one or more other swimjet systems, a first swimjet system controller 2702a can operate in a "race" mode for a first swimmer where the controller 2702a can automatically adjust operational parameters of the impellers 2704 to outpace the speed or distance of a second linked swimjet system including second swimjet system controller 2702b. For example, the controller 2702a of a first swimjet system can receive a signal 2740 from the second controller 2702b including operational parameters of the impellers of the second swimjet system. In some examples, the signal 2740 may include variations in impeller thrust over the course of a swim session, total translated distance traveled during a swim session or race session, session start time, and/or number of laps the second swimmer has swam during the swim session. In some examples, the controller 2702a of the first swimjet system automatically adjusts one or more operational parameters of the impellers 2704 based on the operational parameters of the second swimjet system included in the received signal 2740. For example, the controller 2702 may increase the thrust of the impellers 2704 to catch up in speed or distance to the second swimmer. In some examples, the first and second swimjet systems can execute coordinated race starts such that the controllers 2702 of each of the systems issue audible and/or visual cues to the swimmers at the initiation of the race via the smart watch 2708 or via transparent shell portion 2902 of snorkel mask 2900.

In a "pace" mode, the controller 2702a of the first swimjet system may use the second swimjet system as a pacing unit and adjusts the operational parameters of the first swimjet system to substantially match the operational parameters of the second swimjet system transmitted to the first swimjet system via the wireless signal 2740. In some examples, upon the initiation of the "pace" mode, the controller 2702a may transmit a control signal 2742 to the controller 2702b the second swimjet system requesting that the second swimjet system become a pacing unit for the first swimjet system. In response, the controller 2702b of the second swimjet system may transmit operational parameter update signals 2740 to the controller 2702a of the first swimjet system whenever any operational parameters of the second swimjet system are adjusted automatically and/or manually.

In a "class" mode, the controller 2702a and/or the controller 2702b can connect to a coaching system 2738 and/or one or more other swimjet systems to participate in a swim session class. In some examples, a coaching system may connect to multiple swimjet systems remotely located from the coaching system. For example, the coaching system 2738 may be a remote server with one or more swim workouts accessible by connected swimjet systems. In some examples, the swim workouts accessible via remote server may include one or more software engines for establishing a wireless connection to the controller 2702a, 2702b of the system, transmitting workout instruction signals to the controller 2702a, 2702b, and/or receiving and processing swimjet system status signals received from the controller 2702a, 2702b. In some examples, swimmers may access classes or coaching sessions offered by the coaching system 2738 via user input interface 2710 on the swimjet system, and/or smart watch interface 2712. In some examples, upon establishing a connection with the controller 2702a, 2702b, the coaching system 2738 can determine one or more coaching session parameters 2744a, 2744b for the swimjet system based on swimmer inputs or previous workout characteristics 2746a, 2746b for the respective swimmer such as average impeller speed, average workout distance, average workout time, and/or workout type (e.g., sprint intervals or endurance workout). In some examples, based on the determined coaching session parameters, the coaching system 2738 can issue control signals 2744a, 2744b to automatically adjust the operational parameters of the swimjet system. In one example, the control signals 2744a, 2744b are notification signals transmitted to the respective controller 2702a, 2702b of the swimjet system to generate notifications that prompt the respective swimmer to change one or more operational parameters of the swimjet system during the workout. In some examples, the controller 2702a, 2702b generates audible and/or visual cues to the swimmers via the smart watch 2708 or via transparent shell portion 2902 of snorkel mask 2900.

Figure 32B:
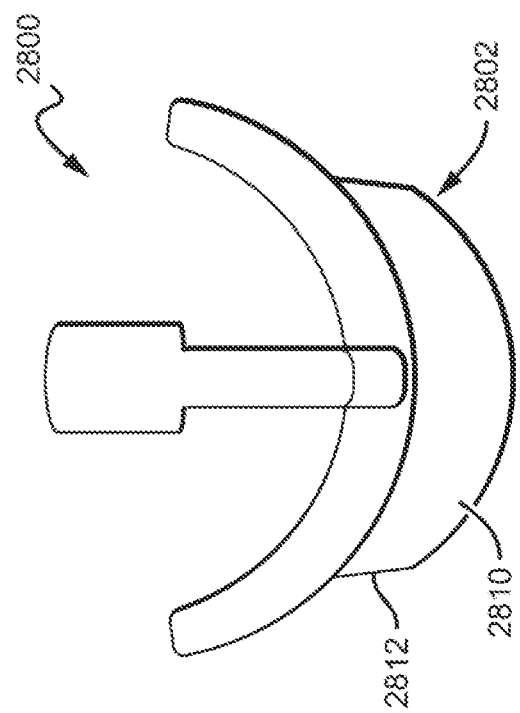
FIGS. 32A-32B are illustrations of a snorkel mask for use in combination with the system.
Figure 32A:
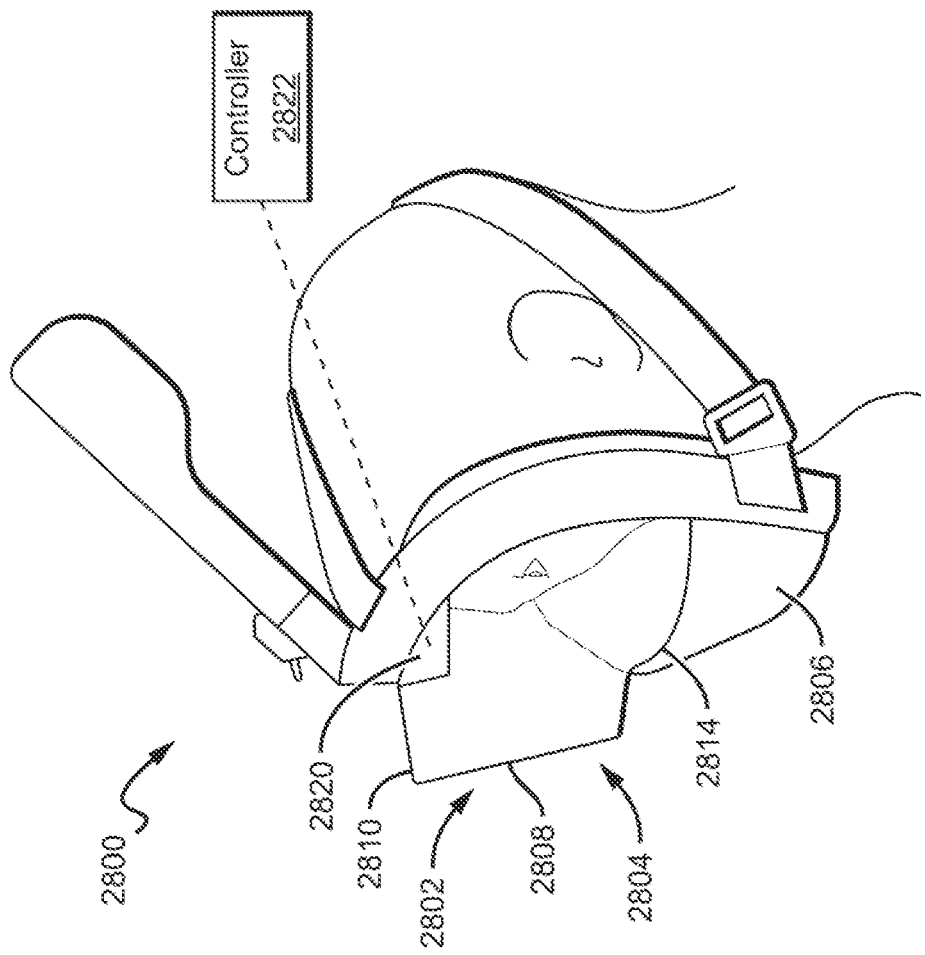
Figure 33:
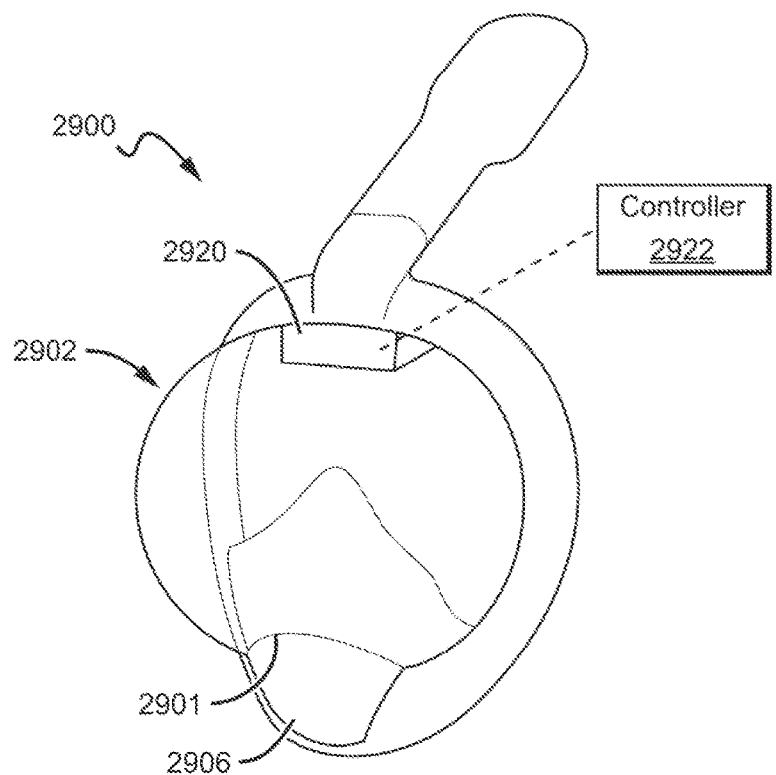
FIG. 33 is an illustration of a snorkel mask for use in combination with the system.

Turning to FIG. 32-33, two embodiments of VR/AR/MR snorkel mask assemblies for the swimjet system are illustrated. In some implementation, each of the snorkel mask assemblies 2800, 2900 can include a transparent shell portion 2802, 2902 configured to display computer-generated imagery (video/image data) from VR, AR, and/or MR systems to a user. In some embodiments, the transparent shell portion 2802, 2902 is made of transparent glass or plastic material that can include optical elements configured to display imagery associated with the swimjet system via near-eye display technology. In some examples, transparent shell portion 2802, 2902 allows the swimmer to use the snorkel mask assembly 2800, 2900 for swim sessions without VR/AR/MR features if desired. In addition, in some VR/AR/MR implementations, the user can simultaneously view real-world surroundings and system-generated VR/AR/MR imagery.

In some embodiments, the transparent shell portion 2802, 2902 is made of transparent glass or plastic material including a transparent or semi-transparent display layer adhered to the glass or plastic material that is configured to display VR/AR/MR imagery in response to receiving a control signal from VR/AR/MR controller 2822, 2922. In some examples, the display layer of the transparent shell portion is a flexible light emitting diode (LED) or organic LED (OLED) foil, film, or glaze that includes rows of LEDs embedded within the display layer that are configured to illuminate in colored pattern based on control signals received from controller 2822, 2922. In some embodiments, the display layer is a transparent liquid crystal display (LCD) film or foil. In some examples, controller housing 2820, 2920 can also house a projection device for projecting portions of the VR/AR/MR imagery onto the display layer. The display layer, in some examples, is made of an adhesive or self-adhesive film or foil configured to be easily applied to the transparent shell portion 2802, 2902 of the snorkel mask assembly 2800, 2900. In some implementations, the display layer can be configured to display the VR/AR/MR imagery on portions of the transparent shell portion 2802, 2902 in a full range of colors based on control signals received from controller 2822, 2922. In addition, the display layer can be made of a flexible material that provides for smooth application to curved surfaces of the transparent shell portion 2802, 2902. In some implementations, the transparent display portion 2802, 2902 that includes an applied display layer as described allows swimjet system users to view the real-world underwater environment and displayed VR/AR/MR imagery simultaneously which allows swimjet system users to observe their surroundings while also benefitting from the features of a VR/AR/MR experience.

In some examples, the transparent shell portion 2802, 2902 with the adhered transparent or semi-transparent display layer(s) may be transparent or translucent to allow a swimmer wearing the snorkel mask assembly 2800, 2900 to be able to see through the transparent shell portion 2802, 2902 to view the outside underwater environment without becoming disoriented or experiencing eye strain or vertigo. In some examples, the transparent shell portion 2802, 2902 may have light transmittances of greater than about 70%, 80%, 90%, or 95% when the display is active. In one example, the transmittance may be in range from about 50-60%, 60-70%, 70-80%, 80-90%, 90-100%, 70-90%, or 70-100% when the display is active. Throughout the disclosure, the terms "approximately," "about," "proximate," "minor variation," and similar terms generally refer to ranges that include the identified value within a margin of 20%, 10% or preferably 5% in certain embodiments, and any values therebetween.

A transparent or translucent shell portion 2802, 2902 allows swimjet system users to maintain situational awareness of the underwater environment while also obtaining the benefits of the VR/MR/AR features provided by the system. Particularly in an MR embodiment, the images depicted on the shell portion may relate to the environment in which the user is swimming. For instance, if a user is snorkeling in open water through a coral reef, the images may present interactive content concerning the reef or aquatic life typically found in that environment. In the pool environment, the displayed images may provide the appearance or illusion of a coral reef environment while at the same time permitting the user to see and focus on the pool wall or pool bottom if desired.

In some implementations, the breathing/snorkel-related features of snorkel mask assemblies 2800, 2900 can be configured as a full-face or partial face snorkel mask assembly. In a first embodiment shown in FIG. 32, transparent shell portion 2802 of snorkel mask assembly 2800 includes a forward viewing section 2804 that interfaces with a half face inner shell 2806 that covers and seals the wearer's nose and mouth at interfacing surface 2814. Forward viewing section 2804 can include a flat viewing surface 2808 configured to align with a field of vision directly in front of a user's eyes when wearing the mask assembly 2800. In some examples, viewing surface 2808 extends a distance from a swimmer's face that allows the swimmer to view system-generated VR/AR/MR features displayed on the transparent shell portion 2802 without eye strain, blurriness or vertigo. The viewing section 2804 can also include side viewing section 2812 that forms a viewing surface that is peripherally adjacent to viewing surface 2808. Side viewing section 2812, in some embodiments, provides a surface for displaying system-generated VR/AR/MR features within the peripheral vision of the swimmer wearing the snorkel mask assembly 2800 during a swim session. In some examples, the viewing section 2804 has an upper viewing surface 2810 peripherally adjacent to an upper edge of viewing surface 2808 that provides an additional display surface for VR/AR/MR imagery in an upper peripheral viewing range of the swimmer. In some examples, VR/AR/MR imagery can be displayed in a direct field of vision at viewing surface 2808 and/or on one or more of the peripheral viewing surfaces 2810, 2812.

In a second embodiment of a snorkel mask assembly 2900 shown in FIG. 33, transparent shell portion 2902 has a spherical shape and interfaces with a half face inner shell 2906 that covers and seals the wearer's nose and mouth at interfacing surface 2908. In some implementations, the spherical transparent shell portion 2902 provides a continuous display surface for system-generated VR/AR/MR features that allows the swimmer to focus on displayed imagery without experiencing eye strain, blurriness, or vertigo. In addition, system-generated imagery can be displayed within a direct field of view and/or a peripheral field of view based on user settings and type of swim session.

In some examples, a radius of transparent shell portion 2902 of mask assembly 2900 and a distance of viewing surface 2808 of the transparent shell portion 2802 of mask assembly 2800 from a swimmer's eyes are based on a focal length that allows the swimmer to view system-generated VR/AR/MR imagery while swimming without experiencing eye strain, disorientation or vertigo. In some implementation, a forward surface of transparent shell portion 2902 or viewing surface 2808 of transparent shell portion 2802 is a distance from a wearer's eyes of about 3-12 in., 3-8 in., 4-9 in., 5-10 in., 5-8 in., 7-9 in., 6-12 in, 8-12 in., or 10-12 in.

Figure 27:
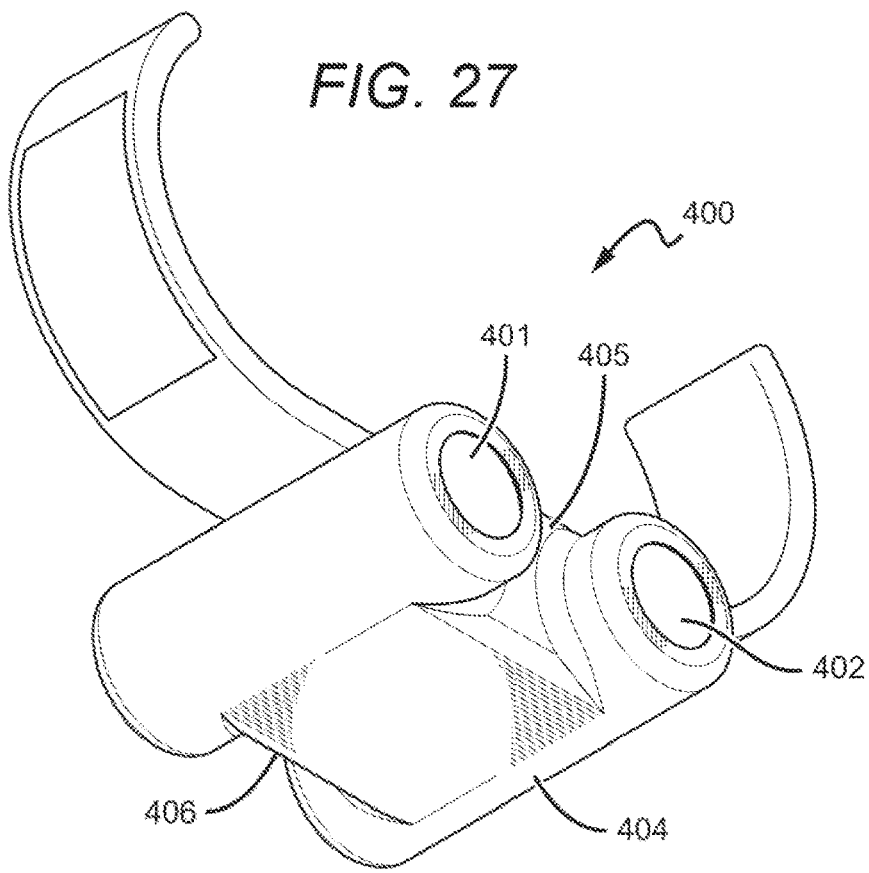
FIG. 27 is an illustration of a tenth embodiment of a swimjet system.
Figure 28:
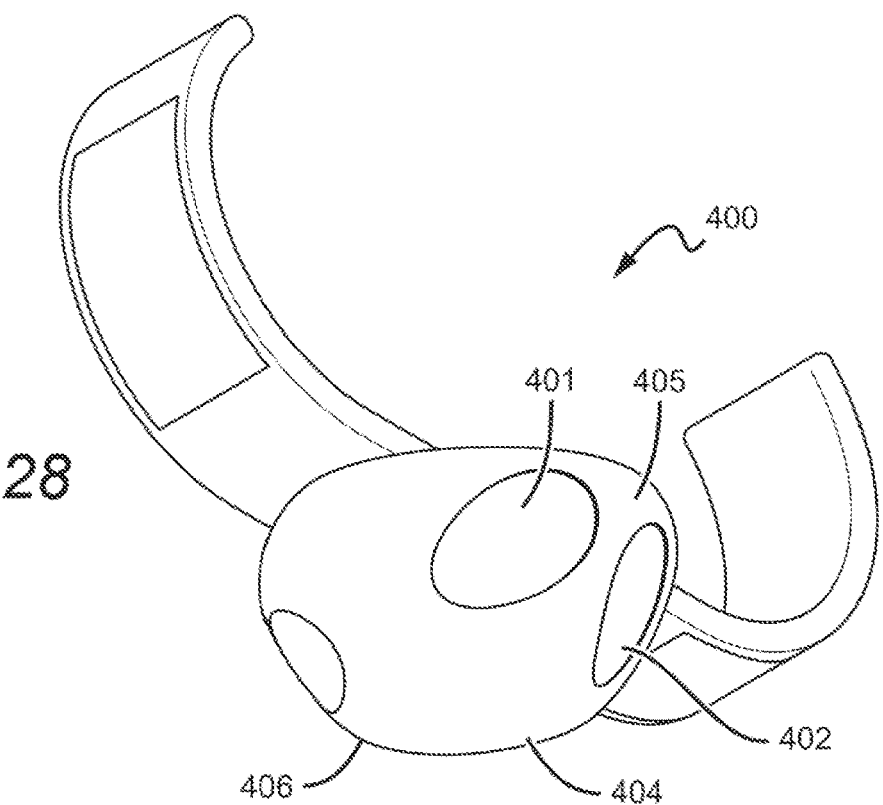
FIG. 28 is an illustration of a eleventh embodiment of a swimjet system.
Figure 29:
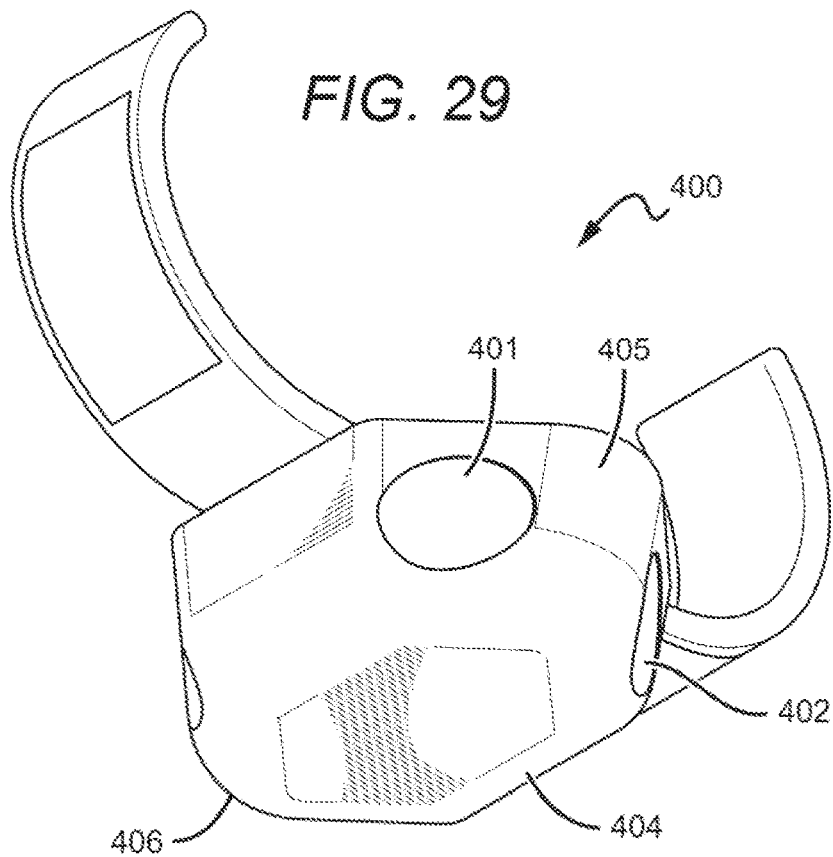
FIG. 29 is an illustration of a twelfth embodiment of a swimjet system.

In some implementations, swim mask assemblies 2800, 2900 can include controller housings 2820, 2920 for housing VR/AR/MR controllers, processors, and/or circuitry 2822, 2922 for controlling the display and/or generation of VR/AR/MR imagery on transparent display portions 2802, 2902. In some examples, the VR/AR/MR controller 2822, 2922 supplements the control functionality of swimjet system controller 2702 (FIG. 27). In some examples, the VR/AR/MR controller 2822, 2922 communicates with controller 2702 via wireless communication link (e.g., Wi-Fi, cellular, or Bluetooth link). The VR/AR/MR controller 2822, 2922 can generate VR/AR/MR imagery in response to receiving swim session sensor data from controller 2702. In some embodiments, the controller 2702 generates VR/AR/MR imagery and transmits imagery data to the VR/AR/MR controller 2822, 2922 for display on the transparent display portion 2802, 2902.

The VR/AR/MR controller 2822, 2922 interfaces with a corresponding swimjet system application on a smart phone or smart watch (e.g., smart watch 2708 in FIG. 27). The smart watch/smart phone application controller optionally interfaces with the same application but alternatively control of swimjet system basic functionality may be handled by a different application on the smart watch or smart phone than the more graphics-intensive VR/AR/MR and interactive training functionality. The user may select, via the smart watch or smart phone, the desired thrusts, times for which each thrust should be applied, target distance (actual or equivalent), target number of laps (actual or equivalent), the interactive training module or program. The swimjet system app, the VR/AR/MR controller 2822, 2922, or both, may determine calories burned, laps completed, distance traveled or any of the other performance metrics described herein. Audio feedback to the user may be provided from the smart watch, smart phone or VR/AR/MR controller 2822, 2922. Audio feedback may be provided by wired or wireless headphones or earbuds.

The VR/AR/MR controller 2822, 2922, controller 2702, and/or the smart watch 2708 can include motion detection modules to determine orientation, rate, and direction of movement, as is conventional. A position detection module of VR/AR/MR controller 2822, 2922 and/or controller 2702 optionally processes the accelerometer and inertial measurement unit (IMU) data in the manner described in U.S. Pat. No. 9,810,549, entitled "Systems, methods, and apparatus for calibration of and three-dimensional tracking of intermittent motion with an inertial measurement unit," and optionally computes the 3D position, speed and direction of the swimjet system and any smart watch 2708 worn by the swimmer according to the techniques described therein and/or the techniques described in U.S. Pat. No. 3,496,524, entitled "Doppler Sonar Navigation System Compensated for Sound Velocity Variations" and U.S. Pat. No. 3,891,960, entitled "Doppler Sonar System."

An interactive training module of VR/AR/MR controller 2822, 2922 or controller 2702 interfaces with the swimjet system applications on the smart watch and/or transparent display portion 2802, 2902 to present to the user an audio and/or video based interactive training experience and, optionally, a VR/AR/MR experience. For purposes of illustration, an embodiment in which an audio and visual VR/AR/MR experience is presented to the user. In other embodiments, only audio or only video is presented to the swimmer. In some embodiments, an interactive training session similar to that described U.S. Pat. No. 10,639,521 and entitled Exercise system and method may be delivered via waterproof earbuds and/or visual means described herein.

Using the position, speed and bearing data from one or more sensors on the snorkel mask assembly 2800, 2900 or sensors communicatively coupled to controller 2702 or on the reverse propulsion system, the swimjet system may be used, particularly in cooperation with an application running on the smart watch 2708 to provide enhanced training and interactive experiences. Positional data may be used to assess stroke frequency, stroke path, and conformance of the stroke to an optimal or reference stroke. The controller 2702, VR/AR/MR controller 2822, 2922, or controller on-board the smart watch 2708 may internally process, alone or in cooperation with cloud-based resources, the sensor data along with thrust vector data to determine the equivalent distance traveled (e.g., 25 meter lap equivalents), calories burned, average equivalent water speed, stroke and kick frequency over time, and length of travel or strokes and kicks, and symmetry between left and right strokes and kicks.

Any of the foregoing data may be compared to reference data to provide interactive suggestions to the swimmer. For instance, over time, the swimmer's stretch or freestyle stroke length may shorten, which may prompt a visual message on the transparent display portion 2802, 2902 and/or an audible message requesting the swimmer to length his or her strokes. The same may be done for kicks which are too weak, slow, or out of sync with the arm strokes.

This system also enables the presentation to the swimmer of an immersive, interactive training experience as has become conventional for stationary bicycles. The transparent display portion 2802, 2902 and/or ear buds may be used to communicate interactive and encouraging professional instruction. The users may be presented, e.g., with video of dramatic underwater scenes taken from the perspective of a snorkeler while the coach, who may be videographically rendered as another swimmer swimming in front of the user, renders training advice and comments on marine wildlife reflected in the video footage. The system may also control swimjet system thrust and direction as appropriate to simulate a sprint or a temporary ocean current.

Still further, this system permits a full VR/AR/MR gaming experience in an underwater environment. The same techniques discussed above may be used to simulate a fictional underwater environment through which the user navigates and with which the user interacts. Sub-surface diving in such games can be accomplished by swimming downwards with arm strokes. The user may move toward the surface with appropriate flapping arm movements as a diver might use to surface. The VR/AR/MR application may also control thrust strength and direction as appropriate to reflect the VR/AR/MR environment, such as underwater waves or currents or to simulate being pushed back by the force of the current generated by a whale's flipper.

Figure 40:
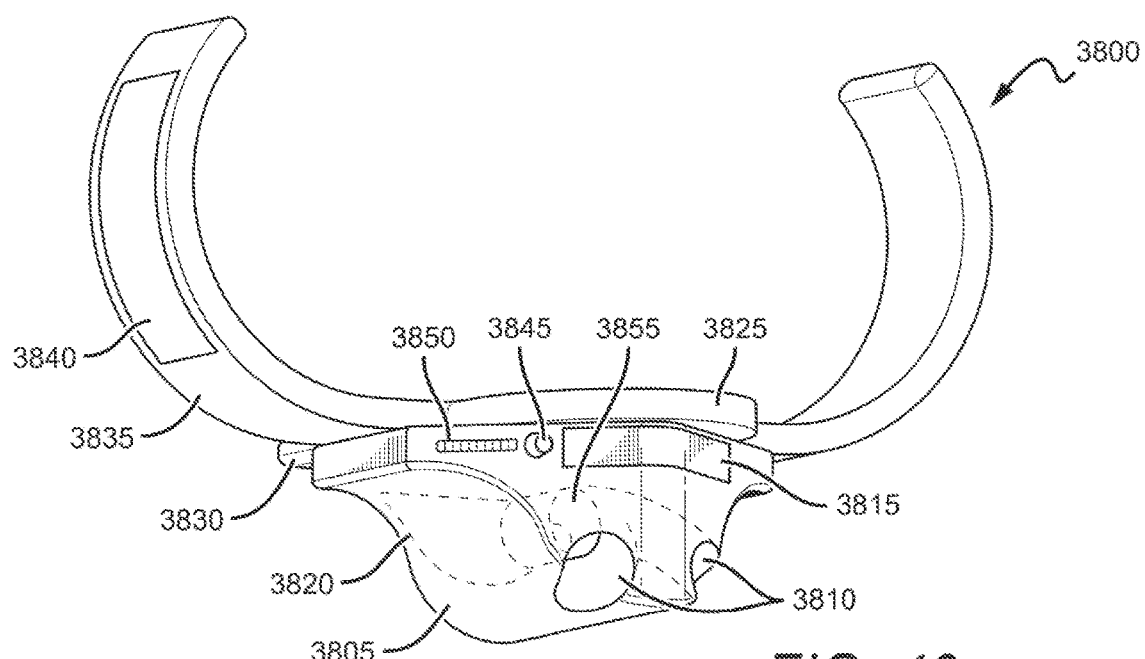
FIG. 40 is an illustration of a sixteenth embodiment of a swimjet system.

FIG. 40 depicts a sixteenth embodiment 3800. In this embodiment battery 3815 is positioned behind the output conduits 3810 and a single motor 3855 is used to keep the battery mass as close as possible to the chest of the user. Outputs 3810 are directed downwardly at an angle theta to provide the advantages and functionalities described above. Readouts 3850 indicate the difficulty level, battery level and connectivity with wireless devices. Knob 35 provides the on/off and thrust level functionality described above. Clamshell portion 3835/3840 may have the functionality and structure described above. Input 3820 is located at the bottom of the device. This configuration has a greater depth (as measured from the backplate 3825 to the farthest portion of housing 3805) but a narrower width in the region further from the chest of the swimmer. This may provide enhanced ergonomics by further reducing potential interference with a freestyle stroke. The greater depth also permits thrust vectors to have a greater moment arm (and thus leg-raising effect), especially when conduits 3810 are shaped to provide the thrust parallel to the longitudinal axis of the swimmer (instead of vectored downwardly toward the bottom of the pool).

Outputs 3810 are directed downwardly at an angle theta to provide the advantages and functionalities described above. Readouts 3850 indicate the difficulty level, battery level and connectivity with wireless devices. Knob 35 provides the on/off and thrust level functionality described above. Clamshell portion 3835/3840 may have the functionality and structure described above. Input 3820 is located at the bottom of the device. This configuration has a greater depth (as measured from the backplate 3825 to the farthest portion of housing 3805) but a narrower width in the region further from the chest of the swimmer. This may provide enhanced ergonomics by further reducing potential interference with a freestyle stroke. The greater depth also permits thrust vectors to have a greater moment arm (and thus leg-raising effect), especially when conduits 3810 are shaped to provide the thrust parallel to the longitudinal axis of the swimmer (instead of vectored downwardly toward the bottom of the pool).

Backplate 3820 includes a relatively rigid plate material (like plates 101, 102, 103) to provide a relatively rigid surface to receive the swimjet unit 3805 and to help distribute the load provided by the thrust (or weight of the unit when standing outside the water) evenly across the chest and abdomen of the user in a manner similar to that described in connection with FIG. 37. Backplate 3820 preferable includes a padded material in between the rigid plate and the chest of the user.

Figure 41:
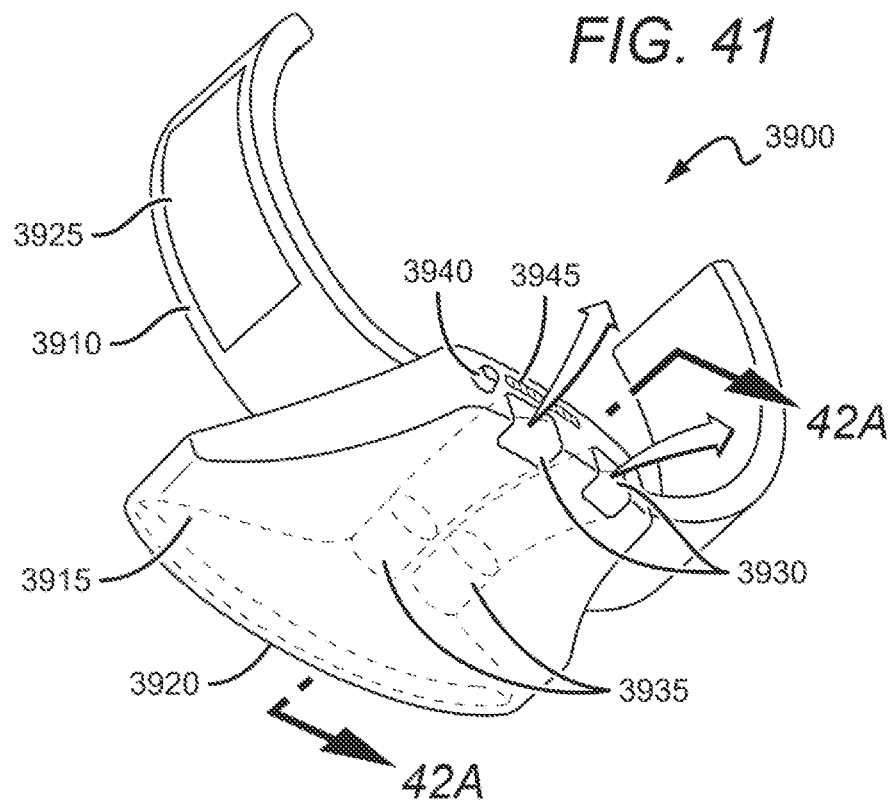
FIG. 41 is an illustration of a seventeenth embodiment of a swimjet system.

FIG. 41 depicts an seventeenth embodiment 3900. In this embodiment batteries may be positioned on either side of motors 3935. Swimjet unit has a curved shape to conform to the upper torso of the user, as reflected by the inlet 3920. The dual motor configuration reduces the overall depth of the swimjet unit, providing a low-profile device. Outputs 3930 are configured to vector the thrust away from the users face, to either side of the user's head.

Figure 42A:
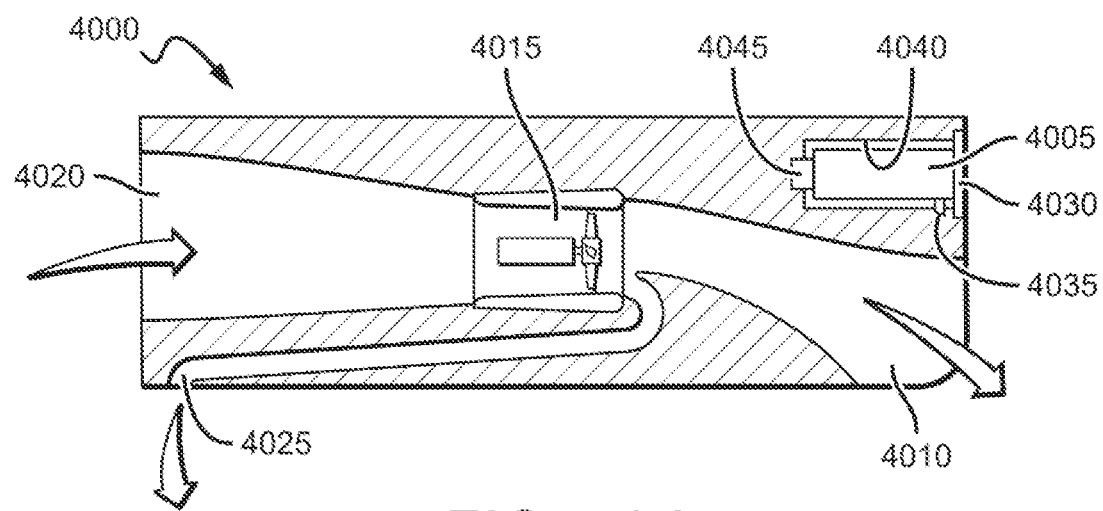
FIGS. 42A-42B and 43 are cut-away views showing the internals of the sixteenth and seventeenth embodiments.
Figure 42B:
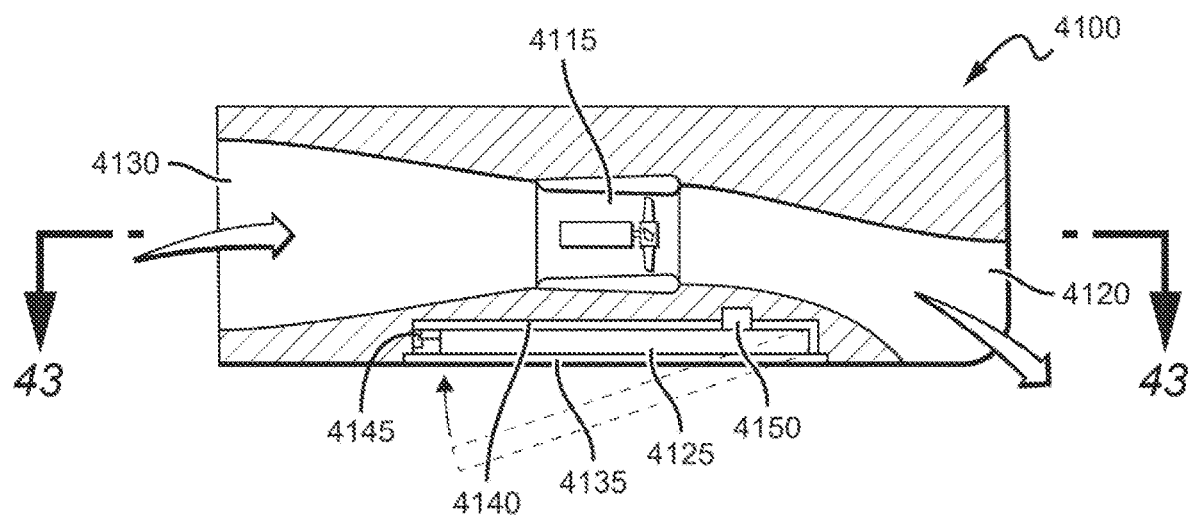

FIGS. 42A-B show a cross sectional view of configurations that may be used in connection with various of the embodiments shown herein, including the seventeenth and eighteenth embodiments described immediately above. In this connection, it bears repeating that that features described in connection with any embodiment are applicable to and may be incorporated into the other embodiments unless expressly stated otherwise.

Input conduit 4020 feeds into the impeller unit 4015. Some output is diverted to conduit 4025, which provides upwards thrust (away from the bottom of the pool) at the lower end of the unit, which can have the effect of lifting the user's legs if the location of exhaust is beyond the center of buoyancy of the user. Conduit may be opened and closed automatically by a valve or baffle (not shown) in order to provide leg-lifting assistance dynamically and in real-time during an interactive workout session. Output vector 4010 is, in this particular configuration, vectored at angle theta (discussed above) so as to adjust the rotational moment applied by the swimjet unit on the swimmer. A thrust vectored directly to the right in FIG. 42A would provide increased clockwise or "leg lifting" torque to the swimmer, as discussed above. Battery 4030 is nested behind conduits 4010 to keep the mass proximate the chest of the user. Battery 4030 includes a waterproof seal 4045 which keeps the battery contacts dry. The remainder of compartment 4040 may be allowed to flood with water during use. Battery 4030 clicks into position with spring loaded tab 4035.

FIG. 42B shows an alternative configuration wherein battery 4215 is installed in the face or front of the swimjet unit 4100. Waterproof contact 4150, spring loaded locking tab 4145 and the remaining structures have the functionalities described in connection with FIG. 42A.

Figure 43:
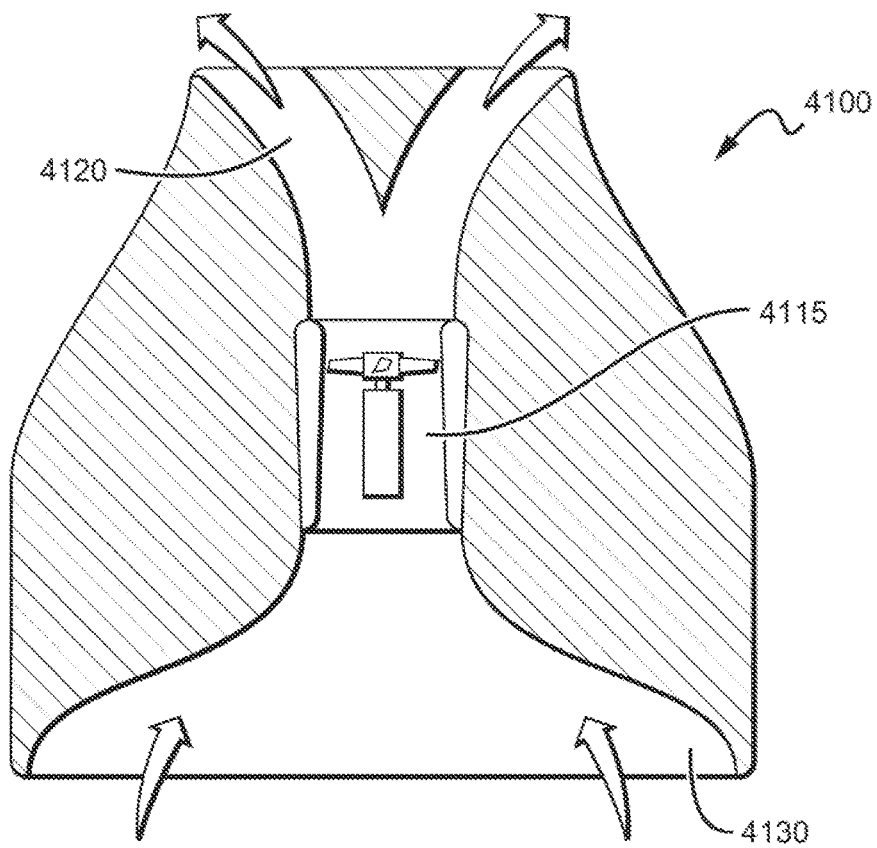

FIG. 43 is a cross sectional view taken at cross section A-A of FIG. 42B. Here it can be seen that the conduits 4120 vector the thrust away from the center of the user's face and to either side of the user's head. Inlet 4130 is wide in order to limit the flux and pressure at the inlet mouth, which can help reduce the risk of sucking debris or other items into the inlet conduit 4130. A mesh or filter can be placed immediately below 4115 where the conduit begins to widen so as to prevent debris from reaching the motor while also hiding the mesh or filer from view.

Figure 44:
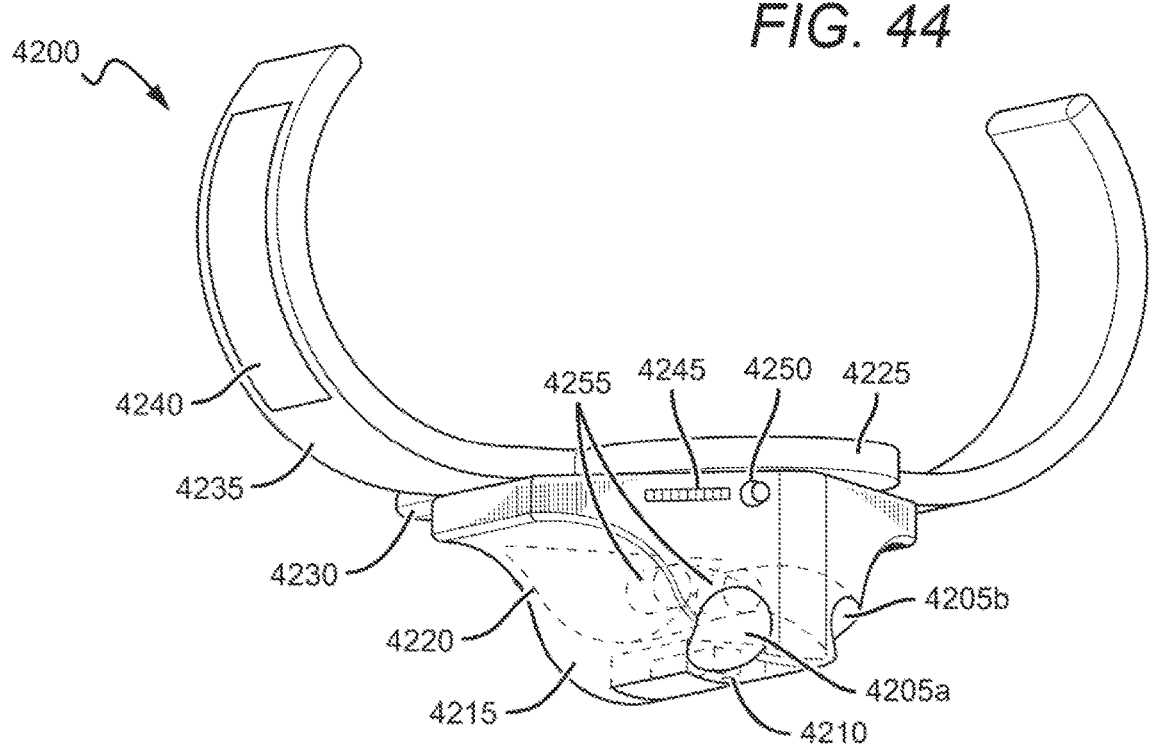
FIG. 44 is an illustration of a alternative version of the seventeenth embodiment of a swimjet system.

FIG. 44 depicts an alternative version of the sixteenth embodiment. In this version, two motors 4255 are used side-by-side, which enables the use of smaller diameter motors. That in turn frees up under the face or front of the unit 4200 to receive batter 4210.

Figure 45:
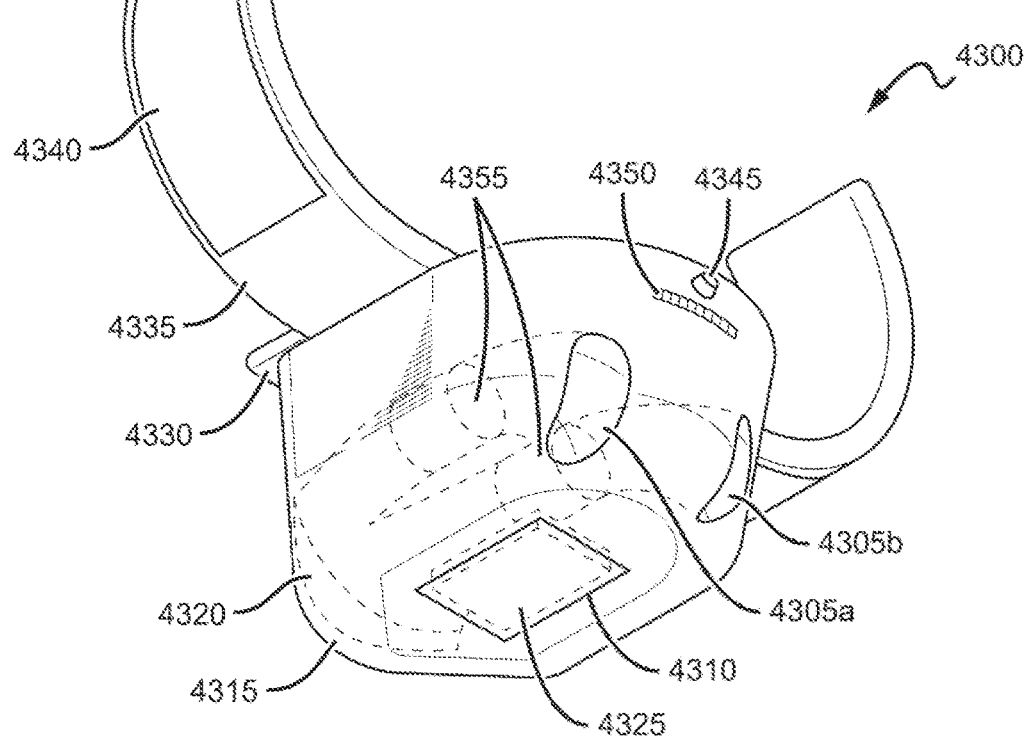
FIG. 45 is an illustration of a eighteenth embodiment of a swimjet system.

FIG. 45 shows an eighteenth embodiment 4300 of the swimjet system. This embodiment has an inlet 4320 that divides into two separate conduits that feed water into the propeller systems 4355. Battery 4325 is mounted in the face of the unit and outlets 4305 are configured to vector the thrust downwardly toward the bottom of the pool at angle theta. Backplate 4330, readouts 4350 and knob 4345 have the same functionality described above in connection with other embodiments.

A mirror may be used in connection with the swim system in order to monitor and improve stroke form. As an alternative or in addition to any of the functionality described above, the swimmer may hold station above a mirror positioned in the pool. Proficient swimmers may observe their form in the mirror and make adjustments accordingly. The interactive training system may provide the swimmer real-time feedback as to whether the stroke or kick form has improved in a detectable manner.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions, and changes in the form of the methods, apparatuses, and systems described herein can be made without departing from the spirit of the present disclosures. The accompanying claims and their equivalents are intended to cover such forms or modifications as would fall within the scope and spirit of the present disclosures.

What is claimed is:

1. A reverse propulsion swimming apparatus comprising:
   a mounting system configured to be worn about an upper torso of a swimmer; and
   a repulsion system configured to couple to the mounting system such that the repulsion system is positioned centrally about the frontal torso of the swimmer, wherein the repulsion system is configured to provide, in an aquatic environment, reverse thrust to counteract at least in part a forward propulsion provided by the swimmer.

2. The reverse propulsion swimming apparatus of claim 1, wherein the mounting system comprises a vest including first fastening means, and wherein the repulsion system includes second fastening means complementary to the first fastening means.

3. The reverse propulsion swimming apparatus of claim 1, wherein the repulsion system includes a housing having a top end that is positioned proximate the upper chest of the swimmer during use, and a bottom end of that is positioned proximate the lower abdomen of the swimmer during use, the housing enclosing at least one intake channel, at least one propulsion means, and at least two diverging outlet channels.

4. The reverse propulsion swimming apparatus of claim 3, wherein the housing of the repulsion system tapers such that the lower half of the housing nearer the bottom end has an average cross sectional area less than 70% of the average cross sectional area of the upper half of the housing nearer the top end.

5. The reverse propulsion swimming apparatus of claim 1, further comprising adjustable buoyancy means coupled to the mounting system or the repulsion system to provide varying degrees of lift to the upper torso of the swimmer.

6. The reverse propulsion swimming apparatus of claim 1, further comprising means for vectoring the reverse thrust in different directions including downward when the swimmer is in a horizontal swimming position and laterally to left and right sides of the swimmer.

7. The reverse propulsion swimming apparatus of claim 1, further comprising orientation detection means configured to activate the reverse thrust when the repulsion system is moved past a threshold angular orientation toward horizontal.

8. The reverse propulsion swimming apparatus of claim 1, further comprising a control means to automatically adjust a thrust level of the reverse thrust according to an interactive training session delivered to the swimmer while swimming.

9. The reverse propulsion swimming apparatus of claim 1, wherein the reverse propulsion swimming apparatus is adapted to provide a swim environment in which the swimmer experiences a resistance equivalent to that experienced during normal swimming at a stroke speed that is slower than that used during said normal swimming.

10. The reverse propulsion swimming apparatus of claim 1, further comprising means for adjusting a thrust level of the reverse thrust to counteract variations in the forward propulsion provided by the swimmer, such that the swimmer maintains a station in the aquatic environment.

11. A method of using a reverse thrust swimming apparatus, the method comprising:
donning, by a swimmer, a swimming apparatus comprising a repulsion system positioned centrally about the frontal torso of the swimmer, the repulsion system configured to provide in an aquatic environment reverse thrust to counteract at least in part a forward propulsion provided by the swimmer;
selecting, by the swimmer, a first reverse thrust for the repulsion system; and
swimming, by the swimmer, against the first reverse thrust such that gradual forward progress is made against the first reverse thrust, such that traversing a first distance against the first reverse thrust is equivalent to a substantially longer second distance that would have been traversed by the swimmer in the absence of the first reverse thrust;
whereby a length of a swimming environment is effectively extended by the swimming apparatus.

12. The method of claim 11, wherein a mounting system of the swimming apparatus comprises a vest including first fastening means, and wherein the repulsion system includes second fastening means complementary to the first fastening means, and wherein the method further comprises engaging the first and second fastening means to secure the repulsion system about the frontal torso of the swimmer.

13. The method of claim 11, wherein the repulsion system includes a housing having a top end that is positioned proximate the upper chest of the swimmer during use, and a bottom end of that is positioned proximate the lower abdomen of the swimmer during use, the housing enclosing at least one intake channel, at least one propulsion means, and at least two diverging outlet channels to provide and direct the first reverse thrust.

14. The method of claim 13, wherein the housing tapers such that the lower half of the housing nearer the bottom end has an average cross sectional area less than 70% of the average cross sectional area of the upper half of the housing nearer the top end.

15. The method of claim 11, wherein the swimming apparatus further comprises adjustable buoyancy means, the method further comprising responding to one or more adjustment inputs from the swimmer to vary buoyancy of the adjustable buoyancy means, thereby varying a lift to the upper torso of the swimmer.

16. The method of claim 11, wherein the repulsion system further comprises means for vectoring the first reverse thrust in different directions including downward when the swimmer is in a horizontal swimming position and laterally to left and right sides of the swimmer.

17. The method of claim 11, further comprising, sensing when the repulsion system is moved past a threshold angular orientation toward horizontal, and, in response to the sensing, activating the first reverse thrust.

18. The method of claim 11, wherein the repulsion system further comprises a control means, the method further comprising the control means automatically adjusting a thrust level according to an interactive training session delivered to the swimmer while swimming.

19. The method of claim 11, wherein the swimmer experiences a resistance equivalent to that experienced during normal swimming at a stroke speed that is slower than that used during said normal swimming.

\* \* \* \* \*